(12) United States Patent
Inagaki et al.

(10) Patent No.: US 6,660,686 B2
(45) Date of Patent: Dec. 9, 2003

(54) PHOTOCATALYST AND PROCESS FOR PRODUCING THE SAME

(75) Inventors: Shinji Inagaki, Aichi-gun (JP); Asim Bhaumik, Calcutta (IN)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 220 days.

(21) Appl. No.: 09/863,341

(22) Filed: May 24, 2001

(65) Prior Publication Data

US 2002/0098974 A1 Jul. 25, 2002

(30) Foreign Application Priority Data

May 24, 2000 (JP) ........................................ 2000-153585
May 24, 2000 (JP) ........................................ 2000-153599
Feb. 6, 2001 (JP) ........................................ 2001-029882

(51) Int. Cl.[7] ............................. B01J 23/00; B01J 17/18
(52) U.S. Cl. ..................... 502/349; 502/350; 502/208
(58) Field of Search ........................ 502/349, 350, 502/208

(56) References Cited

U.S. PATENT DOCUMENTS 2,824,073 A * 2/1958 Rylander et al. ............. 252/435
4,085,121 A * 4/1978 Milberger et al. ........ 260/346.75
6,387,844 B1 * 5/2002 Fujishima et al. ............ 502/350
6,479,141 B1 * 11/2002 Sanbayashi et al. .......... 428/323

OTHER PUBLICATIONS

Deborah J. Jones, et al., , Journal of Materials Chemistry, vol. 10, pp. 1957–1963, "High Surface Area Mesoporous Titanium phosphate: Synthesis and Surface Acidity Determination", 2000.

José Jiménez–Jiménez, et al., Advanced Materials, vol. 10, No. 10, pp. 812–815, "Surfactant–Assisted Synthesis of a Mesoporous Form of Zirconium Phosphate With Acidic Properties", 1998.

Y. Sun, et al., Journal of Materials Chemistry, vol. 10, pp. 2320–2324, "Porous Zirconium Phosphates Prepared by Surfactant–Assisted Precipitation", 2000.

* cited by examiner

Primary Examiner—Cam N. Nguyen
(74) Attorney, Agent, or Firm—Oblon, Spivak, McClelland, Maier & Neustadt, P.C.

(57) ABSTRACT

A photocatalyst comprising a porous material, wherein the porous material comprises a compound with a basic framework having metal atoms bonded to phosphorus atoms by way of oxygen atoms, the metal atoms is selected from the group consisting of titanium atoms and zirconium atoms.

23 Claims, 39 Drawing Sheets

20nm

PHOTOCATALYST AND PROCESS FOR PRODUCING THE SAME

BACKGROUND OF THE INVENTION

1. Field of the Invention

The present invention relates to a photocatalyst and to a process for producing the same.

2. Related Background Art

Methods employing photocatalysts are among the existing techniques for achieving effective utilization of solar energy. Photocatalysts are substances that function as catalysts activated by light irradiation, typical known ones including homogeneous catalysts which employ metal complexes and non-homogeneous catalysts which employ semiconductor catalysts.

The mechanism by which a photocatalyst exhibits a catalytic effect upon light irradiation is theorized to be as follows, for semiconductor catalysts, Specifically, a semiconductor has a band structure in which conduction bands and valence bands are partitioned by forbidden bands of appropriate width, and irradiation of light of energy exceeding the band gap causes excitation of the valence band electrons to the conduction bands. As a result, electron holes are produced in the valence bands and electrons in the conduction bands, and these electron holes and electrons induce an oxidation or reduction reaction by a mechanism similar to electrolysis.

The band gap size and the potential of the conduction band and valence band are important factors contributing to the catalytic activity. In addition to these, other contributing factors include the life and ease of movement of the generated electrons and electron holes, as well as the charge separation, and the overvoltage and reactivity site of the oxidation-reduction reaction.

As photocatalysts with such functions there are known semiconductor catalysts such as $TiO_2$, $ZnO$, $Ta_2O_5$, $CdS$, $GaP$, $SiC$, $K_4Nb_6O_{17}$, $K_2La_2Ti_3O_{10}$, $Na_2Ti_6O_{13}$, $BaTi_4O_9$ and $K_3Ta_3Si_2O_{13}$, and it has been confirmed that hydrogen and (oxygen are produced when these catalysts are powdered, suspended in water and irradiated with light.

With certain types of photocatalysts, it has been confirmed that formic acid, formaldehyde, methanol, methane and the like are produced upon light irradiation while carbon dioxide is passed through their aqueous suspensions. It has also been reported that catalysts with high dispersion of the semiconductor catalyst $TiO_2$ exhibit activity in pores of the insulator zeolite during the conversion reaction of carbon dioxide to hydrocarbons.

In addition to those mentioned above, titanosilicate zeolites (TS-1, TS-2) are also known as problem which hampers their practical implementation.

It is an object of the present invention, which has been accomplished in light of such technical problems, to provide a photocatalyst which can induce efficient photocatalytic reaction even when used in a small amount and with a small light irradiation area, and which can thereby decompose water and the like at an adequate reaction rate. It is another object of the invention to provide a process for producing the photocatalyst.

As a result of much diligent research aimed at achieving the aforementioned object, the present inventors have discovered that a photocatalytic function is exhibited by porous materials composed of compounds with a basic framework having titanium atoms and phosphorus atoms bonded by way of oxygen atoms and porous materials composed of compounds with a basic framework having zirconium atoms and phosphorus atoms bonded by way of oxygen atoms. The present invention has been completed upon the further discovery that such photocatalysts can be used for efficient photocatalytic reaction even in small amounts and with a small light irradiation area, thus allowing decomposition of water and the like at a sufficiently high reaction rate.

In other words, the photocatalyst of the invention is a photocatalyst comprising a porous material, materials exhibiting catalytic activity in photocatalytic reactions. Such zeolites are porous materials with pares (micropores) of generally 0.3–1.3 nm in size, and it is believed that their catalytic activity is exhibited by their moderate solid acidity. In recent years it has become possible to) synthesize titanosilicate mesoporous materials with larger pores mesopores) than zeolite, measuring 1.5–50 nm in size, and such substances have also been reported to exhibit activity in photocatalytic reactions.

Because these photocatalysts allow utilization of solar energy for sundry chemical reactions, they are being studied for effective use in numerous fields, such as production of hydrogen and oxygen by decomposition of water, synthesis of hydrocarbons such as methane and methanol from carbon dioxide and water, and purification of harmful substances such as $NO_x$ and dioxin.

SUMMARY OF THE INVENTION

Nevertheless, these photocatalysts of the prior art have slow reaction rates in photocatalytic reactions for decomposition of water or fixing of carbon dioxide, and since in order to adequately accelerate the reactions it has been necessary to use large amounts of catalyst and accomplish light irradiation over a wide area, this has constituted a wherein the porous material comprises a compound with a basic framework having metal atoms bonded to phosphorus atoms by way of oxygen atoms, the metal atoms being selected from the group consisting of titanium atoms and zirconium atoms.

The present invention includes the first to third preferred embodiments of the photocatalyst as described below.

First Embodiment

The first embodiment of the present invention is a photocatalyst comprising a porous material, wherein the porous material comprises a compound with a basic framework having titanium atoms bonded to phosphorus atoms by way of oxygen atoms and the porous material has a median pore diameter of from 0.2 nm to less than 1.5 nm.

It is believed that in the photocatalyst according to the first embodiment, which has a basic framework with titanium atoms and phosphorus atoms bonded by way of oxygen atoms, the electron holes and electrons produced by light irradiation efficiently contribute to the catalytic reaction so that the efficiency of the catalytic reaction is enhanced even with a small light irradiation area. Also, since the photocatalyst of the first embodiment has pores of the size specified above (micropores), it is possible to greatly increase the contact area for contact of water, for example, thereby increasing the number of reaction sites for the photocatalytic reaction and allowing efficient decomposition of water even with a small photocatalyst amount.

The basic framework of the photocatalyst of the first embodiment preferably has the composition represented by the following general formula (1).

$$Ti_xP_yO_z \qquad (1)$$

wherein x is a number of from 0.5 to 1.5, y is a number of from 0.5 to 1.5 and z is a number of from 3 to 6.

A photocatalyst of the first embodiment having the composition represented by general formula (1) above exhibits improved efficiency of light absorption and efficiency of the light irradiation-induced charge separated electron holes and electrons participating in the photocatalytic reaction.

According to the first embodiment, the porous material preferably has a pore volume of from 0.05 to 0.5 ml/g. If the porous material has a pore volume within this range, the contact area will tend to increase for contact with water, for example, thereby increasing the number of reaction sites for the photocatalytic reaction and tending to increase the efficiency of the photocatalytic reaction.

Second Embodiment

The second embodiment of the present invention is a photocatalyst comprising a porous material wherein the porous material comprises a compound with a basic framework having titanium atoms bonded to phosphorus atoms by way of oxygen atoms and the porous material has the median pore diameter of from 1.5 nm to 30 nm, further wherein the value of the total volume of pores with a diameter in the range of ±40% of the median pore diameter divided by the total pore volume is from 0.4 to 1.

Since the photocatalyst according to the second embodiment is composed of a compound with a basic framework having titanium atoms and phosphorus atoms bonded by way of oxygen atoms, it is possible to incorporate numerous titanium atoms which participate in the catalytic reaction into the compound, to exhibit more excellent activity as a photocatalyst. The photocatalyst of the second embodiment also has a very high surface area due to the mesopores described above, and since this provides numerous reaction sites, high activity can be exhibited even with a low amount of photocatalyst.

The mesopores allow adsorption of substances of a size that cannot easy penetrate micropores, so that catalytic action can be exhibited for substances that do not easily undergo photocatalytic reaction with titanosilicate zeolites and the like. Furthermore, since the photocatalyst of the second embodiment has highly uniform pore diameters as explained above, it is possible to achieve a selective catalytic effect for substances of a specific size, while also shortening the time required for the catalytic reaction.

The photocatalyst of the second embodiment preferably has the composition represented by the following general formula (2).

$$TiP_mO_n \quad (2)$$

wherein m is a number of from 0.1 to 1.5 and n is a number of from 2 to 5.

When the photocatalyst of the second embodiment has a composition represented by general formula (2), the basic framework having titanium atoms and phosphorus atoms banded by way of oxygen atoms efficiently acts for catalytic reaction so that the catalytic efficiency is improved.

A photocatalyst according to the second embodiment preferably has its basic framework modified with alkyl groups, where the alkyl groups are bonded to the phosphorus atoms. Modifying the basic framework with alkyl groups can render the porous material surface and pore interiors hydrophobic, to exhibit an excellent photocatalytic effect even for highly hydrophobic substances.

In the photocatalyst of the second embodiment, the pore walls serving as partitions between adjacent pores are preferably crystalline, and the pore walls serving as partitions between adjacent pores also preferably exhibit an X-ray diffraction pattern with at least 2 peaks at a diffraction angle of at least 10°. When the pore walls exhibit this characteristic, the alignment of the atoms of the porous material will tend to be regular, resulting in highly regularly arranged pores and improved activity for use as a catalyst.

In the aforementioned first and second embodiments, the porous material preferably has an ion-exchange capacity of from 0.01 to 10 mmol/g. In a photocatalyst according to the first or second embodiment, the bonded states of the constituent atoms (number of bonds and coordinated structure) can vary considerably when the titanium atoms and phosphorus atoms which have different valencies form the basic framework by way of oxygen atoms, and the basic framework thus becomes charged or polarized. Consequently, the photocatalyst of the first or second embodiment will exhibit a cationic exchange property and/or anionic exchange property. Therefore, the ion-exchange capacity can be adjusted to within the range specified above.

Third Embodiment

The third embodiment of the present invention is a photocatalyst comprising a porous material, wherein the porous material comprises a compound with a basic framework having zirconium atoms bonded to phosphorus atoms by way of oxygen atoms, further wherein the compound has no organic group-crosslinked structure and the porous material has the median pore diameter of from 0.3 nm to 2 nm.

Since the photocatalyst of the third embodiment is composed of a compound with a basic framework having zirconium atoms and phosphorus atoms bonded by way of oxygen atoms and having no organic group-crosslinked structure, as mentioned above, it is possible to incorporate numerous zirconium atoms which participate in the catalytic reaction into the porous material, to achieve sufficiently high catalytic activity when it is employed as a catalyst. The photocatalyst of the third embodiment also has an adequately high surface area since its pores have a median pore size within the above specified range, and since this provides numerous reaction sites, sufficiently high catalytic activity can be achieved even with a low amount of catalyst, In the photocatalyst of the third embodiment, the value of the total volume of pores with a diameter in the range of ±40% of the median pore diameter divided by the total pore volume is preferably from 0.4 to 1. When the pore volume satisfies this condition, the pore sizes are highly uniform and the shape selectivity of reaction substrates for catalytic reaction will tend to be higher.

The basic framework preferably has a composition represented by the following general formula (3).

$$ZrP_aO_b \quad (3)$$

wherein a is a number of from 0.1 to 10 and b is a number of from 2 to 10.

When the photocatalyst of the third embodiment has a basic framework with a composition represented by general formula (3), the basic framework will efficiently function for improved catalytic efficiency in catalytic reactions.

The present invention also provides a process for producing photocatalysts according to the aforementioned second and third embodiments.

Specifically, a photocatalyst according to the second embodiment may be produced by a process including a step of reacting a titanium-containing compound and a phosphorus-containing compound in water in the presence of an alkylamine and hydrofluoric acid, or by a process including a step of reacting a titanium-containing compound and a phosphorus-containing compound in water in the presence of an anionic surfactant.

In the production process using an alkylamine, the molar ratio of the hydrofluoric acid with respect to the phosphorus-containing compound is preferably from 0.3 to 1. When the molar ratio of the phosphorus-containing compound and the hydrofluoric acid is a value within this range, the crystallinity of the resulting photocatalyst is improved, and therefore the regularity of the pore arrangement is increased and the photocatalytic activity will tend to be enhanced.

In the production process using an anionic surfactant, the reaction between the titanium-containing compound and the phosphorus-containing compound is preferably carried out at a pH of from 1 to 6. Conducting the reaction in this pH range will tend to increase the regularity of the pore arrangement of the photocatalyst, and enhance its catalytic activity.

In both of these production processes, the phosphorus-containing compound preferably contains an alkylphosphonic acid and/or an alkylphosphonic acid ester. When the phosphorus-containing compound contains an alkylphosphonic acid and/or an alkylphosphonic acid ester, the resulting photocatalyst will be modified with alkyl groups, and since this will improve the hydrophobicity on the porous material surface and in the pore interiors, a satisfactory catalytic effect will be exhibited even for highly hydrophobic substances.

Both of the aforementioned processes can introduce a $P^+$—$X^-$ ion pair and/or a P—OH bond onto the phosphorus atoms of the basic framework of the porous material. When a $P^+$—$X^-$ ion pair is introduced, the $X^-$ ion allows ion exchange with other anions, thereby imparting an anionic exchange property to the porous material. When a P—OH bond is introduced, the P—OH bond polarizes into P—$O^-$—$H^+$, and the $H^+$ ion allows ion exchange with other cations, thereby imparting a cationic exchange property to the porous material.

The process for producing a photocatalyst according to the third embodiment includes a step of reacting a zirconium-containing compound with a phosphorus-containing compound in water in the presence of a diaminoalkane and alcohol. According to this process, it is possible to efficiently and reliably obtain a photocatalyst according to the third embodiment.

The present invention will be more fully understood from the detailed description given hereinbelow and the accompanying drawings, which are given by way of illustration only and are not to be considered as limiting the present invention.

Further scope at applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
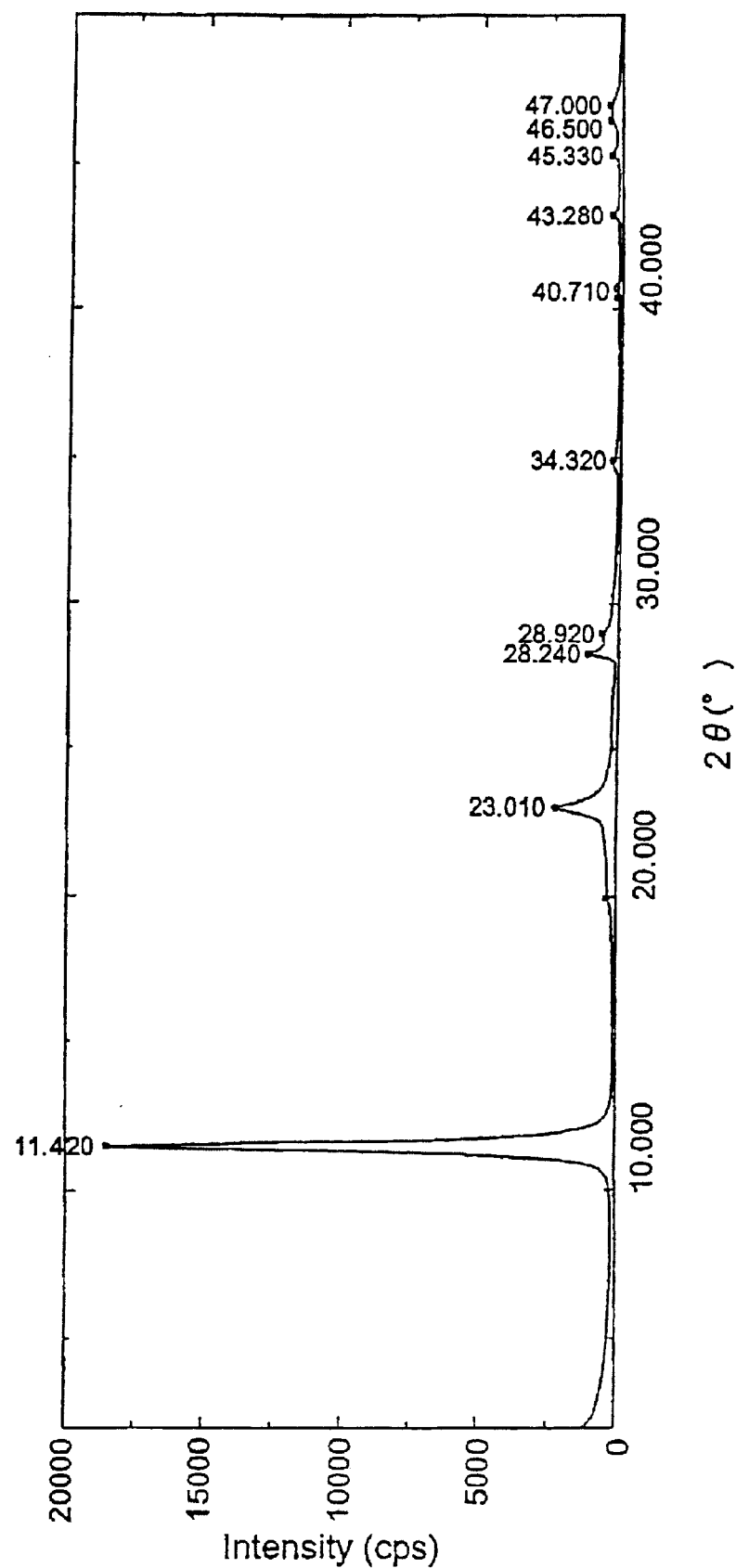
FIG. 1 is a graph showing the X-ray diffraction pattern for the amine template-containing porous material obtained in Example 1.
Figure 2:
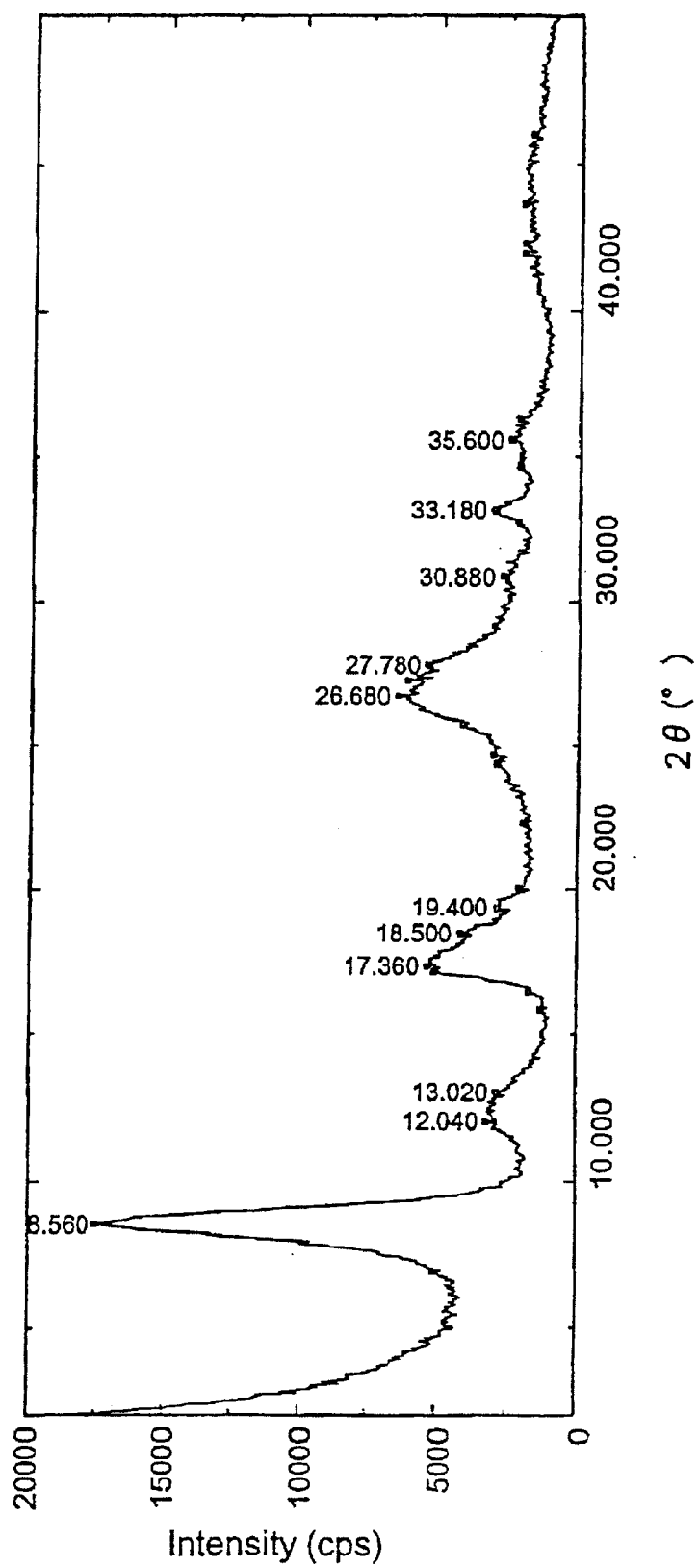
FIG. 2 is a graph showing the X-ray diffraction pattern for the amine template-free porous material obtained in Example 2.
Figure 3:
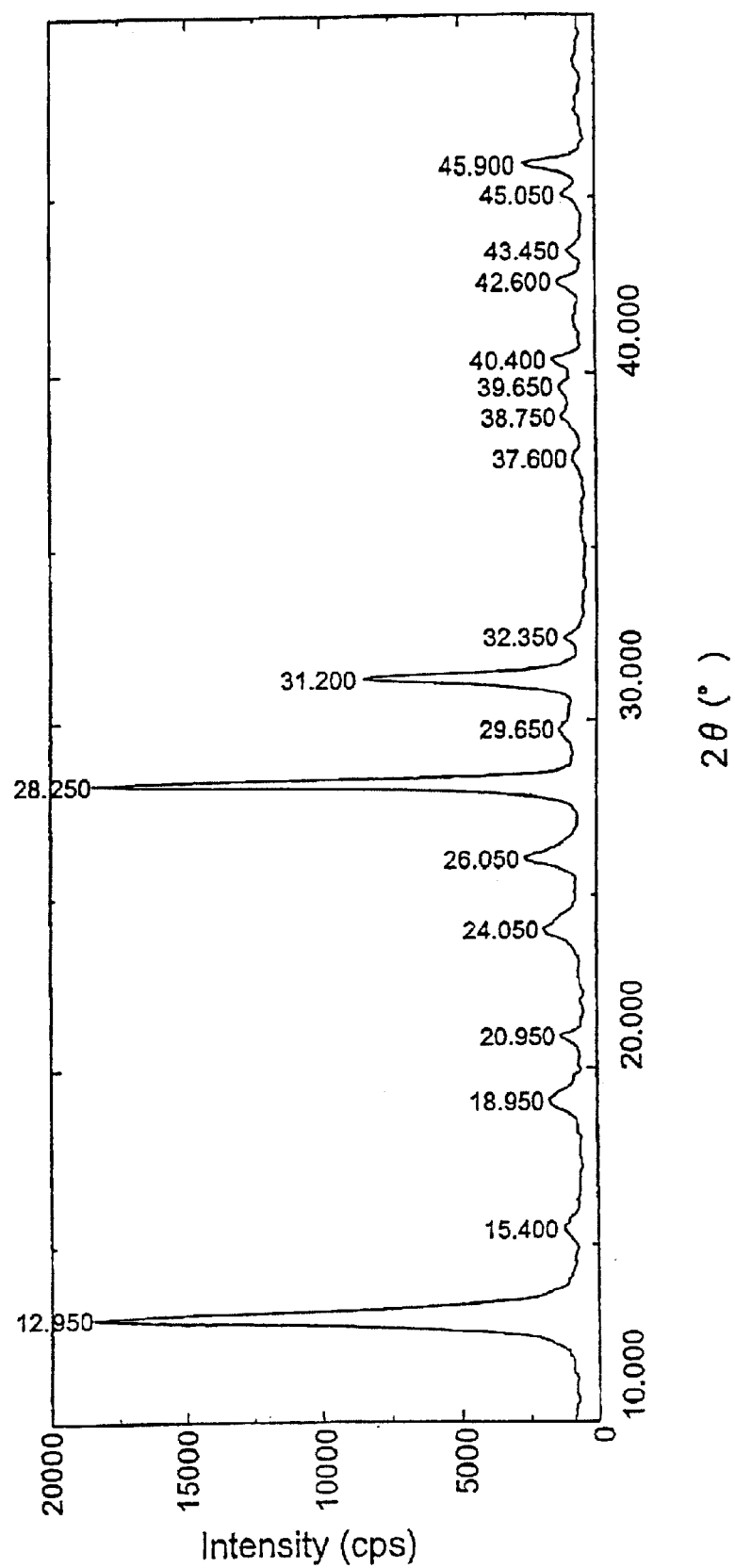
FIG. 3 is a graph showing the X-ray diffraction pattern for the amine template-containing porous material obtained in Example 3.
Figure 4:
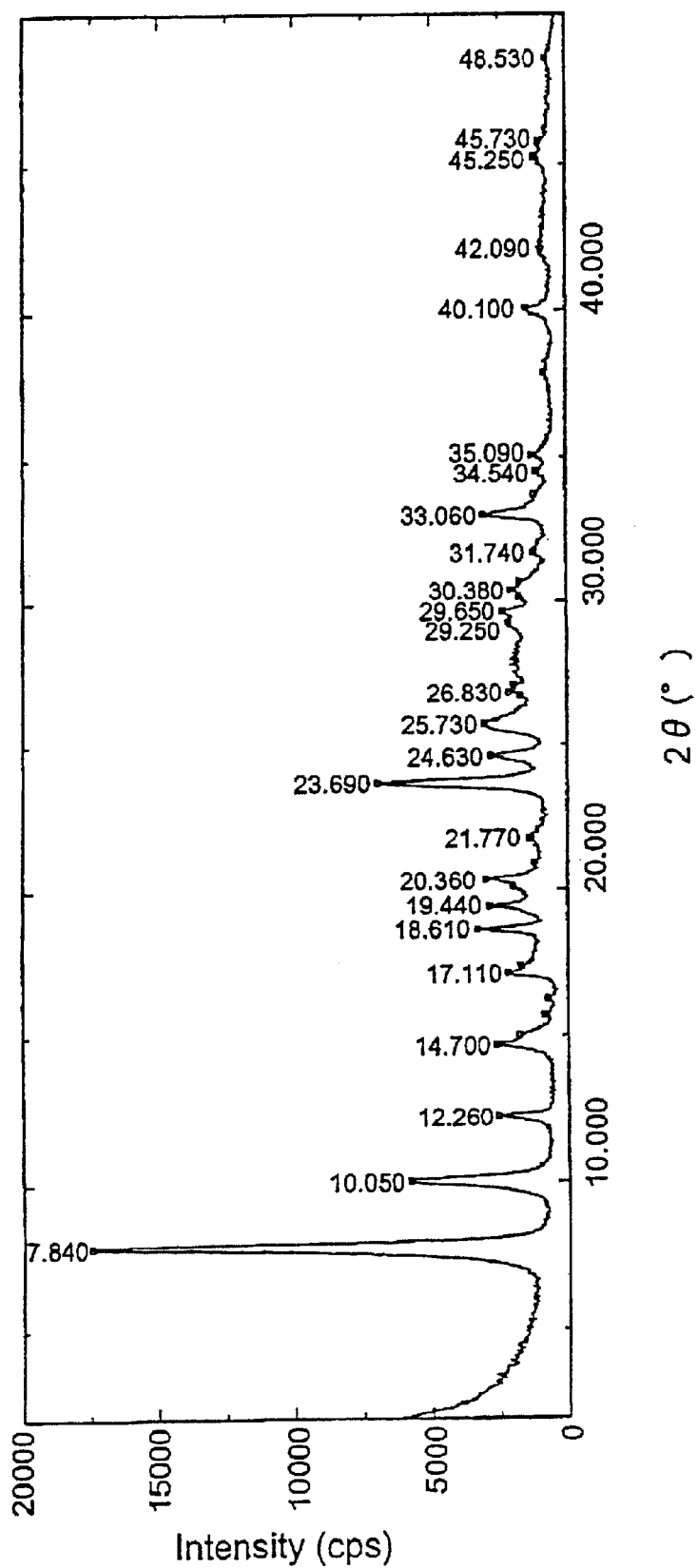
FIG. 4 is a graph showing the X-ray diffraction pattern for the amine template-containing porous material obtained in Example 4.
Figure 5:
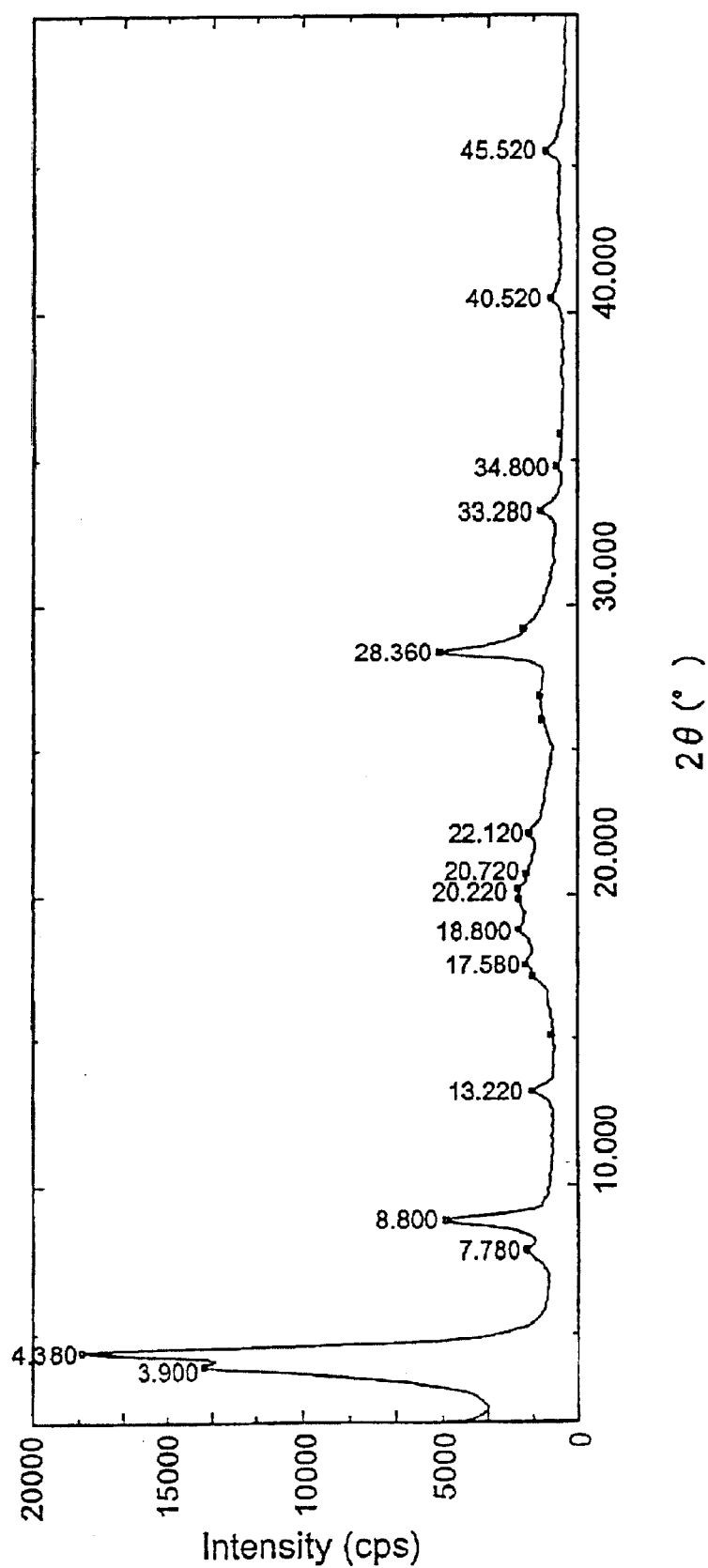
FIG. 5 is a graph showing the x-ray diffraction pattern for the amine template-containing porous material obtained in Example 5.

The photocatalyst of the invention is a photocatalyst comprising a porous material, wherein the porous material is composed of a compound having either of the following basic frameworks.

(I) A basic framework with titanium atoms and phosphorus atoms bonded by way of oxygen atoms.

(II) A basic framework with zirconium atoms and phosphorus atoms bonded by way of oxygen atoms.

In the photocatalyst of the invention, the following preferred first to third embodiments may be mentioned. These embodiments will be described in detail below.

First, the first and second embodiments will be explained.

A photocatalyst according to the first or second embodiment of the invention has —[Ti—O—P—O]$_n$— bonds in the molecule. Here, n is an integer of one or greater representing the number of repeats. According to the first embodiment of the invention, the titanium atoms and phosphorus atoms can each form a 4-coordinated structure or 6-coordinated structure. When a 4-coordinated structure is formed, three-dimensional bonds are formed with an oxygen atom positioned at least at one of the four apices of the tetrahedron around each titanium atom or phosphorus atom. When a 6-coordinated structure is formed, three-dimensional bonds are formed with an oxygen atom positioned at least at one of the six apices of the octahedron around each titanium atom or phosphorus atom.

The valencies of titanium and phosphorus atoms are 4 and 5, respectively, and the valency electrons that do not contribute to bonding with oxygen atoms forming the basic framework can bond with other atoms or functional groups. For example, each titanium atom can form a bond with a chlorine atom or OH group in addition to bonding with oxygen atoms forming the basic framework. Each phosphorus atom can also form a bond with a chlorine atom or OH group in addition to bonding with oxygen atoms forming the basic framework. The phosphorus atom can also form a bond with an alkyl group, in addition to chlorine or OH. Preferred as alkyl groups to bond with phosphorus atoms are linear or branched alkyl groups of 1 to 10 carbons.

The basic framework of the photocatalyst according to the first embodiment of the invention, wherein titanium atoms and phosphorus atoms are bonded to oxygen atoms, preferably has a composition represented by the following general formula (1):

$$Ti_xP_yO_z \quad (1)$$

where x is a number of from 0.5 to 1.5, y is a number of from 0.5 to 1.5 and z is a number of from 3 to 6.

The proportion of titanium atoms and phosphorus atoms in general formula (1) is preferably such that the ratio of titanium atoms:phosphorus atoms=1:0.8–1.2, with 1:1 being more preferred. When the proportion of titanium atoms and phosphorus atoms is within this range, the regularity of the chemical structure at the photocatalyst is improved, and the photocatalytic reaction can occur more efficiently.

The basic framework of the photocatalyst according to the second embodiment of the invention, wherein titanium atoms and phosphorus atoms are banded to oxygen atoms, preferably has a composition represented by the following general formula (2):

$$TiP_mO_n \quad (2)$$

where m is a number of from 0.1 to 1.5 and n is a number of from 2 to 5.

The proportion of titanium atoms and phosphorus atoms as represented in general formula (2) according to the invention is preferably such that the ratio of titanium atoms:phosphorus atoms=1:0.1–1.5. The proportion is more preferably 1:0.5–1.5, with 1:1 being even more preferred. When the proportion of titanium atoms and phosphorus atoms is within this range, the regularity of the chemical structure of the porous material is improved, and the catalytic reaction of the photocatalyst can occur more efficiently.

The photocatalyst according to the first embodiment of the invention has a median pore diameter of at least 0.2 nm and less than 1.5 nm, while the photocatalyst according to the second embodiment of the invention has a median pore diameter of 1.5–30 nm.

The median pore diameter of the photocatalyst according to the first embodiment is the value calculated by the following method. Specifically, the porous material is immersed in water at 25° C. and the adsorption is measured by the volume method, after which the pressure of the adsorption water is gradually increased and the adsorption of the water is measured at each equilibrium pressure, to obtain a water adsorption isotherm. The relative pressure at which the adsorption isotherm suddenly spikes upward is determined, and the median pore diameter is calculated from this value.

On the other hand, the median pore diameter of the photocatalyst according to the second embodiment is the value calculated by the following different method. Specifically, the porous material is cooled to liquid nitrogen temperature (−196° C.), nitrogen gas is introduced, and the adsorption is determined by the volume method. The pressure of the introduced nitrogen gas is then gradually increased, and the adsorption of nitrogen gas at each equilibrium pressure is plotted to obtain a nitrogen adsorption isotherm, after which the pore size distribution curve is obtained by the BHJ method (Barret-Joyner-Halenda method) from this adsorption isotherm. The median pore diameter is the pore diameter at the maximum peak of the pore size distribution curve.

For a photocatalyst according to the second embodiment of the inventions the value of the total volume of pores with a diameter in the range of ±40% of the median pore diameter divided by the total pore volume is in the range of 0.4–1. Here, "the value of the total volume of pores with a diameter in the range of ±40% of the median pore diameter divided by the total pore volume is 0.4–1" means that, for example, when the median pore diameter is 3.00 nm, the total volume of pores within ±40% of 3.00 nm, i.e. in the range of 1.80–4.20 nm, constitutes at least 40% of the total pore volume. This means that a porous material satisfying this condition has very highly uniform pore diameters.

The above-mentioned pore size distribution curve may be used to determine the value of the total volume of pores with a diameter in the range of ±40% of the median pore diameter divided by the total pore volume. That is, the integral of the pore size distribution curve between −40% and +40% of the median pore diameter nay be divided by the integral of the entire pore size distribution curve.

The photocatalyst according to the first embodiment of the invention preferably has a pore volume of 0.05–0.5 ml/g. The pore volume is more preferably 0.1–0.5 ml/g. on the other hand, the photocatalyst according to the second embodiment of the invention preferably has a pore volume of 0.05–1 ml/g. Its pore volume is more preferably 0.2–1 ml/g.

According to the first and second embodiments, when the pore volume is less than 0.05 ml/g the volume of pores in the porous material is too low, such that when it is used as a photocatalyst for decomposition of water there are fewer reaction sites with water, and the catalytic activity tends to be lower. When the pore volume exceeds 0.5 ml/g according to the first embodiment or when the pore volume exceeds 1 ml/g according to the second embodiment, the void portions increase excessively and tend to lower the strength of the porous material. The pore volume can be determined from the above-mentioned adsorption isotherm. The photocatalyst according to the first embodiment of the invention may be a substance having pores with a round or polygonal cross-section, or it my be a lamellar structured substance.

Photocatalysts according to the first and second embodiments of the invention have a basic framework wherein titanium atoms and phosphorus atoms are banded by way of oxygen atoms, and as explained above, the titanium atoms in this basic framework may have a 4-coordinated structure or 6-coordinated structure, while the phosphorus atoms may also have a 4-coordinated structure or 6-coordinated structure. Although the present inventors do not wish to be restricted to any particularly theory, it is believed that in the case where the titanium atoms and phosphorus atoms are both in a 4-coordinated structure, the structure of TiXPO$_4$ is formed in the photocatalyst (where X is an anion much as Cl$^-$ or OH$^-$) whereas when the titanium atoms adopt a 4-coordinated structure and the phosphorus atoms bond with double-bonding oxygen, the structure of TiHPO$_5$ formed in the photocatalyst.

Since the valencies of titanium atoms and phosphorus atoms are 4 and 5 respectively, it is thought that the phosphorus atoms in the structure of TiXPO$_4$ are positively charged and form ion pairs with the negatively charged X. Thus, when the titanium atoms and phosphorus atoms both adopt 4-coordinated structures in the photocatalyst of the invention, an anion exchange property may be exhibited. On the other hand, P—OH bonds are present in the structure of TiHPO$_5$, and these bonds polarize to P—O$^-$H$^+$ so that the H$^+$ exhibits strong solid acidity. Consequently, when the titanium atoms adopt a 4-coordinated structure and the phosphorus atoms bond with double-bonding oxygen in the photocatalysts of the first and second embodiments of the invention, a cationic exchange property may be exhibited.

When both the phosphorus atoms and titanium atoms have a 4-coordinated structure, the compound composing a photocatalyst of the first or second embodiment has a structure represented by the following chemical formula (i), for example.

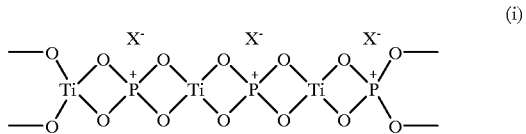

(i)

In this formula, X$^-$ represents an anion, and examples of such anions include OH$^-$ derived from the compounds used during synthesis of the photocatalyst (for example, the surfactant and pH adjustor) and Cl$^-$ derived from the compounds left during the synthesis (for example, hydrogen chloride left after the reaction between titanium tetrachloride and phosphoric acid).

When a photocatalyst with the structure represented by chemical formula (i) above is contacted with a solution containing anions, the solution penetrates the pores of the porous material and the anion X$^-$ undergoes ion exchange with the anions in the solution, so that the photocatalyst with the structure represented by chemical formula (i) exhibits an anion exchange property, Here, the ion-exchange capacity is preferably 0.01–10 mmol/g.

On the other hand, when the phosphorus atoms bond with double-bonding oxygen and the titanium atoms have a 4-coordinated structure, the compound composing a photocatalyst of the first or second embodiment has a structure represented by the following chemical formula (ii), for example.

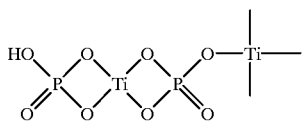

(ii)

This chemical formula (ii) is neutral overall, but the —OH groups bonded to phosphorus as mentioned above polarize into —O⁻H⁺. Consequently, when a photocatalyst with the structure represented by chemical formula (ii) above is contacted with a solution containing cations, the solution penetrates the pores of the photocatalyst and the cation H⁺ undergoes ion exchange with the cations in the solution, so that the photocatalyst with the structure represented by chemical formula (ii) exhibits a cation exchange property. Here, the ion-exchange capacity is preferably 0.01–10 mmol/g.

The porous material of the invention can be confirmed to have the structure of chemical formula (i) and/or chemical formula (ii) by any of various analysis methods, For example, it is possible to verify production of P—O—Ti bonds by the infrared absorption spectrum, and it is possible to verify the 4-coordinated structure or 6-coordinated structure of titanium atoms by the ultraviolet/visible absorption spectrum. Also it is possible to confirm the 4-coordinated structure or 6-coordinated structure adopted by phosphorus atoms by the $^{31}$P MAS NMR spectrum.

The photocatalyst according to the second embodiment of the invention is a porous material composed of a compound with the structure described above, wherein the pore walls serving as partitions between adjacent pores are preferably crystalline. Here, crystalline pore walls means that all or a portion of the pore walls are crystalline. The crystallinity of the pore walls can be judged, for example, by performing powder X-ray diffraction of the porous material and determining whether the resulting X-ray diffraction pattern has at least 2 peaks at a diffraction angle of at least 10°. Porous materials with mesopores and with crystalline pore walls are known among porous materials composed of metal oxides, but no reports exist to date of porous materials with crystalline pore walls, having a basic framework composed of titanium atoms, phosphorus atoms and oxygen atoms, as according to the present invention.

The process for producing the photocatalyst according to the first embodiment of the invention is not particularly restricted. For example, phosphoric acid ($H_3PO_4$) may be dissolved in deionized water, and then titanium tetrachloride ($TiCl_4$) or a titanium alkoxide such as titanium tetraisopropoxide added thereto and the mixture stirred at, for example, room temperature for from 20–30 minutes to a few hours. Here, the ratio of moles of phosphorus atoms to moles of titanium atoms is preferably about 1:1. After completion of the stirring, the mixture may be heated at 25–200° C. in an autoclave for from 20–30 minutes to a few hours to bring to completion the reaction between the phosphoric acid and titanium tetrachloride or between the phosphoric acid and titanium alkoxide. This yields a photocatalyst according to the first embodiment of the invention.

When the phosphoric acid in deionized water is reacted with the titanium tetrachloride or titanium alkoxide, a suitable amount of hydrofluoric acid may also be added. Addition of hydrofluoric acid can improve the crystallinity of the resulting porous material. After reacting the phosphoric acid in deionized water with the titanium tetrachloride or titanium alkoxide, a diaminoalkane such as ethylenediamine, 1,6-diaminohexane or 1,12-diaminododecane may be added as an amine template, or an acid or base may be added to adjust the pH to, for example, between 2 and 2.8.

According to the invention, the diaminoalkane used as an amine template preferably has a carbon number of 1–12. Addition of the amine template can control the crystallinity and pore size of the porous material. Also, adjustment of the pH to within the range mentioned above can yield a porous material with satisfactory crystallinity.

When an amine template is used, the reaction product may be heated for firing at 300–1000° C. and preferably 400–700° C. to remove the amine template. The heating time may be approximately 30 minutes, but heating is preferably carried out for an hour or longer for complete removal of the amine template. The firing may be conducted in air, but because a large amount of combustible gas is generated, it is preferably conducted with introduction of an inert gas such as nitrogen.

The amine template alternatively may be extracted with a good solvent for the amine template. In addition, ethanol containing a small amount of hydrochloric acid may be added and the mixture stirred while heating at 50–70° C. to extract the amine template.

The process for producing the photocatalyst according to the second embodiment of the invention is likewise not restricted in any particular way. For example, it may be produced by a production process including a step in which a titanium-containing compound and a phosphorus-containing compound are reacted in water in the presence of an alkylamine and hydrofluoric acid.

Here, the titanium-containing compound is not particularly restricted so long as it can react with the phosphorus-containing compound to fore a basic framework in which the titanium atoms and phosphorus atoms are bonded by way of oxygen atoms, and as examples there may be mentioned titanium tetrachloride ($TiCl_4$) and titanium alkoxides such as titanium tetraisopropoxde. The titanium-containing compound may consist of only one of the aforementioned compounds, or it may comprise two or Lore different ones. However, it must include at least one of the aforementioned compounds.

The phosphorus-containing compound is not particularly restricted so long as it can react with titanium atoms to form a basic framework in which the titanium atoms and phosphorus atoms are bonded by way of oxygen atoms, and as examples there may be mentioned phosphoric acid and phosphoric acid esters. The phosphorus-containing compound may consist of only one of the aforementioned compounds, or it may comprise two or more different ones. However, it must include at least one of the aforementioned compounds, and for example, it may further contain an alkylphosphonic acid and/or an alkylphosphonic acid ester. The alkyl group of the alkylphosphonic acid or alkylphosphonic acid ester may be linear or branched, and preferably has a carbon number of 1–10.

When the phosphorus-containing compound includes an alkylphosphonic acid and/or alkylphosphonic acid ester in addition to phosphoric acid or a phosphoric acid ester, the basic framework of the resulting photocatalyst will be modified by the alkyl groups bonded to the phosphorus atoms, and this will tend to increase the hydrophobicity of the photocatalyst. When an alkylphosphonic acid and/or alkylphosphonic acid ester is used in addition to phosphoric acid or a phosphoric acid ester as the phosphorus-containing compound according to the invention, the number of moles of phosphorus atoms derived from the alkylphosphonic acid and/or alkylphosphonic acid ester is preferably no greater than 50% of the total moles of phosphorus atoms in the phosphorus-containing compound.

The alkylamine used for the aforementioned production process is not particularly restricted, and any primary, secondary or tertiary amine including an alkyl group may be used. According to the invention, N,N-dimethylalkylamines are preferably used as alkylamines. Examples of preferred N,N-dimethylalkylamines are N,N-dimethylalkylamines with alkyl groups of 8–22 carbon atoms, such as N,N-dimlethyldecylamine, N,N-dimethyldodecylamine, N,N-dimethyltetradecylamine and N,N-dimethyloctadecylamine.

According to the aforementioned production process, hydrofluoric acid may be used for the reaction between the titanium-containing compound and phosphorus-containing compound in water in the presence of the alkylamine, in order to improve the crystallinity of the resulting photocatalyst. In this case, the molar ratio of hydrofluoric acid with respect to the phosphorus-containing compound is preferably 0.3–1, and more preferably 0.5–1.

There are no particular restrictions on the reaction temperature for the production process, and it may be conducted at room temperature or under heating. When the reaction is carried out at room temperature, stirring is preferably continued for about one hour to 3 days. When heating is employed, it is preferred to use an autoclave or the like for hydrothermal synthesis at 40–150° C. for one hour to 3 days.

In this production process, ammonia water or aqueous sodium hydroxide may be added to adjust the pH to 2–6, and then the reaction mixture stirred at room temperature and subjected to hydrothermal synthesis in an autoclave. When the pH is adjusted in this manner, the resulting photocatalyst will be composed of a porous material with higher crystallinity.

The photocatalyst production process according to the second embodiment of the invention may also include a step of removing the alkylamine remaining in the pores of the porous material, after completing the step of reacting the titanium-containing compound and phosphorus-containing compound in water in the presence of an alkylamine and hydrofluoric acid.

The method of removing the alkylamine may be, for example, a method by firing or a method of treatment with a solvent such as water or alcohol. In a method by firing, the porous material is heated at 300–1000° C., and preferably 400–700° C. The heating time may be approximately 30 minutes, but the heating is preferably continued for an hour or longer for complete removal of the surfactant component. The firing may be conducted in air, but because a large amount of combustible gas is generated, it is preferably conducted with introduction of an inert gas such as nitrogen. When a solvent is used for removal of the alkylamine from the porous material, it is preferred to use a solvent with high solubility for the alkylamine.

The photocatalyst according to the second embodiment of the invention may alternatively be produced by a process including a step of reacting the titanium-containing compound and phosphorus-containing compound in water in the presence of an anionic surfactant.

Here, the titanium-containing compound and phosphorus-containing compound which are used may be the same ones as mentioned above. The titanium-containing compound and phosphorus-containing compound may be each of one type or combinations of two or more types. As also explained above, the phosphorus-containing compound may farther include an alkylphosphonic acid and/or alkylphosphonic acid ester. The alkyl group of the alkylphosphonic acid and/or alkylphosphonic acid ester may be linear or branched, and preferably has 1–10 carbon atoms.

When the phosphorus-containing compound includes an alkylphosphonic acid and/or alkylphosphonic acid ester in addition to phosphoric acid or a phosphoric acid ester, the basic framework of the resulting photocatalyst will be modified by the alkyl groups bonded to the phosphorus atoms, and this will tend to increase the hydrophobicity of the photocatalyst. When an alkylphosphonic acid and/or alkylphosphonic acid ester is used in addition to phosphoric acid or a phosphoric acid ester as the phosphorus-containing compound according to the invention, the number of moles of phosphorus atoms derived from the alkylphosphonic acid and/or alkylphosphonic acid ester is preferably no greater than 50% of the total moles of phosphorus atoms in the phosphorus-containing compound.

The anionic surfactant used for this production process is not particularly restricted, and any one with a hydrophilic group and lipophilic group which produces an anion in water may be used; as examples there may be mentioned sodium dodecyl sulfate, dodecyl-p-benzenesulfonic acid, alkylphosphoric acid salts and fatty acids. The anionic surfactant is used as a template for the purpose of forming pores in the porous material, or for the purpose of controlling the pore size.

There are no particular restrictions on the reaction temperature for this production process, and it may be conducted at room temperature or under heating. When the reaction is carried out at room temperature, stirring is preferably continued for about one hour to 3 days. When heating is employed, it is preferred to use an autoclave or the like for hydrothermal synthesis at 40–150° C. for one hour to 3 days. In this production process, ammonia water or aqueous sodium hydroxide is preferably added to adjust the pH to 1–6, and then the reaction mixture stirred at room temperature and subjected to hydrothermal synthesis in an autoclave. The pH is preferably adjusted to 3–5. When the pH is adjusted in this manner the resulting photocatalyst will be composed of a porous material with higher crystallinity. When a titanium alkoxide is used as the titanium-containing compound, a step of removing the alkoxide-derived alcohol may be added.

The production process for a photocatalyst according to the second embodiment of the invention may also include a step of removing the anionic surfactant present in the pores of the porous material, after completing the step of reacting the titanium-containing compound and phosphorus-containing compound in water in the presence of the anionic surfactant.

The method of removing the anionic surfactant may be, for example, a method by firing or a method of treatment with a solvent such as water or alcohol. Firing may be accomplished in the manner described above. When a solvent is used for removal, the porous material may be dispersed in ethanol containing ammonia water or aqueous sodium hydroxide, for example, and the dispersion stirred while heating at 50–70° C.

In both of the production processes described above the ratio of the total number of moles of phosphorus atoms in the phosphorus-containing compound with respect to the total number of moles of titanium atoms in the titanium-containing compound is preferably 0.1–1.5, and more preferably 0.5–1.5. When the titanium-containing compound and phosphorus-containing compound are reacted in water, their concentration in the water is not particularly restricted but is preferably 0.1–20 mole percent as the total for the titanium-containing compound and phosphorus-containing compound. The number of moles of the alkylamine and anionic surfactant is preferably 0.1–20 mole percent with respect to the total number of moles of the titanium-containing compound and phosphorus-containing compound.

A photocatalyst according to the third embodiment of the invention will now be explained.

The photocatalyst according to the third embodiment of the invention is composed of a compound having a framework with zirconium atoms and phosphorus atoms bonded by way of oxygen atoms and having no organic group-crosslinked structure; such compounds have in the molecule bonds represented by —[Zr—O—P—O]$_n$— (where n is an integer of 1 or greater representing the number of repeats). Because the photocatalyst according to the third embodiment of the invention is composed of a compound having this kind of basic framework, the zirconium atoms can be incorporated into the compound in an sufficiently high amount as active sites of the catalyst without impairing the porous structure of the porous material, so that adequately high catalytic activity can be achieved.

The mechanism for expression of the catalytically active sites in the photocatalyst according to the third embodiment of the invention is conjectured by the present inventors to be as follows. That is, it is believed that by forming the aforementioned basic framework in the molecule, a band structure is formed in which conduction bands and valence bands are partitioned by appropriate forbidden bands. When heat or light energy is applied to the compound having this band structure, the valence band electrons are excited to the conduction bands by energy absorption, and the electron holes of the valence bands and the electrons of the conduction bands each act as activity centers for oxidation-reduction reaction.

In the photocatalyst according to the third embodiment of the invention, the zirconium atoms and phosphorus atoms can each form a 4-coordinated structure or 6-coordinated structure. When a 4-coordinated structure is formed, three-dimensional bonds are formed with an oxygen atom positioned at least at one of the four apices of the tetrahedron around each zirconium atom or phosphorus atom. When a 6-coordinated structure is formed, three-dimensional bonds are formed with an oxygen atom positioned at least at one of the six apices of the octahedron around each zirconium atom or phosphorus atom.

The valencies of zirconium and phosphorus atoms are 4 and 5, respectively, and the valency electrons that do not contribute to banding with oxygen atoms forming the basic framework can bond with other atoms or functional groups. For example, each zirconium atom can form a bond with a chlorine atom or hydroxyl group in addition to bonding with oxygen atoms forming the basic framework. Each phosphorus atom can also form a bond with a chlorine atom, hydroxyl group or alkyl group in addition to bonding with oxygen atoms forming the basic framework.

If the composition of the basic framework of the photocatalyst according to the third embodiment of the invention is represented by the following general formula (3):

$$ZrP_aO_b \qquad (3)$$

using a and b as the ratios of phosphorus atoms and oxygen atoms, respectively, with respect to zirconium atoms, then preferably a is a number of from 0.1 to 10 and b a number of from 2 to 10, and sore preferably, a is a number of from 0.7 to 1.2 and b a number of from 3 to 6.

When the proportion of phosphorus atoms and oxygen atoms with respect to zirconium atoms satisfies this condition, the regularity of the chemical structure of the photocatalyst is improved, and the catalytic activity of the photocatalyst tends to be increased.

The photocatalyst according to the third embodiment of the invention has pores with a median pore diameter of 0.3–2 nm. When the median pore diameter of the pores is within this range, the porous material exhibits sufficiently high adsorption for the starting compounds in the catalytic reaction, and the starting compounds are introduced into the pores containing the active sites at an adequately high concentration for an enhanced reaction rate. Since a strong potential field is formed inside the fine pores due to buildup of Van der Waals forces from the pore walls which act 3-dimensionally, the catalytic reaction rate is also speeded by this potential field. In addition, since the surface area of the photocatalyst of the invention having such pores is sufficiently large, it can provide a satisfactory large number of reaction sites. Consequently, the photocatalyst according to the third embodiment of the invention can adequately reduce the time and amount of catalyst necessary for the catalytic reaction. The median pore diameter of the photocatalyst according to the third embodiment of the invention is the same as for the photocatalyst according to the second embodiment.

In the photocatalyst according to the third embodiment of the invention, the value of the total volume of pores with a diameter in the range of ±40% of the median pore diameter divided by the total pore volume is preferably 0.4–1. if the pore volume does not satisfy this condition, the pore size uniformity will tend to be inadequate and the shape selectivity of reaction substrates for the catalytic reaction will tend to be lower.

The pore volume of the photocatalyst according to the third embodiment of the invention is preferably (0.05–0.5 ml/g and more preferably 0.1–0.5 ml/g. If the pore volume is less than the lowest limit of these ranges, the pore volume of the porous material may be too low, and when the porous material is used as a photocatalyst for decomposition of water, for example, the reaction sites will tend to be reduced, thereby lowering the catalytic activity. On the other hand, if the pore volume exceeds the highest limit, the void portions of the porous material increase excessively and tend to lower the strength of the porous material. The pore volume can be determined from the adsorption isotherm.

The photocatalyst according to the third embodiment of the invention has a basic framework wherein zirconium atoms and phosphorus atoms are bonded by way of oxygen atoms, and as explained above, the zirconium atoms in this basic framework may have a 4-coordinated structure or 6-coordinated structure, while the phosphorus atoms may also have a 4-coordinated structure or 6-coordinated structure. Although the present inventors do not wish to be restricted to any particularly theory, it is relieved that in the case where the zirconium atoms and phosphorus atoms are both in a 4-coordinated structure, the structure of $ZrXPO_4$ is formed in the porous material (where X is an anion such as $Cl^-$ or $OH^-$), whereas when the zirconium atoms adopt a 4-coordinated structure and the phosphorus atoms bond with double-bonding oxygen, the structure of $ZrHPO_4$ is formed in the porous material.

Since the valencies of zirconium atoms and phosphorus atoms are 4 and 5 respectively, it is thought that the phosphorus atoms in the structure of $ZrXPO_4$ are positively charged and form ion pairs with the negatively charged X. Thus, when the zirconium atoms and phosphorus atoms both adopt 4-coordinated structures in the photocatalyst of the inventions an anion exchange property may be exhibited. In this case, the photocatalyst of the third embodiment has a structure represented by the following formula (iii).

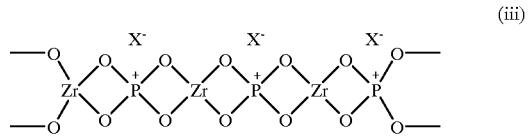

(iii)

In formula (iii), the anion represented by $X^-$ may be, for example, an anion such as $OH^-$ derived from the compounds used during synthesis of the photocatalyst (for example, the surfactant and pH adjustor) or an anion such as $Cl^-$ derived from the compounds left during the synthesis (for example, hydrogen chloride left after the reaction between zirconium tetrachloride and phosphoric acid).

When a photocatalyst comprising a porous material with the structure represented by formula (iii) above is contacted with a solution containing anions, the solution penetrates the pores of the photocatalyst and ion exchange occurs between X and the anions in the solution, so that an anion exchange property is exhibited. Here, the ion-exchange capacity is preferably 0.01–10 mmol/g.

On the other hand, P—OH bonds are present in the structure of $ZrHPO_4$, and these bonds polarize to $P—O^-H^+$ so that the $H^+$ exhibits strong solid acidity. Thus, it is thought that the photocatalyst of the third embodiment exhibits a cationic exchange property when the zirconium atoms have a 4-coordinated structure and the phosphorus atoms bond with double-bonding oxygen. In this case, the photocatalyst of the third embodiment has a structure represented by the following formula (iv).

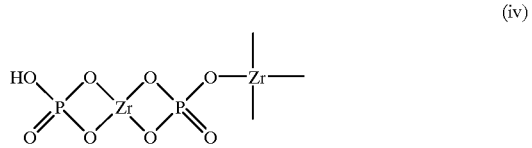

(iv)

This formula (iv) is neutral overall, but since the hydroxyl groups bonded to phosphorus atoms can polarize into $P—O^-$ $H^+$ as explained above, when a porous material with the structure represented by formula (iv) above is contacted with a solution containing cations, the solution penetrates the pores of the porous material and $H^+$ undergoes ion exchange with the cations in the solution, so that a cation exchange property is exhibited. Here, the ion-exchange capacity is preferably 0.01–10 mmol/g. The porous material of the invention can be confirmed to have the structure represented by formula (iii) or formula (iv) by the same publicly known analysis methods mentioned above.

A photocatalyst according to the third embodiment of the invention having such a structure can be efficiently and reliably obtained by the production process described below. Specifically, the production process for a photocatalyst according to the third embodiment is characterized by including a step of reacting a zirconium-containing compound and a phosphorus-containing compound in water in the presence of a diaminoalkane and alcohol.

There are no particular restrictions on the zirconium-containing compounds to be used in the production process for a photocatalyst according to the third embodiment so long as they can react with phosphorus-containing compounds to form a basic framework in which the zirconium atoms and phosphorus atoms are bonded by way of oxygen atoms; specifically, however, there may be mentioned zirconium tetrachloride ($ZrCl_4$), zirconium alkoxides such as zirconium tetraisopropoxide ($Zr(OiPr)_4$), zirconium actetylacetonate and sulfated zirconia. These zirconium-containing compounds my be used alone or in combinations of two or more.

The phosphorus-containing compound is not particularly restricted so long as it can react with the zirconium-containing compound to form a basic framework in which the zirconium atoms and phosphorus atoms are bonded by way of oxygen atoms, and as specific examples there may be mentioned phosphoric acid ($H_3PO_4$) and phosphoric acid esters. These phosphorus-containing compounds may be used alone or in combinations of two or more. The phosphorus-containing compound may further contain an alkylphosphonic acid and/or an alkylphosphonic acid ester in addition to these compounds. The alkyl group of the alkylphosphonic acid or alkylphosphonic acid ester may be linear or branched, and preferably has a carbon number of 1–10.

When the phosphorus-containing compound includes an alkylphosphonic acid and/or alkylphosphonic acid ester in addition to phosphoric acid or a phosphoric acid ester, the basic framework of the resulting photocatalyst will be modified by the alkyl groups bonded to the phosphorus atoms, and this will tend to increase the hydrophobicity of the photocatalyst. The proportion of phosphorus atoms derived from the alkylphosphonic acid and/or alkylphosphonic acid ester is preferably no greater than 50% in terms of moles with respect to the total moles of phosphorus atoms in the phosphorus-containing compound.

The amount of zirconium-containing compound and phosphorus-containing compound used is appropriately selected based on the composition of the basic framework of the intended photocatalyst, but the ratio of the total moles of phosphorus atoms in the phosphorus-containing compound with respect to the total moles zirconium atoms in the zirconium-containing compound is preferably 0.1–10, and more preferably 0.7–1.2. The concentration of these compounds in water is not particularly restricted, but is preferably 0.1–20 mole percent as the total for the zirconium-containing compound and phosphorus-containing compound.

In the production process for a photocatalyst according to the third embodiment, a diaminoalkane is used as the template. As specific diaminoalkanes there may be mentioned 1,12-diaminododecane, 1,10-diaminodecane, 1,8-diaminooctane and 1,6-diaminohexane. Of these, diaminoalkanes with alkyl groups of 8–14 carbon atoms are preferred. The amount of diaminoalkane used is preferably 0.1–20 mole percent with respect to the total moles of the zirconium-containing compound and phosphorus-containing compound.

In the production process for a photocatalyst according to the third embodiment, an alcohol may be used during reaction of the zirconium-containing compound and phosphorus-containing compound in water in the presence of the diaminoalkane, in order to improve the crystallinity of the resulting porous material. As specific alcohols there may be mentioned methanol, ethanol, n-propanol and i-propanol. These alcohols may be used alone or in combinations of two or more. The amount of alcohol used is preferably 0.3–1 mole and more preferably 0.5–1 mole to 1 mole of the phosphorus-containing compound.

There are no particular restrictions on the reaction temperature for the production process for a photocatalyst according to the third embodiment, and it may be conducted at room temperature or under heating. When the reaction temperature is room temperature, the reaction solution is preferably subjected to the reaction for about one hour to 3 days while stirring. When heating is employed, it is preferred to use an autoclave or the like for hydrothermal synthesis at 40–1.50° C. for one hour to 3 days.

In the production process for a photocatalyst according to the third embodiment, ammonia water or aqueous sodium hydroxide may be used to adjust the pH to 2–6. Adjusting the pH of the reaction solution to within this range tends to give a photocatalyst composed of a porous material with higher crystallinity.

The photocatalyst production process according to the third embodiment may also include a step of removing the diaminoalkane remaining in the pores of the porous material, after completing the step of reacting the zirconium-containing compound and phosphorus-containing compound in water in the presence of the diaminoalkane and alcohol. The method of removing the diaminoalkane is the same as for a photocatalyst according to the first embodiment.

As explained above, photocatalysts according to the invention having the composition and chemical structure described above thus produce efficient photocatalytic reaction even when used in low amounts and with a small light irradiation area. As particularly preferred uses, the photocatalysts may be employed as photocatalysts for production of hydrogen by photodecomposition of water, photosynthesis of hydrocarbons (such as methane and methanol) from carbon dioxide and water (carbon dioxide fixation) and photopurification of $NO_x$, as antifouling construction materials, antimicrobial materials, superhydrophilic materials, superhydrophobic materials and deodorizing materials, as catalysts for photodecomposition of dioxin and environmental hormones, as freshness retaining materials based on ethylene decomposition, as water treatment materials (for removal of $E.\ coli$, organic chlorine compounds, agricultural chemicals, phenols, etc.), as metal oxide semiconductors for pigment sensitized solar cells, and as organic compound liquid phase oxidizing catalysts.

EXAMPLES

Preferred examples of the present invention will now be explained in detail, with the understanding that the invention is in no way limited to these examples.
Photocatalyst of First Embodiment

Example 1

After adding 11.5 g of phosphoric acid ($H_3PO_4$) and 8.4 g of hydrofluoric acid (HF) to 120 g of deionized water, the mixture was vigorously stirred at room temperature. To this stirred aqueous solution there was added dropwise 18.9 g of titanium tetrachloride ($TiCl_4$), and stirring was continued at room temperature for one hour. Next, 3.0 g of ethylenediamine ($H_2N$—$C_2H_4$—$NH_2$) was added as an amine template, and stirring was continued at room temperature for one hour to obtain a gel-like substance. The molar ratio of the constituent components of the resulting gel-like substance was as follows.

$H_3PO_4:TiCl_4:HF:R:H_2O=1:1:1:0.5:66.6$

Here, R represents the amine template ($H_2N$—$C_2H_4$—$NH_2$).

The obtained gel-like substance was heated in an autoclave at 170° C. (443K) for 24 hours. The heated product was filtered and the solid portion obtained by filtering was washed several times with deionized water and dried at 100° C. (373K) for a few hours to obtain an amine template-containing porous material. The amine template-containing porous material was then poured into a mixed solution of 2 g of dilute hydrochloric acid (2 mol %) and 80 ml of ethanol and the mixture was stirred at 60° C. (333K) for 6 hours to remove the ethylenediamine from the pores, after which it was dried at room temperature to obtain an amine template-free porous material.

Example 2

After adding 11.5 g of phosphoric acid ($H_3PO_4$) and 8.4 g of hydrofluoric acid (HF) to 120 g of deionized water, the mixture was vigorously stirred at room temperature. To this stirred aqueous solution there was added dropwise 18.9 g of titanium tetrachloride ($TiCl_4$), and stirring was continued at room temperature for one hour to obtain a gel-like substance. The molar ratio of the constituent components of the resulting gel-like substance was as follows.

$H_3PO_4:TiCl_4:HF:H_2O=1:1:1:66.6$

The obtained gel-like substance was heated in an autoclave at 80° C. (353K) for 72 hours. The heated product was filtered and the solid portion obtained by filtering was washed several times with deionized water and dried at 100° C. (373K) for a few hours to obtain an amine template-free porous material.

Example 3

An 11.5 g portion of phosphoric acid ($H_3PO_4$) was dissolved in 120 g of deionized water. While stirring this aqueous solution, 18.9 g of titanium tetrachloride ($TiCl_4$) was added dropwise thereto. Stirring was continued at room temperature for one hour. Next, 6.3 g of 1,6-diaminohexane ($H_2N$—$C_6H_{12}$—$NH_2$) was added as an amine template, a 2 N aqueous sodium hydroxide solution was added to adjust the pH to 2–2.8 and stirring was continued at room temperature for one hour to obtain a gel-like substance. The molar ratio of the constituent components of the resulting gel-like substance was as follows.

$H_3PO_4:TiCl_4:R:NaOH:H_2O=1:1:0.5:(2.5–3.0):66.6$

Here, R represents the amine template ($H_2N$—$C_6H_{12}$—$NH_2$).

The obtained gel-like substance was heated in an autoclave at 170° C. (443K) for 48 hours. The heated product was filtered and the solid portion obtained by filtering was washed several times with deionized water and dried at 100° C. (373K) for a few hears to obtain an amine template-containing porous material. The amine template-containing porous material was then poured into a mixed solution of 2 g of dilute hydrochloric acid (2 mol %) and 80 ml of ethanol and the mixture was stirred at 60° C. (333K) for 6 hours to remove the 1,6-diaminohexane from the pores, after which it was dried at room temperature to obtain an amine template-free porous material.

Example 4

After adding 11.5 g of phosphoric acid ($H_3PO_4$) and 8.4 g of hydrofluoric acid (HF) to 120 g of deionized water, the mixture was vigorously stirred at room temperature. To this stirred aqueous solution there was added dropwise 18.9 g of titanium tetrachloride ($TiCl_4$), and stirring was continued at room temperature for one hour. Next, 9.45 g of 1,6-diaminohexane ($H_2N$—$C_6H_{12}$—$NH_2$) was added as an amine template, and stirring was continued at room temperature for one hour to obtain a gel-like substance. The molar ratio of the constituent components of the resulting gel-like substance was as follows.

$H_3PO_4:TiCl_4:HF:R:H_2O=1:1:1:0.75:66.6$

Here, R represents the amine template ($H_2N$—$C_6H_{12}$—$NH_2$).

The obtained gel-like substance was heated in an autoclave at 170° C. (443K) for 24 hours. The heated product was filtered and the solid portion obtained by filtering was washed several times with deionized water and dried at 100° C. (373K) for a few hours to obtain an amine template-containing porous material. The amine template-containing porous material was then poured into a mixed solution of 2 g of dilute hydrochloric acid (2 mol %) and 80 ml of ethanol and the mixture was stirred at 60° C. (333K) for 6 hours to remove the 1,6-diaminohexane from the pores, after which it was dried at room temperature to obtain an amine template-free porous material.

Example 5

After adding 11.5 g of phosphoric acid ($H_3PO_4$) and 8.4 g of hydrofluoric acid (HF) to 120 g of deionized water, the mixture was vigorously stirred at room temperature. To this stirred aqueous solution there was added dropwise 18.9 g of titanium tetrachloride ($TiCl_4$), and stirring was continued at room temperature for one hour. Next, 5 g of 1,12-diaminododecane ($H_2N$—$C_{12}H_{24}$—$NH_2$) was added as an amine template, and stirring was continued at room temperature for one hour to obtain a gel-like substance. The molar ratio of the constituent components of the resulting gel-like substance was as follows.

$H_3PO_4:TiCl_4:HF:R:H_2O=1:1:1:0.25:66.6$

Here, R represents the amine template ($H_2N$—$C_{12}H_{24}$—$NH_2$).

The obtained gel-like substance was heated in an autoclave at 140° C. (413K) for 72 hours. The heated product was filtered and the solid portion obtained by filtering was washed several times with deionized water and dried at 100° C. (373K) for a few hours to obtain an amine template-containing porous material. The amine template-containing porous material was then poured into a mixed solution of 2 g of dilute hydrochloric acid (2 mol %) and 80 ml of ethanol and the mixture was stirred at 60° C. (333K) for 6 hours to remove the 1,12-diaminododecane from the pores, after which it was dried at room temperature to obtain an amine template-free porous material.

Photocatalyst of Second Embodiment

Example 6

After adding 11.5 g of phosphoric acid ($H_3PO_4$) and 8.4 g of hydrofluoric acid (HF) to 120 g of deionized water, the mixture was vigorously stirred at room temperature. To this stirred aqueous solution there was added dropwise 18.9 g of titanium tetrachloride ($TiCl_4$), and stirring was continued at room temperature for one hour. Next, 17.5 g of N,N-dimethyltetradecylamine was added as a template, and stirring was continued at room temperature for 3 days to obtain a gel-like substance. The molar ratio of the constituent components of the resulting gel-like substance was as follows.

$H_3PO_4:TiCl_4:HF:R:H_2O=1:1:1:0.5:66.6$

Here, R represents the template (N,N-dimethyltetradecylamine).

After completion of the stirring, the obtained product was filtered and the solid portion obtained by filtering was washed several times with deionized water and dried at 100° C. (373K) for a few hours to obtain a template-containing porous material. The template-containing porous material was then stirred at root temperature for 12 hours in a mixed solution of 2 g of dilute hydrochloric acid (2 mol %) and 80 ml of ethanol. The stirring in the dilute hydrochloric acid and ethanol mixed solution was carried out a total of 3 times to remove the template from the pores. The solid portion was then removed from the dilute hydrochloric acid and ethanol mixed solution by filtration, and heated at 105° C. (378K) for one hour to obtain a template-free porous material. The white template-containing porous material obtained in this example changed to light yellow by the stirring in the dilute hydrochloric acid and ethanol mixed solution, but returned to a white color by the heating at 105° C. (378K).

Example 7

After adding 11.5 g of phosphoric acid ($H_3PO_4$) and 21.8 g of sodium dodecyl sulfate (anionic surfactant) as a template to 120 g of deionized water, the mixture was vigorously stirred at room temperature. To this stirred aqueous solution there was added dropwise 18.9 g of titanium tetrachloride ($TiCl_4$), and then ammonia water (25 wt % aqueous solution) was added for adjustment of the pH to about 4 to obtain a gel-like substance. The molar ratio of the constituent components of the resulting gel-like substance was as follows.

$H_3PO_4:TiCl_4:R:H_2O=1:1:0.75:66.6$

Here, R represents the template (sodium dodecyl sulfate).

The obtained gel-like substance was heated at 60° C. (333K) for 3 days using an autoclave, and the resulting product was filtered. The solid portion obtained by filtering was washed several times with deionized water and dried at room temperature, to obtain a template-containing porous material. Next, a mixed solution of 2 mL of ammonia water (25 wt % aqueous solution) and 150 mL of ethanol was added to 2 g of this template-containing porous material, and the mixture was stirred at 25° C. (298K) for 6 hours to remove the template from the pores. The solid portion was then removed from the mixed solution of ammonia water and ethanol and dried at room temperature to obtain a template-free porous material.

Example 8

A gel-like substance was obtained in the same manner as Example 7, except that the weights of phosphoric acid ($H_3PO_4$) and sodium dodecyl sulfate used were 1.9 g and 14.4 g, respectively. The molar ratio of the constituent components of the resulting gel-like substance was as follows.

$H_3PO_4:TiCl_4:R:H_2O=1:6:0.5:66.6$

Here, R represents the template (sodium dodecyl sulfate).

The gel-like substance was used to obtain a template-containing porous material and a template-free porous material in the same manner as Example 7.

Example 9

A gel-like substance was obtained in the same manner as Example 7, using a mixture of 6.1 g of phosphoric acid and 6.2 g of methylphosphonic acid diethyl ester ($CH_3PO(OC_2H_5)_2$) instead of 11.5 g of phosphoric acid ($H_3PO_4$). The molar ratio of the constituent components of the resulting gel-like substance was as follows.

$H_3PO_4:CH_3PO(OC_2H_5)_2:TiCl_4:R:H_2O= 0.5:0.5:1:0.75:66.6$

Here, R represents the template (sodium dodecyl sulfate).

The gel-like substance was used to obtain a template-containing porous material and a template-free porous material in the same manner as Example 7, except that the autoclave heating was carried out at 45° C. (318K) for 2 days. These porous materials were modified with methyl groups derived from the methylphosphonic acid diethyl ester.

Example 10

After adding 11.5 g of phosphoric acid ($H_3PO_4$) and 16.2 g of dodecyl-p-benzenesulfonic acid (anionic surfactant) as a template to 120 g of deionized water, the mixture was vigorously stirred at room temperature. To this stirred aqueous solution there was added dropwise 18.9 g of titanium tetrachloride (TiCl$_4$), and then ammonia water (25 wt % aqueous solution) was added for adjustment of the pH to about 4 to obtain a gel-like substance. The molar ratio of the constituent components of the resulting gel-like substance was as follows.

H$_3$PO$_4$:TiCl$_4$:R:H$_2$O=1:1:0.5:66.6

Here, R represents the template (dodecyl-p-benzenesulfonic acid).

The obtained gel-like substance was heated at 45° C. (318K) for 1 day using an autoclave, and the resulting product was filtered. The solid portion obtained by filtering was washed several times with deionized water and dried at room temperature, to obtain a template-containing porous material. Next, a mixed solution of 2 mL of ammonia water (25 wt % aqueous solution) and 150 mL of ethanol was added to 2 g of this template-containing porous material, and the mixture was stirred at 25° C. (298K) for 6 hours to remove the template from the pores. The solid portion was then removed from the mixed solution of ammonia water and ethanol and dried at room temperature to obtain a template-free porous material.

Example 11

A gel-like substance was obtained in the same manner as Example 10, except that the weight of phosphoric acid (H$_3$PO$_4$) was 2.85 g. The molar ratio of the constituent components of the resulting gel-like substance was as follows.

H$_3$PO$_4$:TiCl$_4$:R:H$_2$O=1:4:0.5:66.6

Here, R represents the template (dodecyl-p-benzenesulfonic acid).

The gel-like substance was used to obtain a template-containing porous material and a template-free porous material in the same manner as Example 10.

Example 12

A gel-like substance was obtained in the same manner as Example 10, except that the weight of phosphoric acid (H$_3$PO$_4$) was 1.45 g. The molar ratio of the constituent components of the resulting gel-like substance was as follows.

H$_3$PO$_4$:TiCl$_4$:R:H$_2$O=1:8:0.5:66.6

Here, R represents the template (dodecyl-p-benzenesulfonic acid).

The gel-like substance was used to obtain a template-containing porous material and a template-free porous material in the same manner as Example 10.

Example 13

A gel-like substance was obtained in the same manner as Example 10, using a mixture of 6.1 g of phosphoric acid and 6.2 g of methylphosphonic acid diethyl ester (CH$_3$PO(OC$_2$H$_5$)$_2$) instead of 11.5 g of phosphoric acid (H$_3$PO$_4$). The molar ratio of the constituent components of the resulting gel-like substance was as follows.

H$_3$PO$_4$:CH$_3$PO(OC$_2$H$_5$)$_2$:TiCl$_4$:R:H$_2$O=0.5:0.5:1:0.5:66.6

Here, R represents the template (dodecyl-p-benzenesulfonic acid).

The gel-like substance was used to obtain a template-containing porous material and a template-free porous material in the same manner as Example 10. These porous materials were Modified with methyl groups derived from the methylphosphonic acid diethyl ester.

Photocatalyst of Third Embodiment

Example 14

To 70 ml of a mixed solution of isopropanol and water (isopropanol/water weight ratio: 1/1) there were added 23.4 g of 1,12-diaminododecane as a template and 11.5 g of phosphoric acid (H$_3$PO$_4$), and the mixture was vigorously stirred.

Next, 77.2 g of a mixture of zirconium tetrapropoxide (Zr(OPr)$_4$: Pr representing a propyl group) and isopropanol (zirconium tetrapropoxide/isopropanol weight ratio: 1/1) was slowly added to the above-mentioned mixture, and after further adding 170 ml of water, hydrothermal treatment was carried out at 60° C. (333K) for 1 day to obtain a gel-like substance. The molar ratio of the constituent components of the resulting gel-like substance was as follows.

Zr(OPr)$_4$:H$_3$PO$_4$:R:H$_2$O=1:1:0.25:100

Here, R represents the template (1,12-diaminododecane).

The obtained gel-like substance was filtered, and the obtained solid portion was washed with water and dried at room temperature to obtain a template-containing porous material. A 2 g portion of this template-containing porous material was added to a mixed solution of 2 g of dilute hydrochloric acid (2 mol %) and 100 ml of ethanol, and the mixture was subjected to reflux at 40° C. (313K) for 4 hours to remove the template and obtain the target porous material.

The porous materials (photocatalysts) obtained in Examples 1–14 were then subjected to X-ray diffraction, fluorescent X-ray diffraction, infrared absorption measurement, $^{31}$P MAS NMR spectroscopy, nitrogen absorption, moisture absorption, ICP emission spectroscopy, scanning electron microscope observation, $^{13}$C MAS NMR spectroscopy, ultraviolet/visible absorption spectroscopy, ion-exchange capacity measurement and water decomposition by light irradiation. The details are explained below.

X-ray Diffraction

An RAD-B (product of Rigaku Co., X-rays: CuKα rays) was used for powder X-ray diffraction of the amine template-containing porous materials obtained in Examples 1 and 3–5, the amine template-free porous material obtained in Example 2 and the porous materials obtained in Examples 6, 9 and 10–13.

Figure 6:
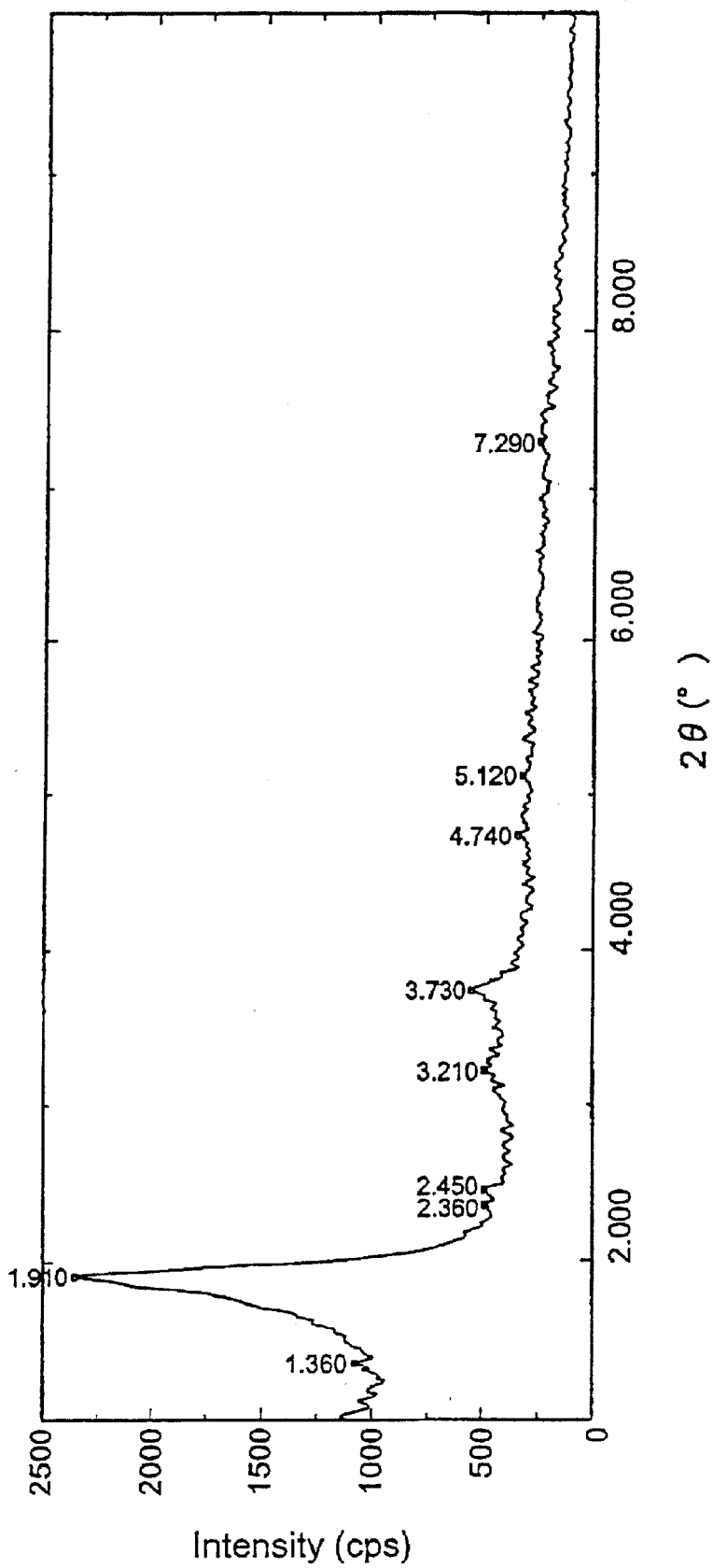
FIG. 6 is a graph showing the X-ray diffraction pattern for the template-containing porous material obtained in Example 6.
Figure 7:
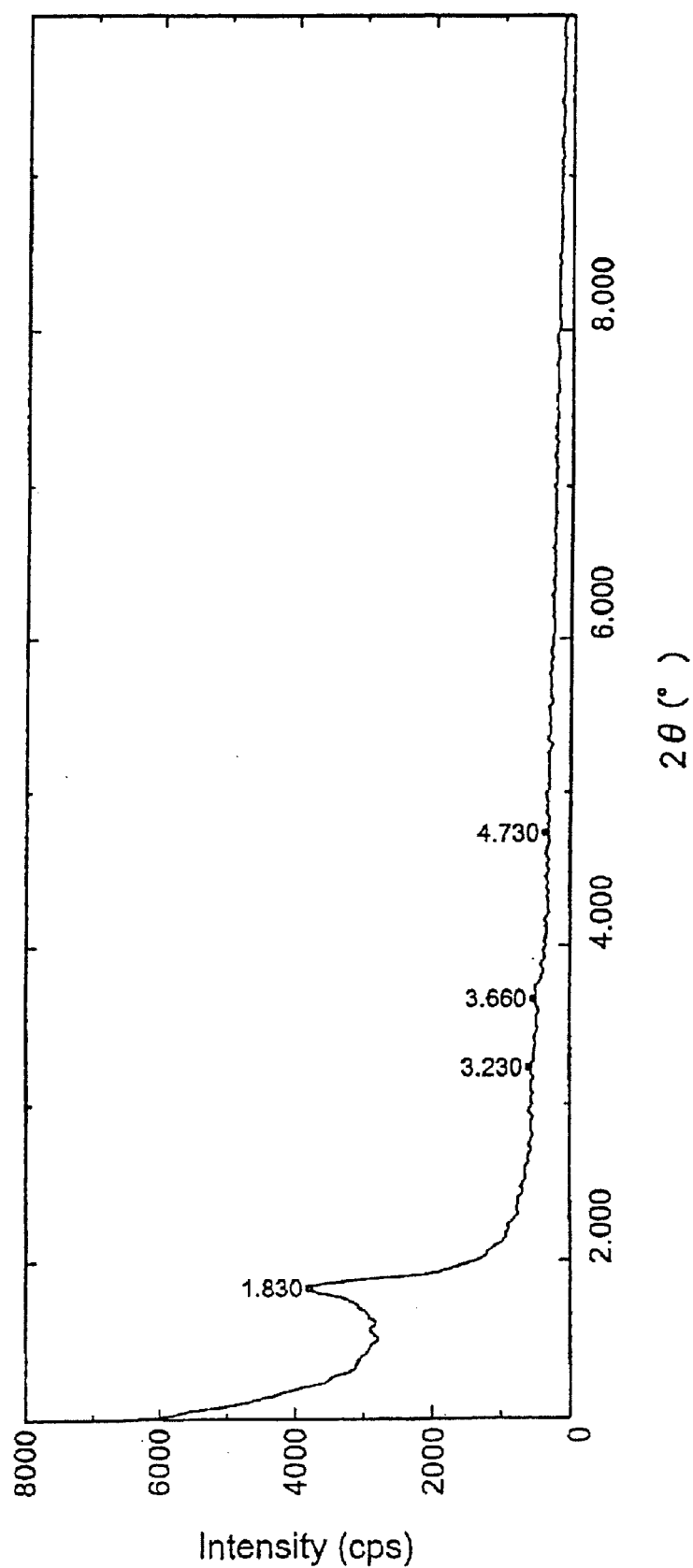
FIG. 7 is a graph showing the X-ray diffraction pattern for the template-free porous material obtained in Example 6.
Figure 8:
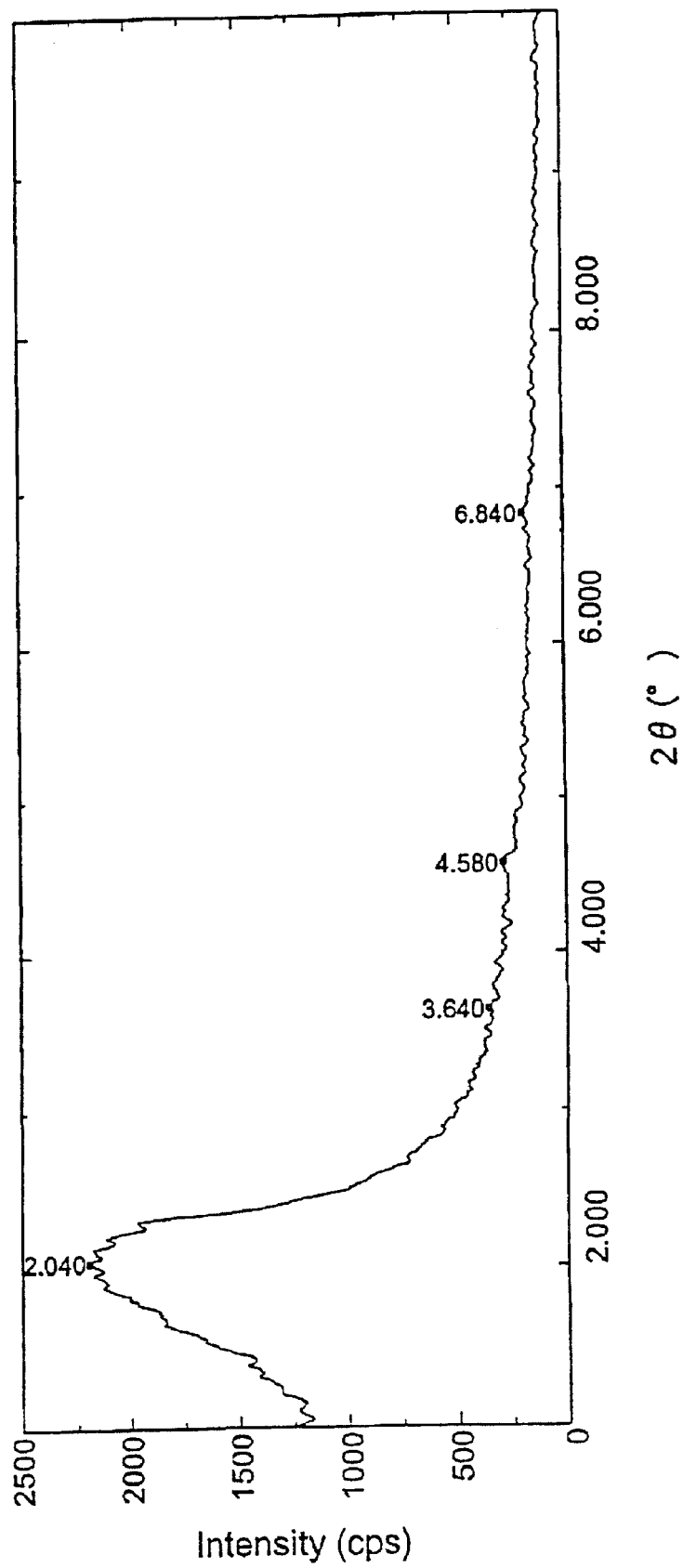
FIG. 8 is a graph showing the X-ray diffraction pattern for the template-containing porous material obtained in Example 9.

FIGS. 1–5 show the X-ray diffraction patterns for the porous materials of Examples 1–5, respectively. FIGS. 6, 7 and 8 show the X-ray diffraction patterns for the template-containing porous material and template-free porous material obtained in Example 6 and the template-containing porous material obtained in Example 9.

Figure 9:
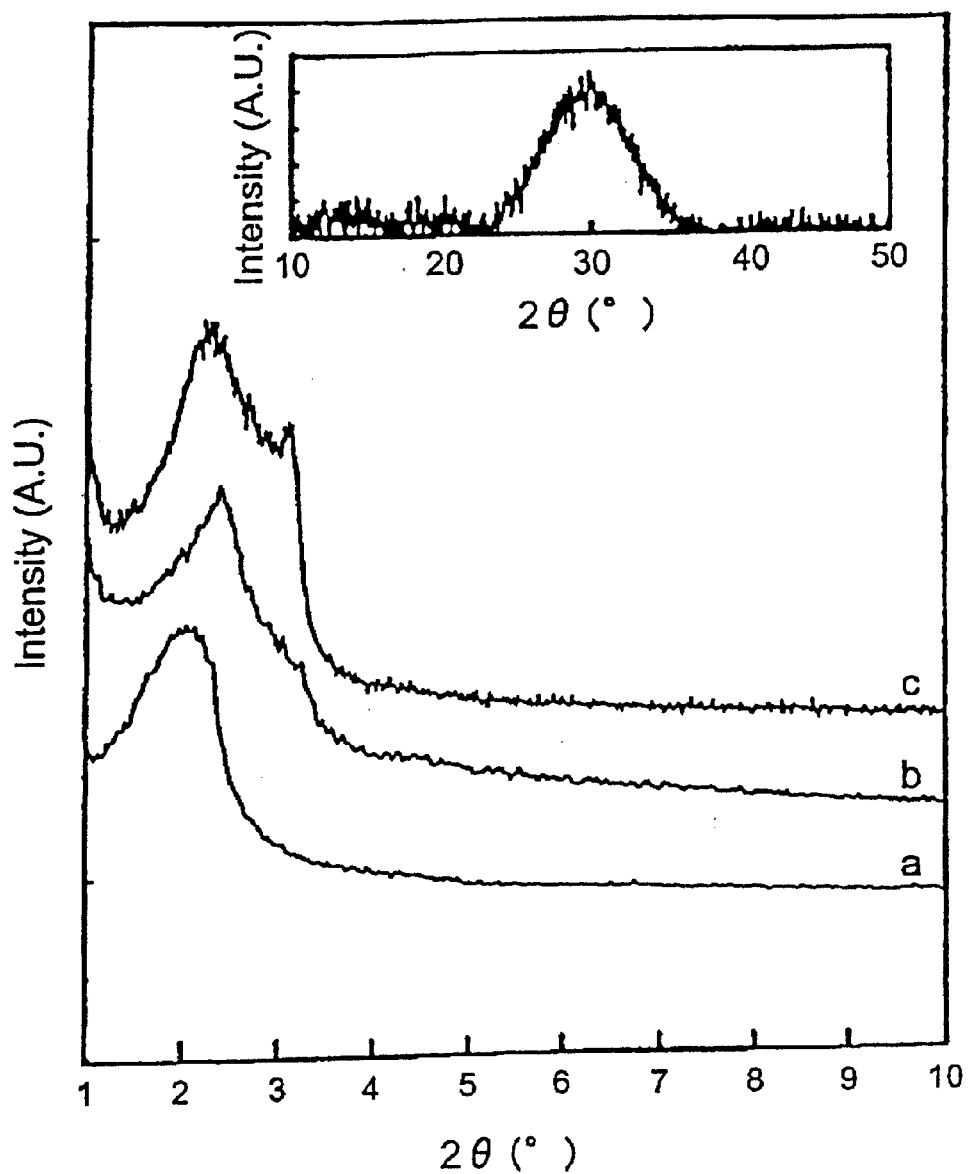
FIG. 9 is a graph showing the X-ray diffraction patterns for the template-containing porous materials obtained in Examples 9, 10 and 12, and the wide-angle X-ray diffraction pattern for the template-containing porous material obtained in Example 13.

FIG. 9 shows the x-ray diffraction pattern for the template-containing porous material obtained in Example 9 (pattern "a" in FIG. 9), the X-ray diffraction pattern for the template-containing porous material obtained in Example 10 (pattern "c" in FIG. 9) and the X-ray diffraction pattern for the template-containing porous material obtained in Example 12 (pattern "b" in FIG. 9).

As seen in FIGS. 1–5, it was confirmed that the produced porous materials were crystalline on the atomic level. FIG. 6 shows peaks at 1.910°, 3.210°, 3.730° and 4.740° corresponding to the face indices (100), (110), (200) and (210), thus demonstrating that the porous material obtained in Example 6 has a two-dimensional hexagonal pore arranged structure.

As a result of the X-ray diffraction of the template-containing porous materials obtained in Examples 10–13, it was found that at least 2 peaks appear in a wide-angle region (diffraction angle of 10° or larger) in the X-ray diffraction patterns of Examples 10–13. A representative example is the X-ray diffraction pattern of the wide-angle region for the template-containing porous material of Example 13, shown in FIG. 9. The fact that at least 2 peaks appear in a wide-angle of 10° or larger in this X-ray diffraction pattern indicates that the pore walls serving as partitions between adjacent pores are crystalline.

Next, an RINT-2200 (product of Rigaku Co., X-rays: CuKα rays) was used for powder X-ray diffraction of the template-containing porous material and template-removed porous material obtained in Example 14.

Figure 10:
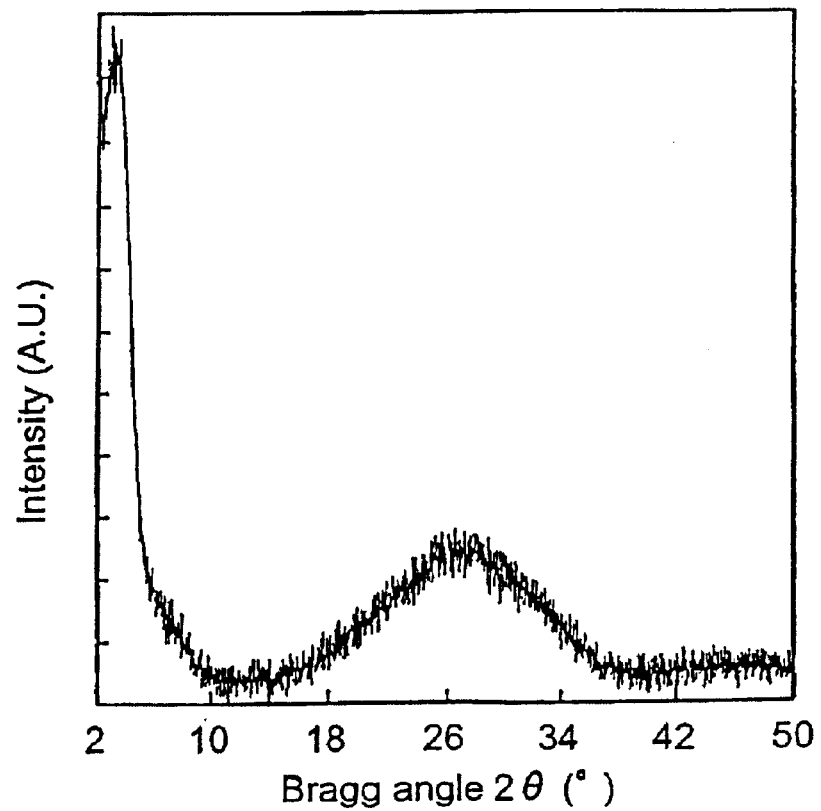
FIG. 10 is a graph showing the X-ray diffraction pattern for the template-removed porous material obtained in Example 14 (Bragg angle 2θ=2–50°).
Figure 11:
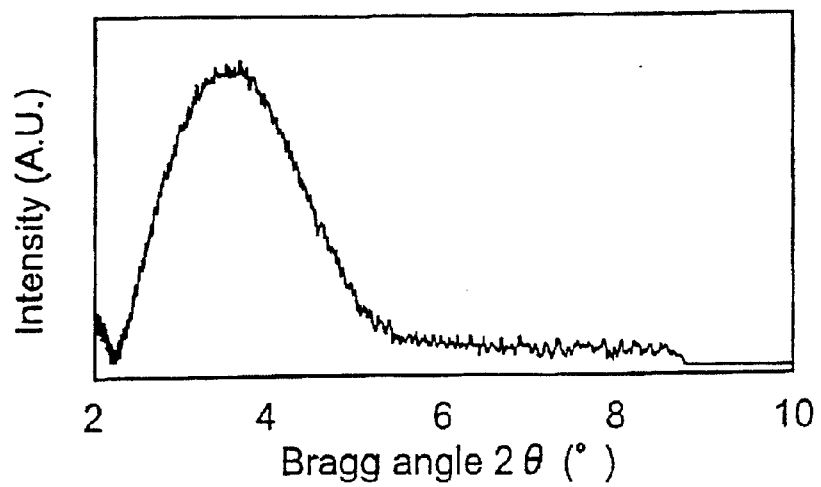
FIG. 11 is a graph showing the X-ray diffraction pattern for the template-removed porous material obtained in Example 14 (Bragg angle 2θ=2–10°).

FIGS. 10 and 11 are graphs showing the X-ray diffraction patterns for each of the template-removed porous materials, where FIG. 10 is a diffraction pattern for the range of Bragg angle 2θ=2–50°, and FIG. 11 is a magnified view of the 2θ=2–10° portion of FIG. 10. In these graphs, a diffraction peak is seen in the low angle range of 2θ<10°, but no characteristic diffraction peak is seen in the range of 2θ=10–50°, thus confirming that the obtained porous material has only a long periodic structure and its pore walls have an amorphous structure. The $d_{100}$ of the template-containing porous material is 2.65 nm, while the $d_{100}$ of the template-removed porous material is 2.42 nm.

Fluorescent X-ray Analysis

Fluorescent X-ray analysis of the template-removed porous material obtained in Example 14 demonstrated that the chemical composition was $Zr_1P_1O_{4.5}$.

Infrared Absorption Spectroscopy

Figure 12:
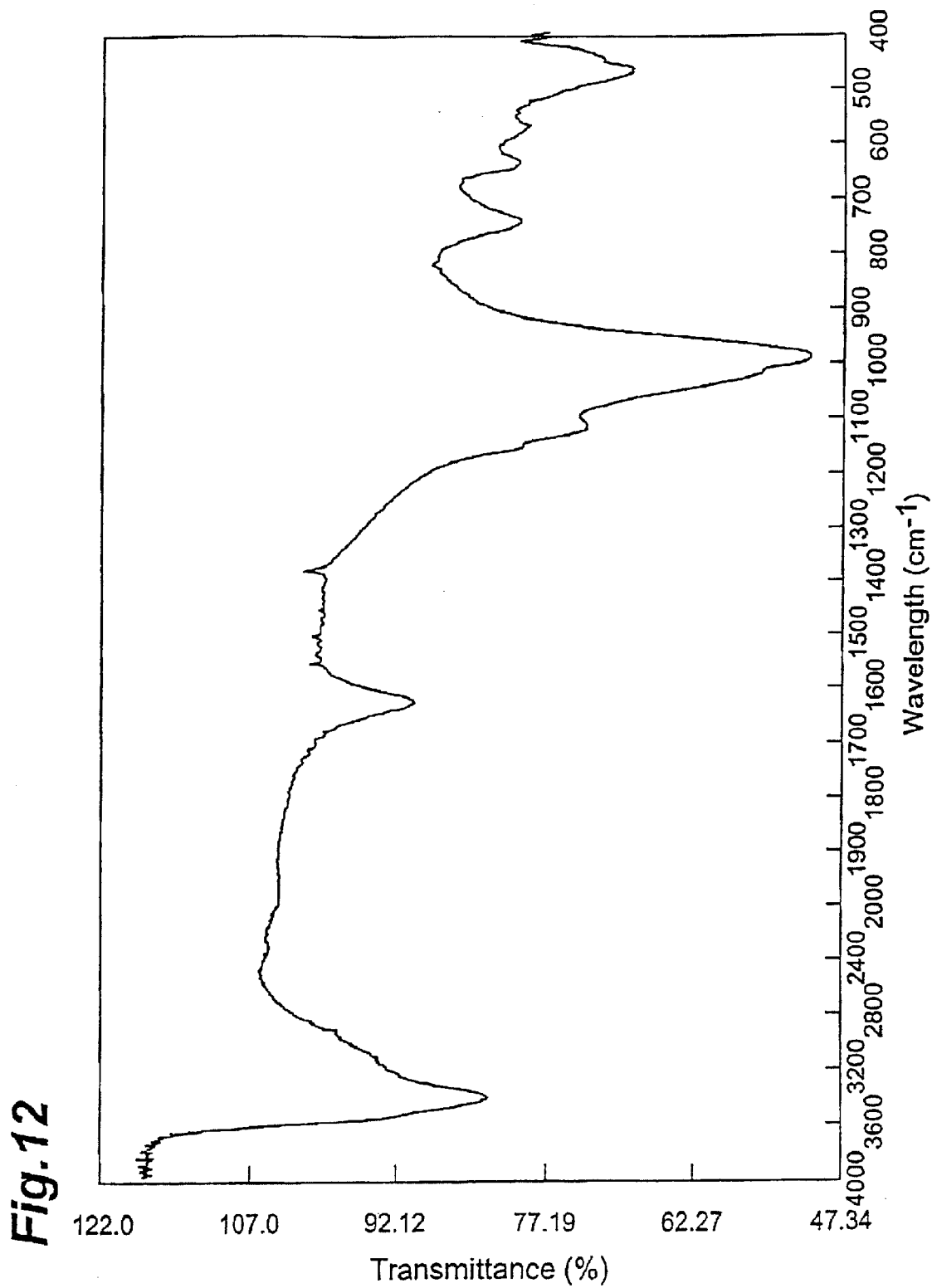
FIG. 12 is a graph showing the infrared absorption spectrum for the amine template-free porous material obtained in Example 2.

An FT/IR-5M (JASCO Corp.) was used for measurement of the infrared absorption spectrum of the amine template-free porous materials obtained in Examples 1–5. As a result, since all of the amine template-free porous materials obtained in Examples 1–5 exhibited absorption at 980 $cm^{-1}$ based on Ti—O—P stretching vibration, it was demonstrated that the amine template-free porous materials obtained in Examples 1–5 had basic frameworks with titanium atoms and phosphorus atoms bonded by way of oxygen atoms. FIG. 12 shows the infrared absorption spectrum for the amine template-free porous material obtained in Example 2. In the infrared absorption spectrum shown in FIG. 12, in addition to the absorption at 980 $cm^{-1}$ based on Ti—O—P stretching vibration there also appear absorption near 3340 $cm^{-1}$ based on —OH stretching vibration and absorption near 1640 $cm^{-1}$ based on the presence of water.

The infrared absorption spectra of the template-containing porous materials or template-free porous materials obtained in Examples 6–13 were also measured in the same manner as described above. As a result, since absorption near 980 $cm^{-1}$ based on Ti—O—P stretching vibration was observed in all of the porous materials obtained in Examples 6–13, it was demonstrated that the porous materials obtained in Examples 6–13 had basic frameworks with titanium atoms and phosphorus atoms bonded by way of oxygen atoms.

Figure 13:
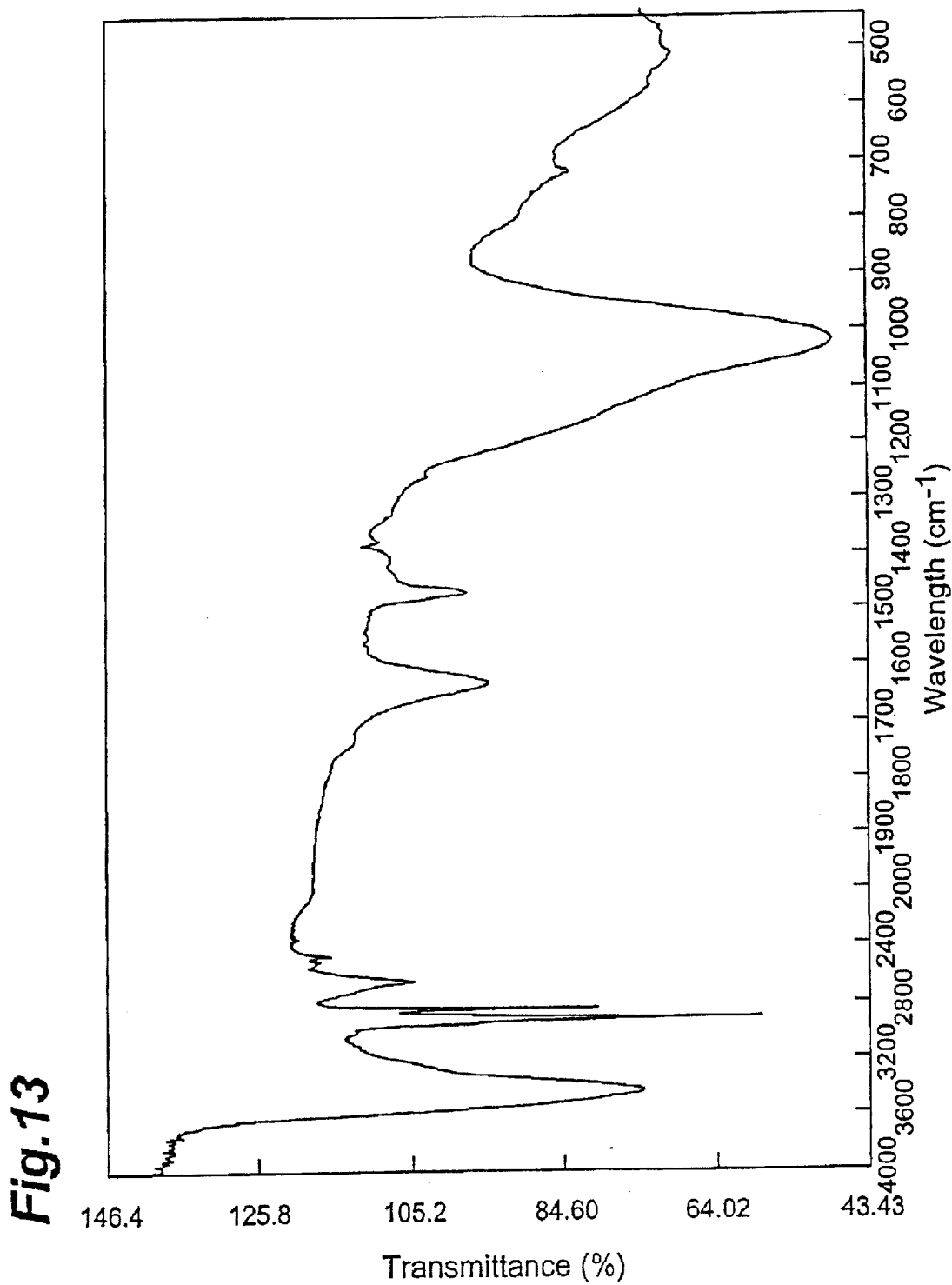
FIG. 13 is a graph showing the infrared absorption spectrum for the template-containing porous material obtained in Example 6.

FIG. 13 shows the infrared absorption spectrum for the template-containing porous material obtained in Example 6. The absorption at 3340 $cm^{-1}$, 2930 $cm^{-1}$ and 2850 $cm^{-1}$ is believed to correspond to —O—H bonds in the basic framework of the porous material, and the absorption at 1640 $cm^{-1}$ is believed to correspond to —C—H bonds of the template.

Figure 14:
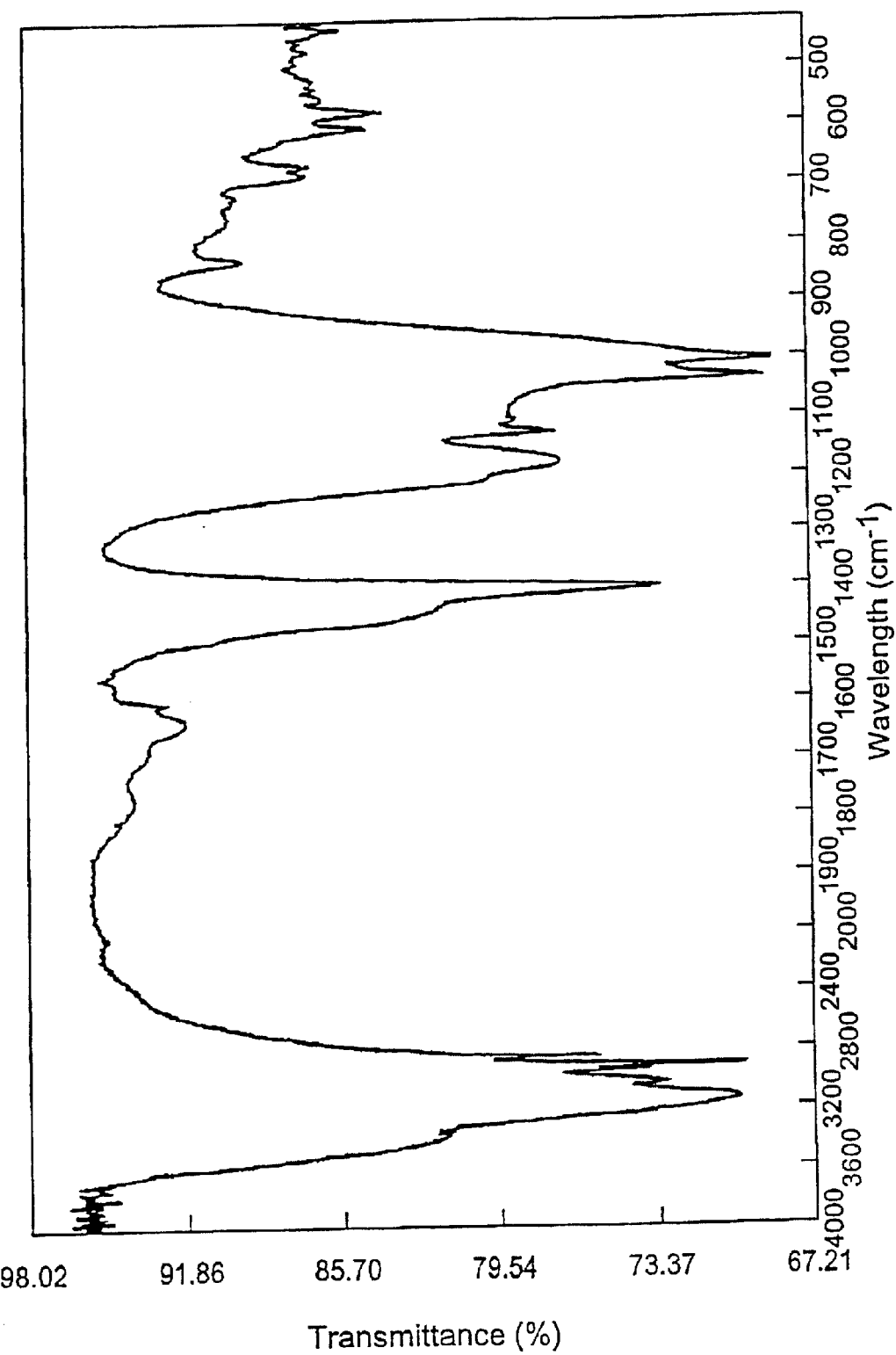
FIG. 14 is a graph showing the infrared absorption spectrum for the template-containing porous material obtained in Example 10.
Figure 15:
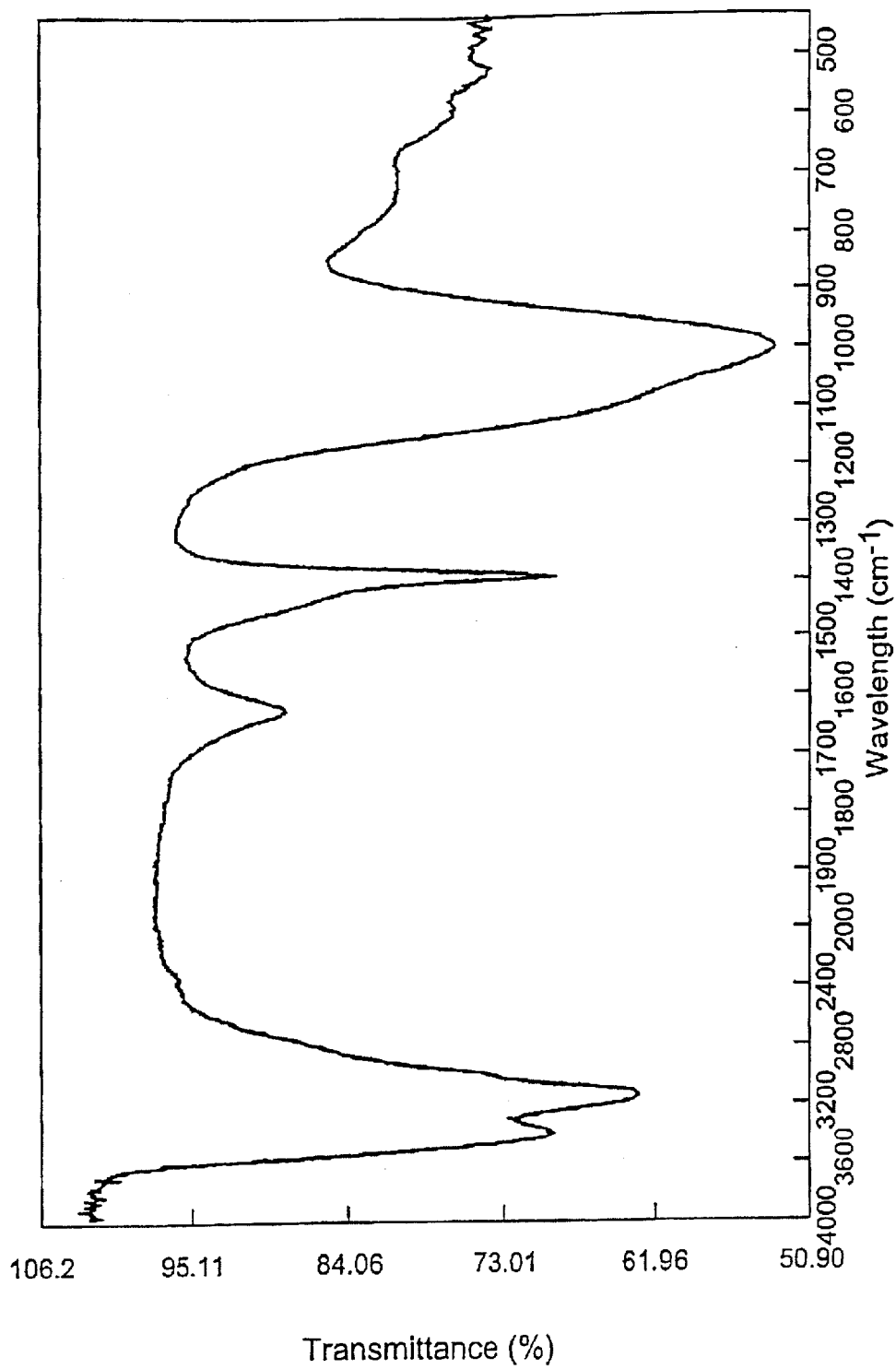
FIG. 15 is a graph showing the infrared absorption spectrum for the template-free porous material obtained in Example 10.

FIGS. 14 and 15 show, respectively, the infrared absorption spectrum for the template-containing porous material obtained in Example 10 and the infrared absorption spectrum for the template-free porous material obtained in Example 10. Since the absorption at 1175 $cm^{-1}$, 1125 $cm^{-1}$, 1035 $cm^{-1}$ and 1005 $cm^{-1}$ in FIG. 14 is not seen in FIG. 15, it was concluded that these absorption peaks are based on the —$SO_3H$ groups of dodecyl-p-benzenesulfonic acid, and that the dodecyl-p-benzenesulfonic acid was eliminated by treatment with the mixed solution of ammonia water and ethanol.

The absorption near 3000 $cm^{-1}$ in FIGS. 14 and 15 is attributed to OH. Although absorption at 3150 $cm^{-1}$ and 3400 $cm^{-1}$ is seen in FIG. 15 which shows the infrared absorption for the template-removed porous materials, these are believed to be due to free $OH^-$ and to OH groups, respectively. The absorption due to free $OH^-$ disappears upon ion exchange with $Cl^-$ ion, and reappears upon ion exchange with ammonia water.

Figure 16:
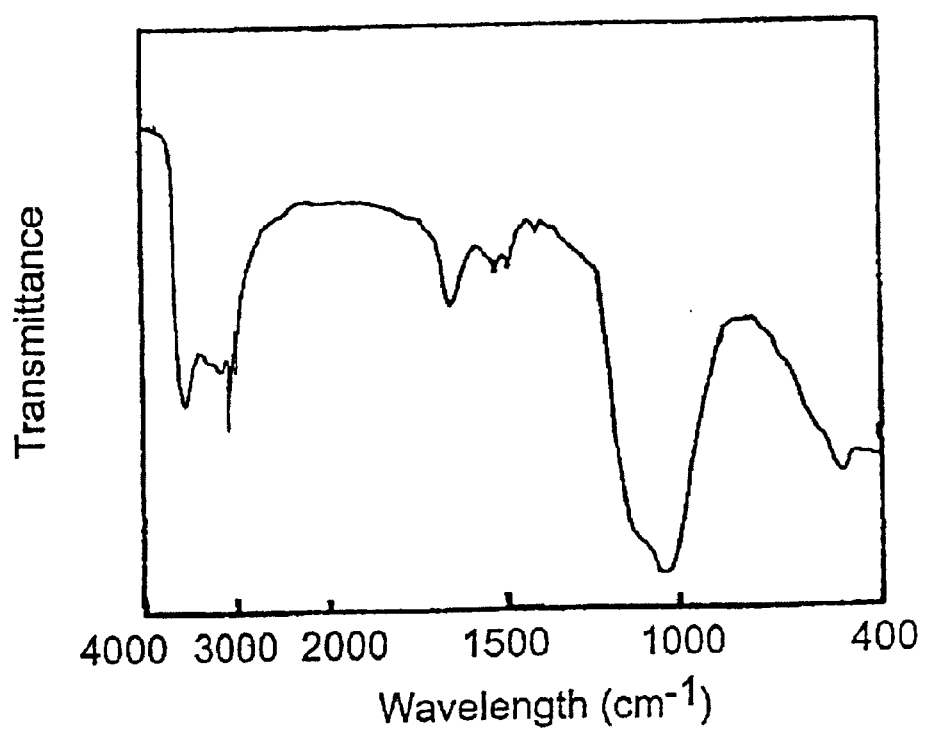
FIG. 16 is a graph showing the infrared absorption spectrum for the template-containing porous material obtained in Example 14.

In addition, the FT-IR spectra of the template-containing porous material and template-removed porous material obtained in Example 14 were also measured in the manner described above. FIG. 16 shows the FT-IR spectrum for the template-containing porous material obtained in Example 14. In FIG. 16, the absorption at 3420 $cm^{-1}$ is due to O—H stretching vibration in P—OH, the absorption at 1630 $cm^{-1}$ is due to deformation vibration of adsorbed water, and the absorption at 1120–1020 $cm^{-1}$ and 525 $cm^{-1}$ is due to vibration of the P—O—Zr framework. The absorption at 3200–3040 $cm^{-1}$ seen in FIG. 16 is due to C—H stretching vibration, the absorption at 2920–2850 $cm^{-1}$ is due to N—H stretching vibration and the absorption at 1510–1390 $cm^1$ is due to N—H deformation vibration; however, these absorptions were not seen in the spectrum for the template-removed porous material.

$^{31}P$ MAS NMR Spectroscopy

An MSL-300WB (Bruker Co.) was used to measure the $^{33}P$ MAS NMR spectra ($^{31}P$-NMR spectra by the magic angle rotation method) for the amine template-containing porous materials obtained in Examples 1 and 3–5 and the amine template-free porous material obtained in Example 2. As a result, since signals near −26 ppm based on $P(OTi)_4$ were observed in all of the porous materials obtained in Examples 1 to 5, it was demonstrated that the porous materials obtained in Examples 1 to 5 had basic frameworks with titanium atoms and phosphorus atoms bonded by way of oxygen atoms.

Figure 17:
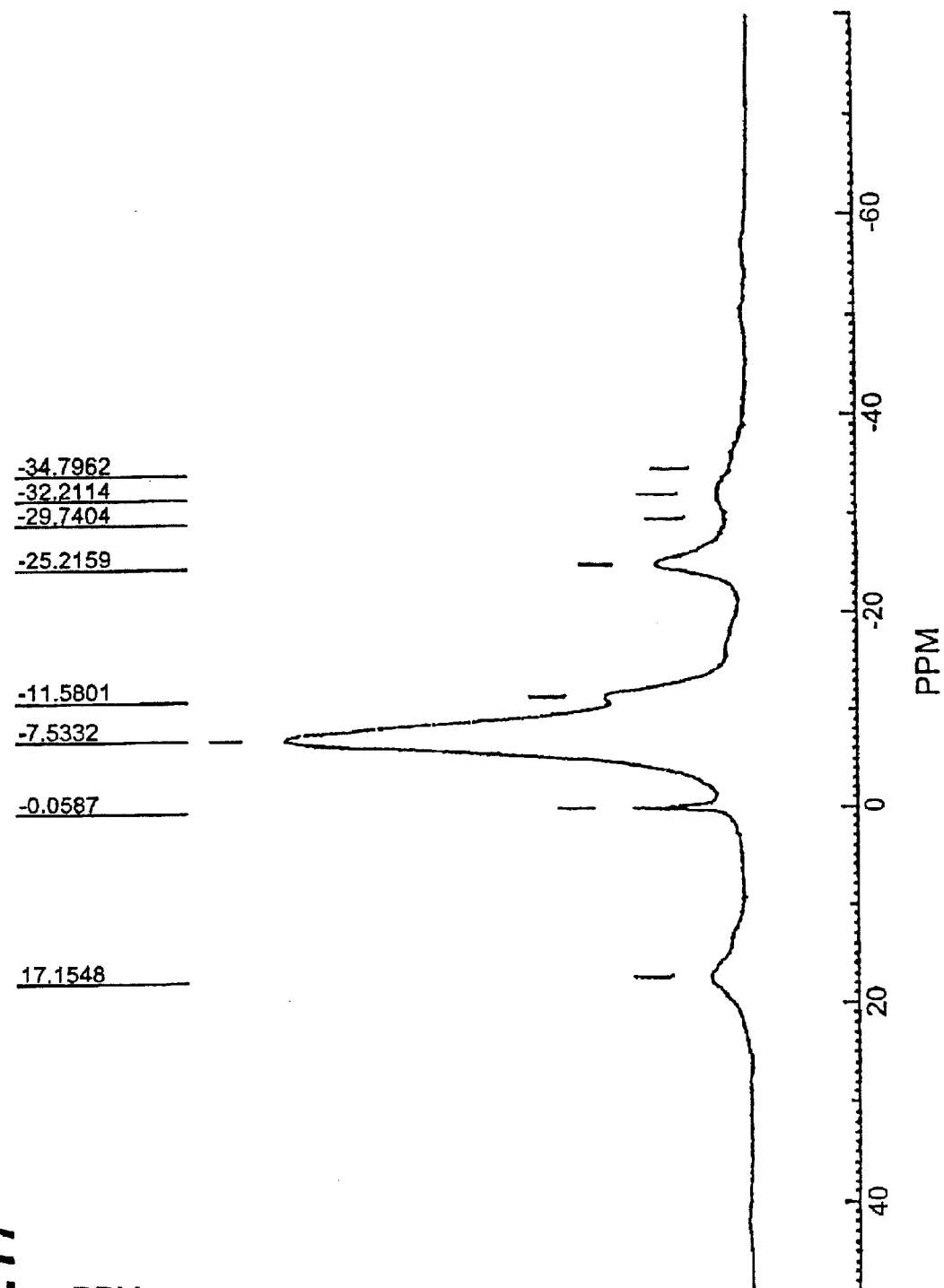
FIGS. 17 is a graph showing the $^{31}P$ MAS NMR spectrum for the amine template-containing porous material obtained in Example 4.
Figure 18:
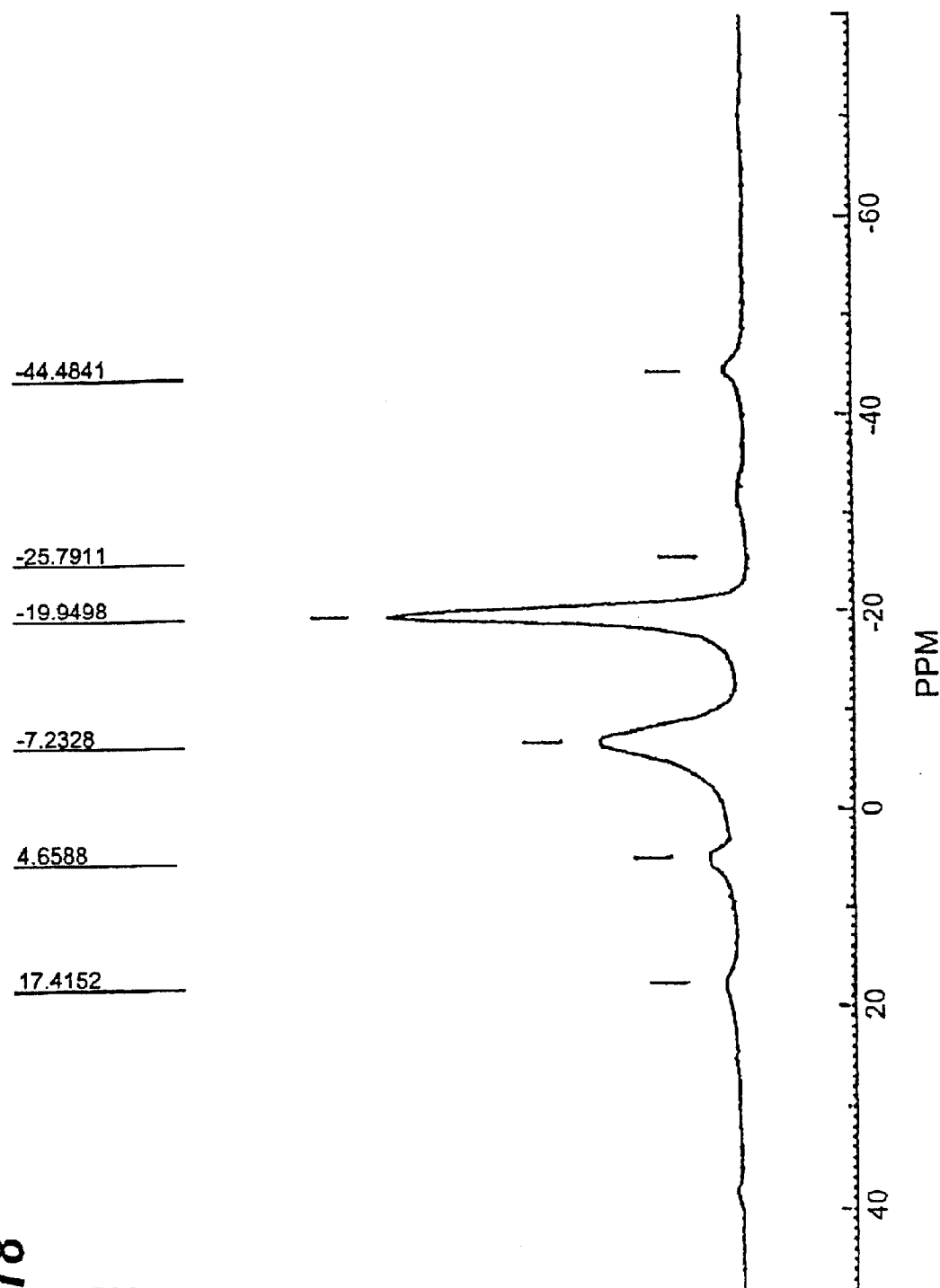
FIG. 18 is a graph showing the $^{31}P$ MAS NMR spectrum for the amine template-containing porous material obtained in Example 5.

FIG. 17 shows a $^{31}P$ MAS NMR spectrum for the amine template-containing porous material obtained in Example 4, and FIG. 18 shows a $^{31}P$ MAS NMR spectrum for the amine template-containing porous material obtained in Example 5. The signal near −25.2 ppm in FIG. 17 is attributed to $P(OTi)_4$, and the signal near −11.6 ppm, the signal near −7.5 ppm and the signal near 0 ppm are attributed to $P(OH)_2(OTi)_2$, $P(OH)_3(OTi)$ and unreacted $H_3PO_4$, respectively. The signal near −25.8 ppm in FIG. 18 is attributed to $P(OTi)_4$, and the signal near −19.9 ppm and the signal near 7.2 ppm are attributed to $P(OH)(OTi)_3$ and $P(OH)_3(OTi)$, respectively.

The $^{31}P$ MAS NMR spectra ($^{31}P$-NMR spectra by the magic angle rotation method) for the template-containing porous materials obtained in Examples 6 to 13 were measured in the same manner as described above. As a result, since signals near −25 ppm based on $P(OTi)_4$ were observed in all of the template-containing porous materials obtained in Examples 6 to 13, it was demonstrated that the porous materials obtained in Examples 6 to 13 had basic frameworks with titanium atoms and phosphorus atoms bonded by way of oxygen atoms.

Figure 19:
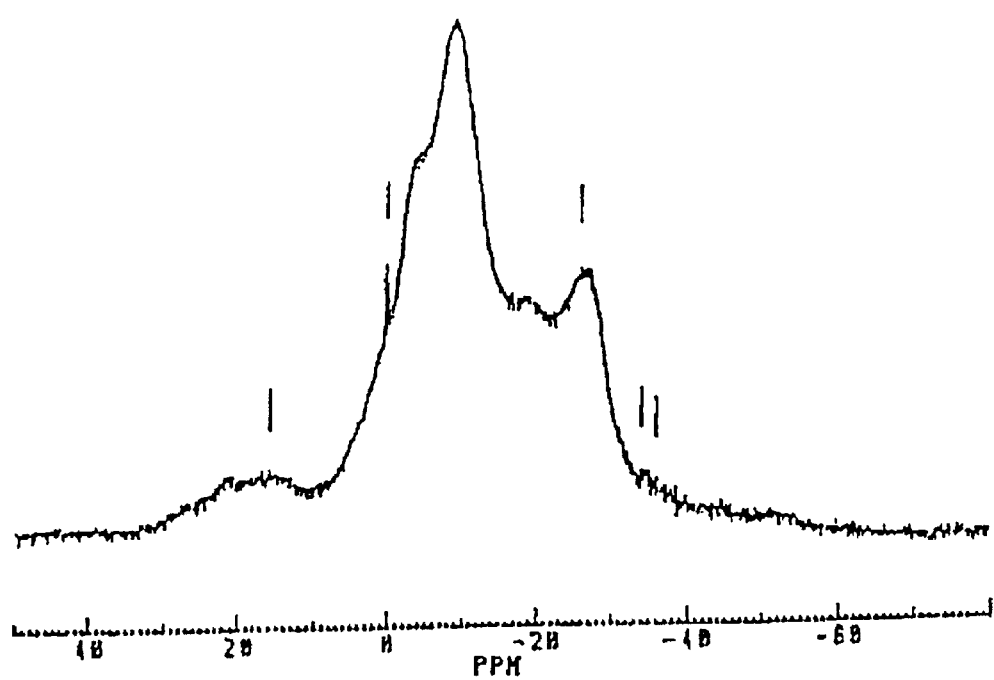
FIG. 19 is a graph showing the $^{31}P$ MAS NMR spectrum for the template-containing porous material obtained in Example 6.

FIG. 19 shows a $^{31}P$ MAS NMR spectrum for the template-containing porous material obtained in Example 6. The signal near −26.0 ppm in FIG. 19 is attributed to $P(OTi)_4$, while the signal near −20.0 ppm, the signal near −9.3 ppm and the signal near −5.2 ppm are attributed to P(OH)(OTi)$_3$, P(OH)$_2$(OTi)$_2$ and P(OH)$_3$(OTi), respectively. The signal near 0.123 ppm is attributed to unreacted H$_3$PO$_4$.

Figure 20:
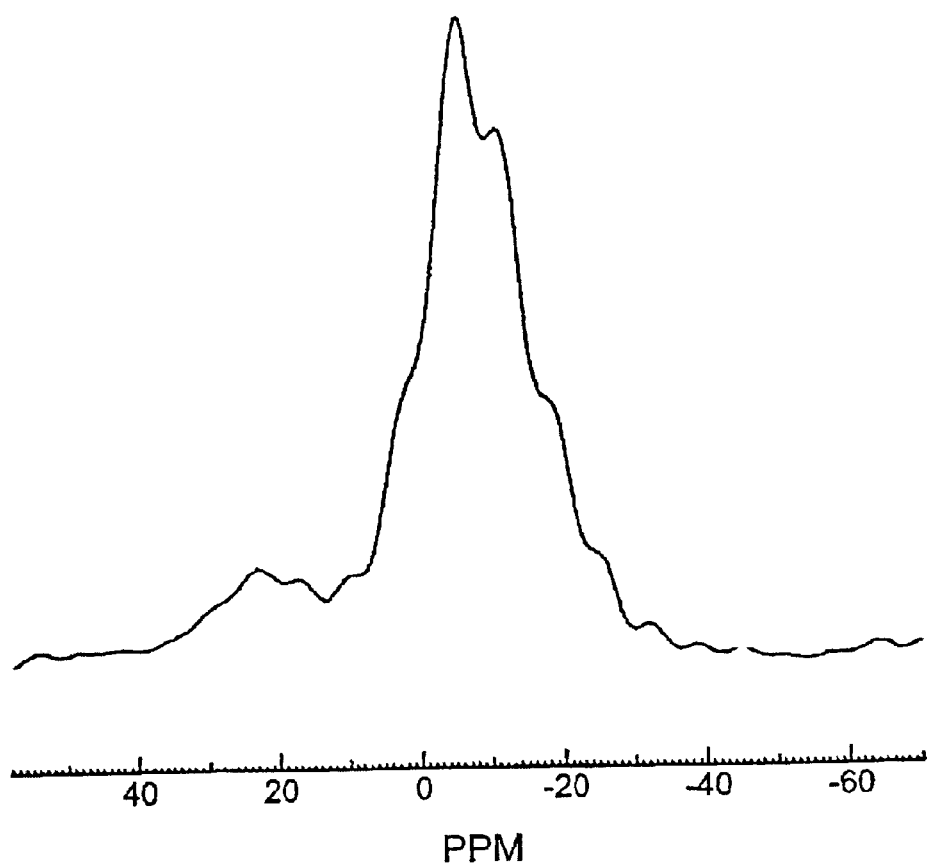
FIG. 20 is a graph showing the $^{31}P$ MAS NMR spectrum for the template-containing porous material obtained in Example 7.
Figure 21:
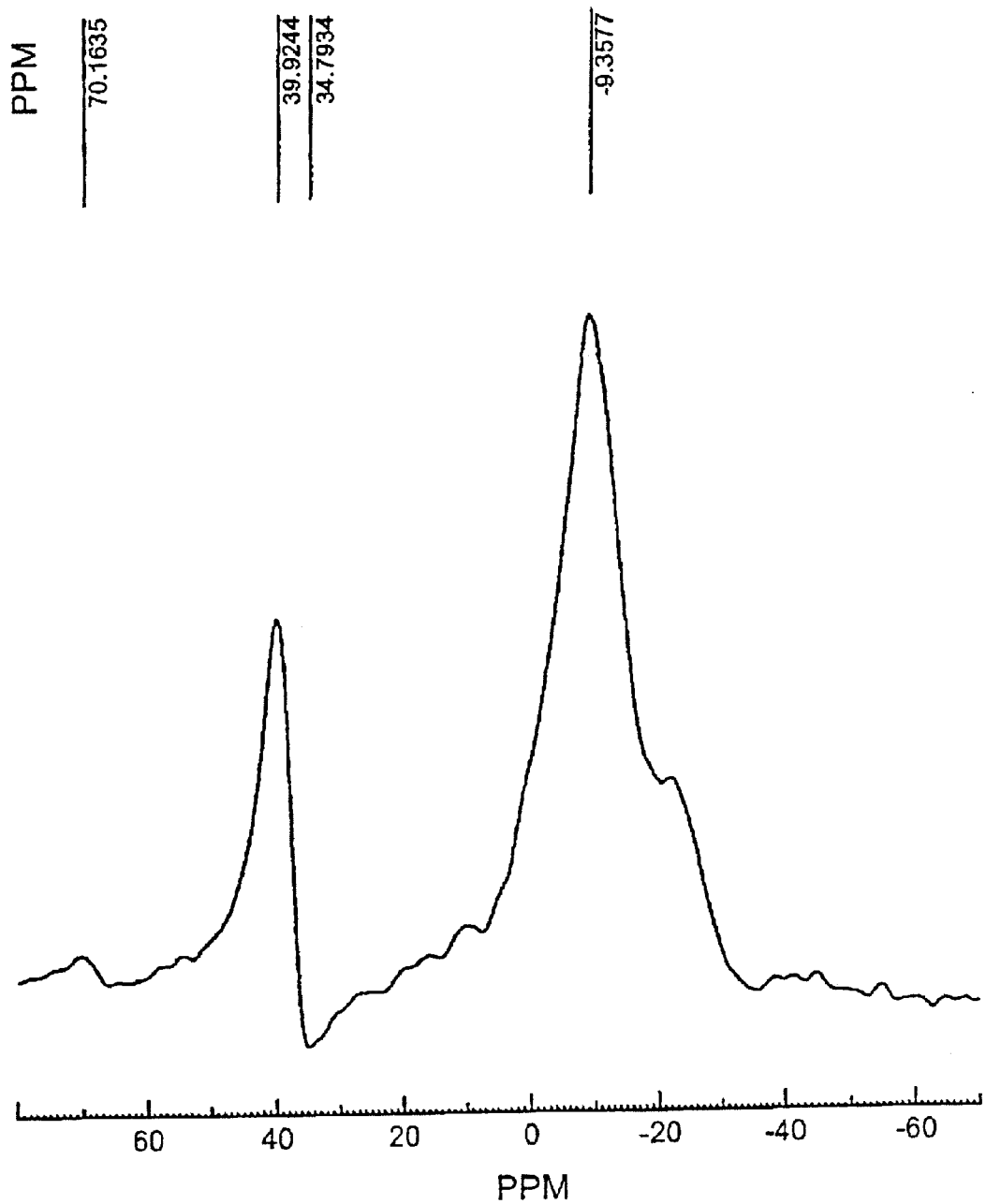
FIG. 21 is a graph showing the $^{31}P$ MAS NMR spectrum for the template-containing porous material obtained in Example 9.

FIGS. 20 and 21 show the $^{31}$P MAS NMR spectra for the template-containing porous materials obtained in Examples 7 and 9, respectively. The signal near 7.2 ppm in FIG. 20 is attributed to phosphonium cation (P$^+$(OTi)$_4$). The signal near 40 ppm in FIG. 21 is attributed to CH$_3$P(OTi)$_3$.

Figure 22:
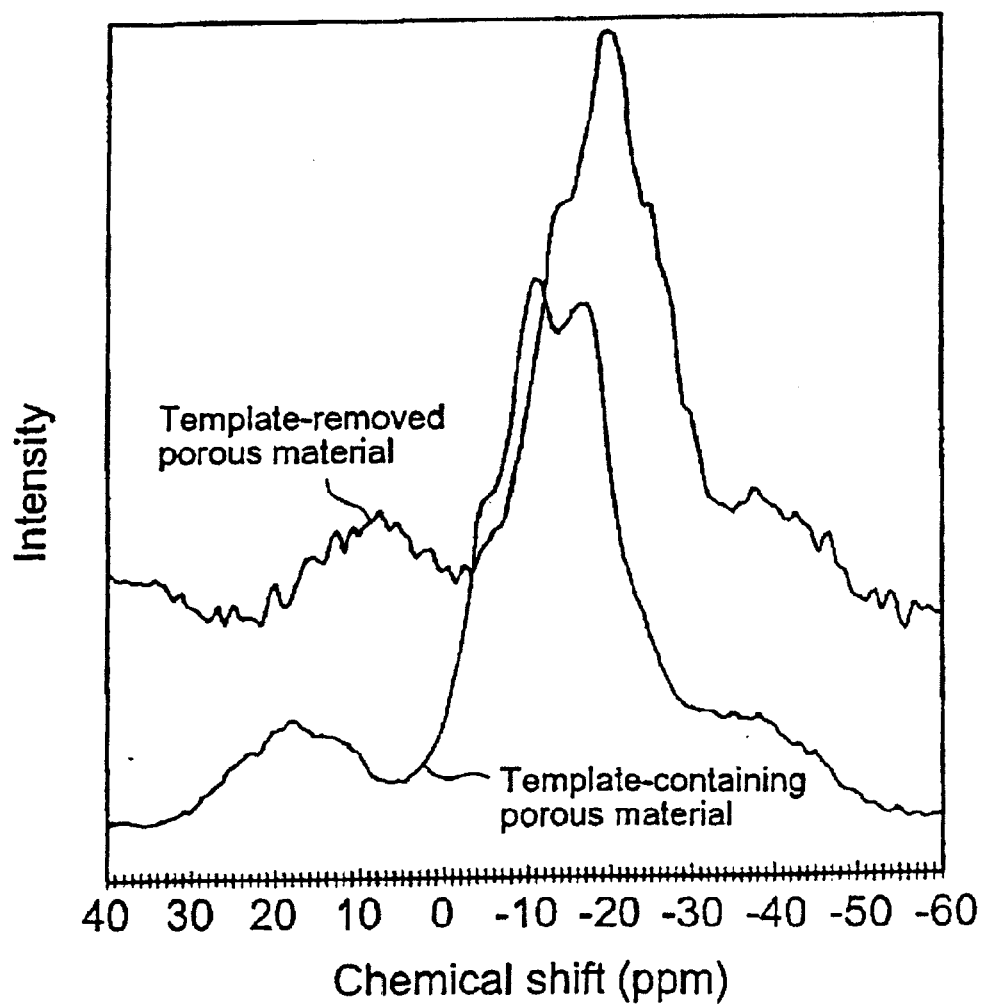
FIG. 22 is a graph showing the $^{31}P$ MAS NMR spectra for the template-containing porous material and template-removed porous material obtained in Example 14.

The $^{31}$P MAS NMR spectra of the template-containing porous material and template-removed porous material obtained in Example 14 were measured using the same measuring instruments mentioned above, with phosphoric acid (H$_3$PO$_4$) as the standard sample. The results are shown in FIG. 22. Signals based on P(OZr)$_4$ were also detected near −30 to −5 ppm in both of the spectra in FIG. 22, thus confirming that these porous materials had basic frameworks with zirconium atoms and phosphorus atoms bonded by way of oxygen atoms. In the spectrum for the template-containing porous material shown in FIG. 22, the signal near −7.0 ppm, the signal near −10.8 ppm and the signal near −16.5 ppm are due to phosphorus atoms with 4-coordinated structures. In the spectrum for the template-removed porous material, there can be seen a chemical shift from near −10.8 ppm to near −12.6 ppm and a chemical shift from near −16.5 ppm to near −20.0 ppm, while no signal near −7.0 ppm is found. These chemical shifts and signal disappearance are attributed to protonation from P—O$^-$NR$_4^+$ to P—O$^-$H$^+$ by removal of the template.

Nitrogen Adsorption

The amine template-tree porous materials obtained in Examples 1 to 5 were cooled to liquid nitrogen temperature (−196° C.), nitrogen gas was introduced, and the adsorption was determined by the volume method. The pressure of the introduced nitrogen gas was then gradually increased and the adsorption of nitrogen gas at each equilibrium pressure was plotted to obtain a nitrogen adsorption isotherm. When the BET specific surface area was determined from this adsorption isotherm, the values of the BET specific surface areas of the amine template-free porous materials of Examples 1 to 5 were small (for example, 132 m$^2$g$^{-1}$ for the amine template-free porous material obtained in Example 2), and the pore sizes were believed to be close to the diameter of nitrogen (micropores smaller than 1.5 nm diameter).

Next, the adsorption, nitrogen adsorption isotherm, pore size distribution curve and median pore size were determined for Examples 6 to 13 in the manner described above. As a result, all of the median pore sizes of the template-free porous materials obtained in Examples 6 to 13 were within the range of 1.5–30 nm. For all of the template-free porous materials obtained in Examples 5 to 13, the value of the total volume of pores with a diameter in the range of ±40% of the median pore diameter divided by the total pore volume was within the range of 0.4–1.

Figure 23:
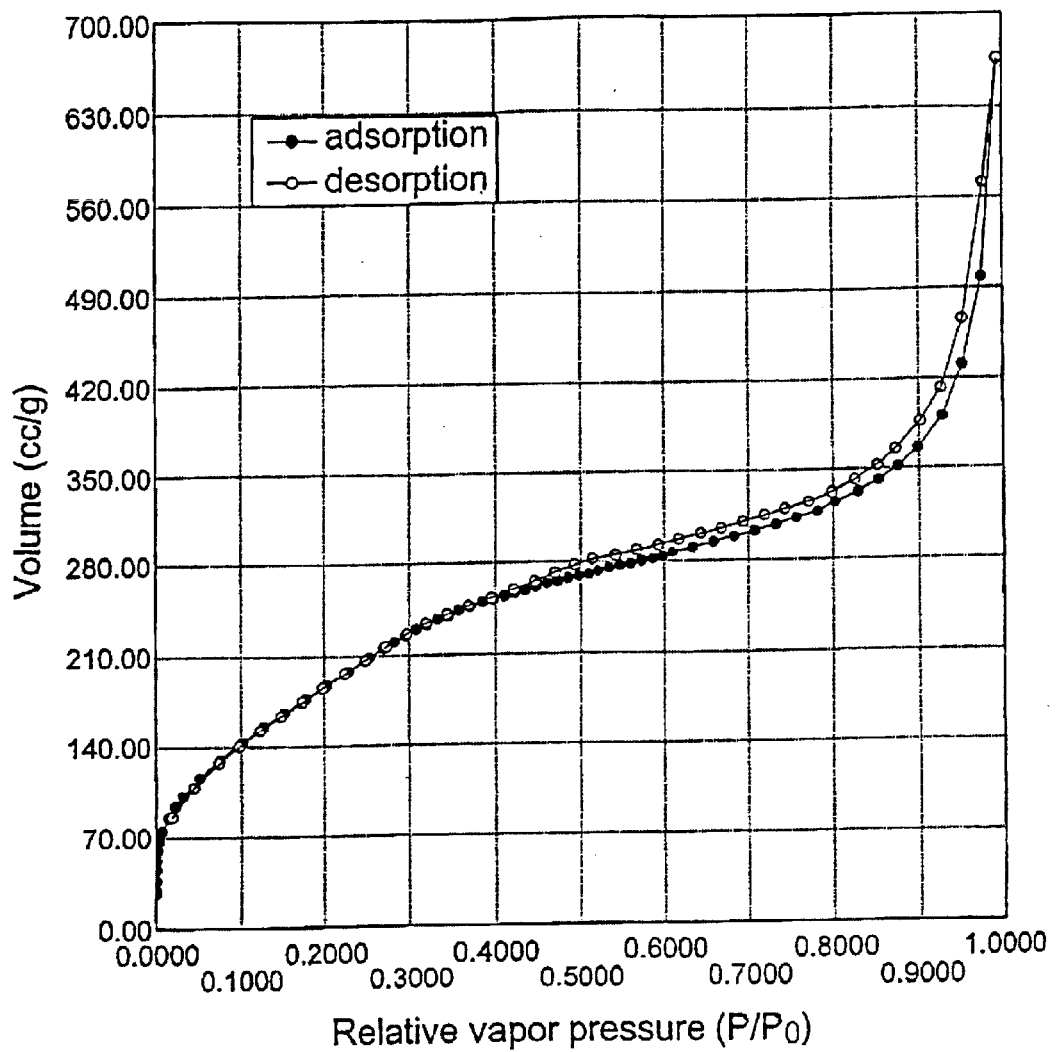
FIG. 23 is a graph showing an adsorption isotherm for the template-free porous material obtained in Example 7.
Figure 24:
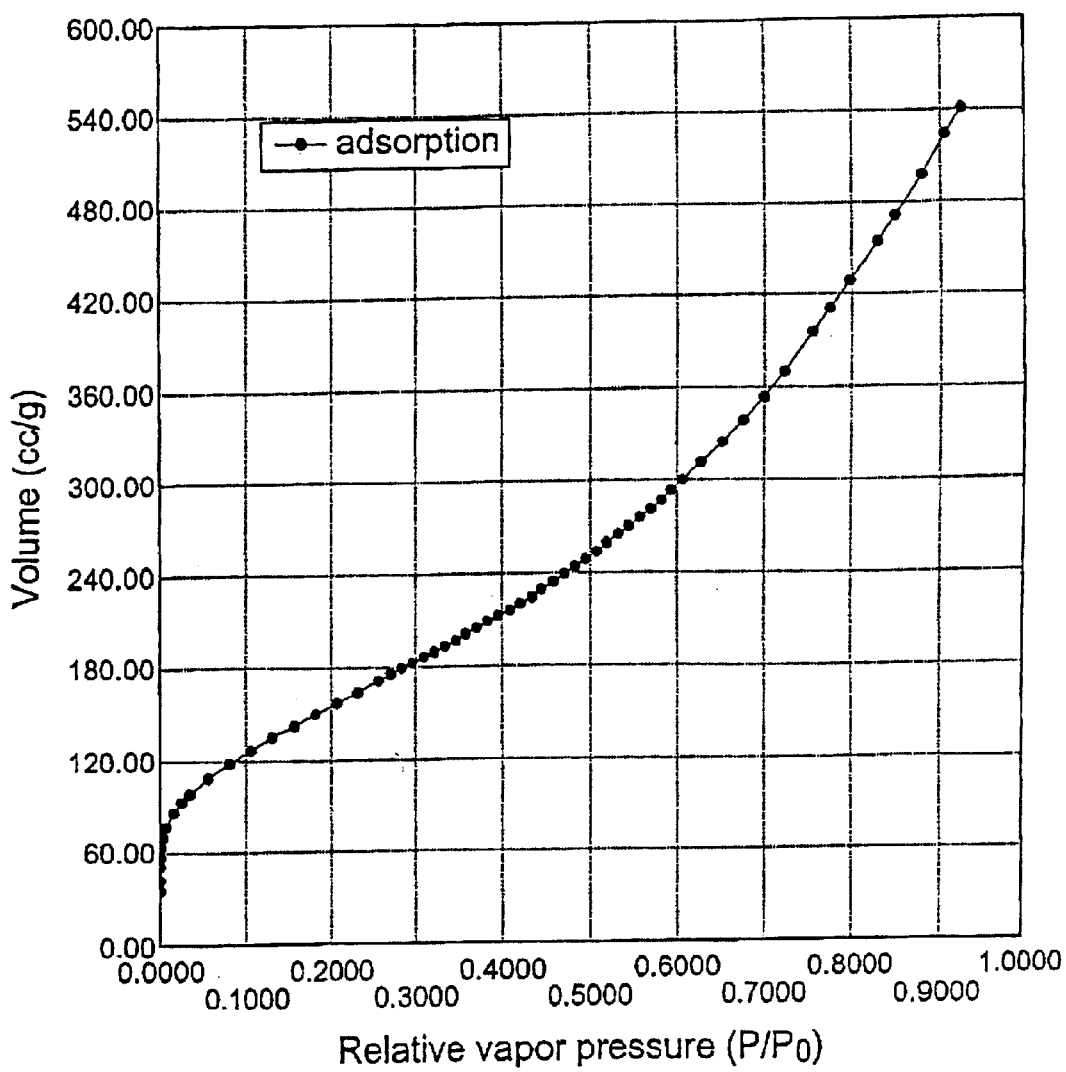
FIG. 24 is a graph showing an adsorption isotherm for the template-free porous material obtained in Example 8.
Figure 25:
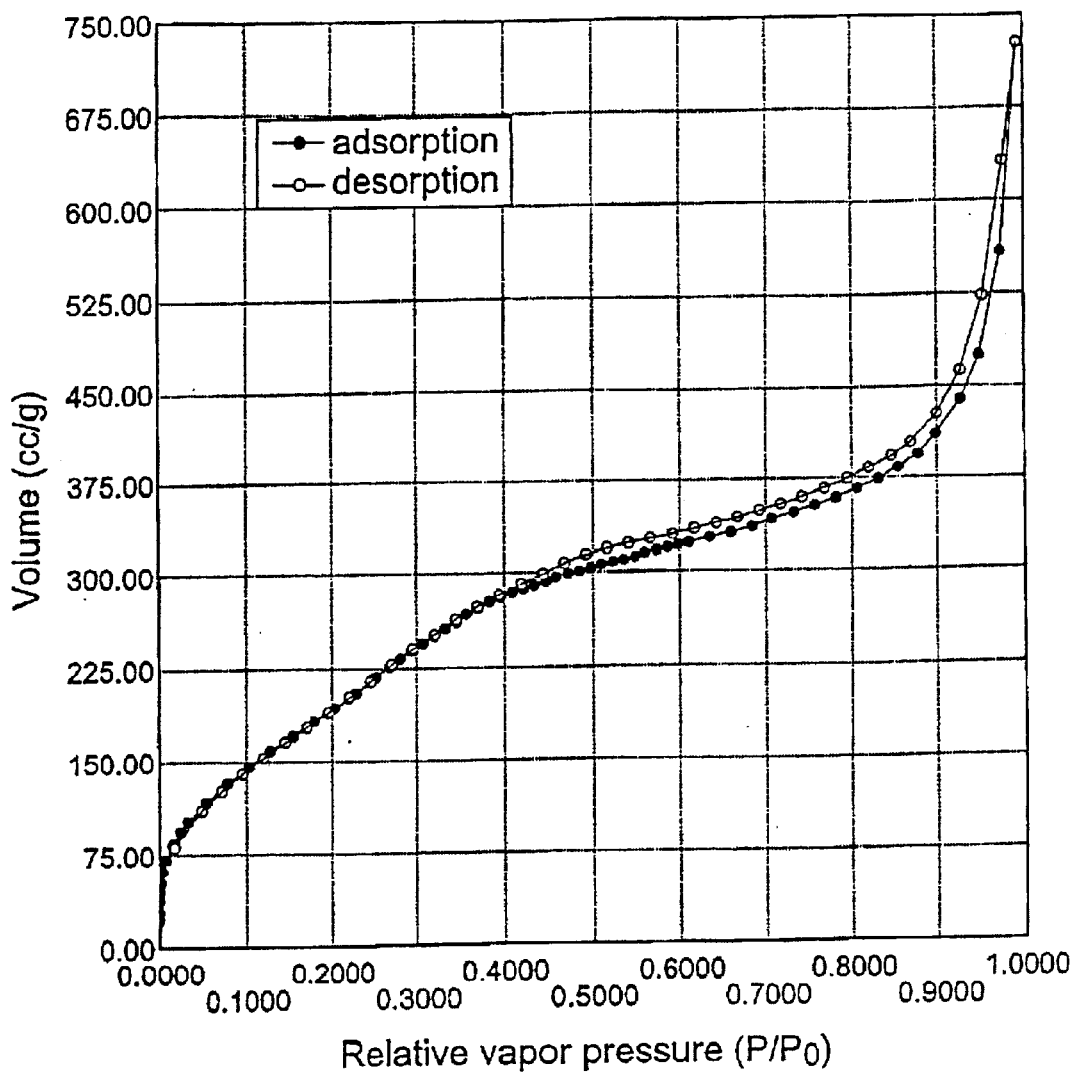
FIG. 25 is a graph showing an adsorption isotherm for the template-free porous material obtained in Example 9.
Figure 26:
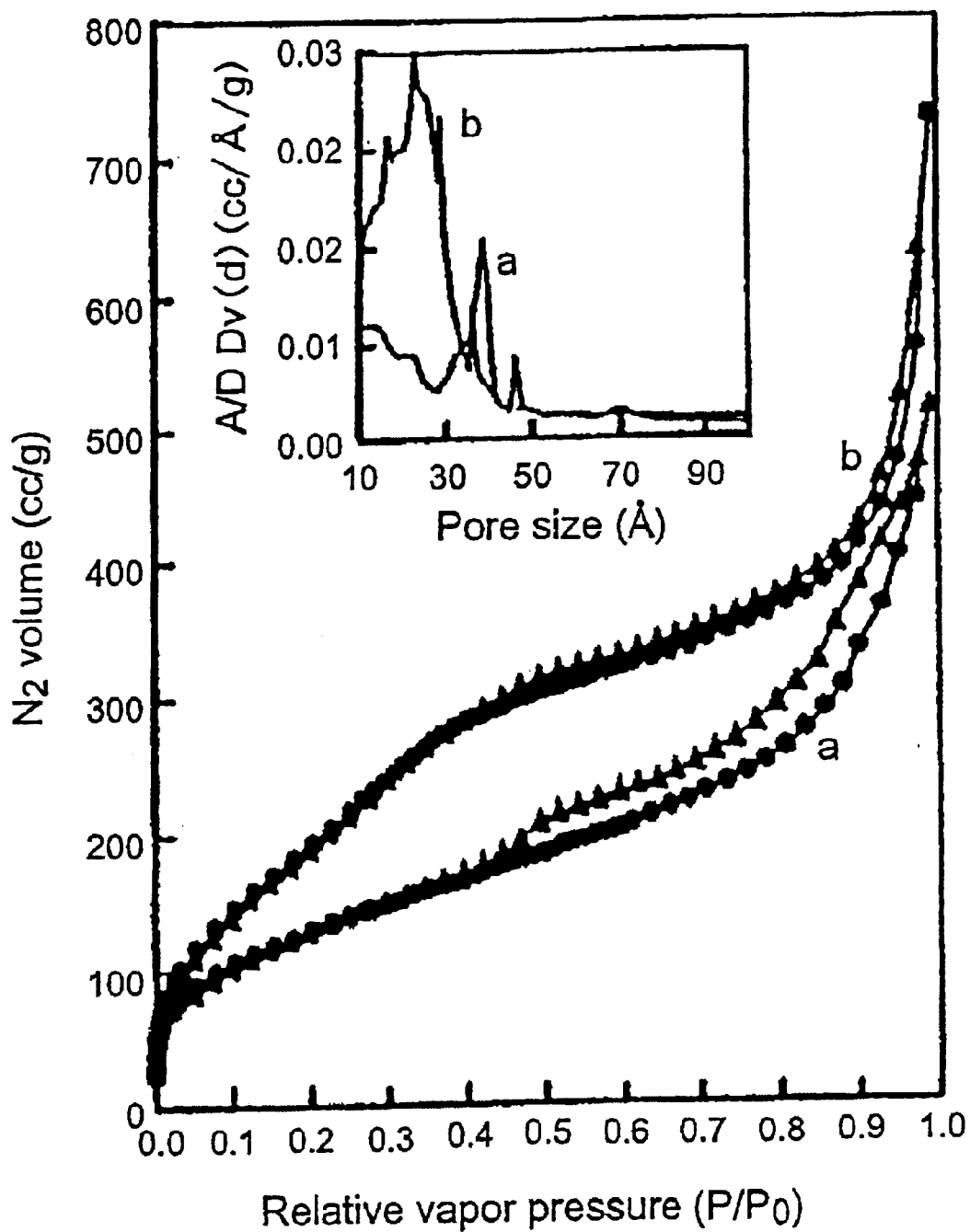
FIG. 26 is a graph showing an adsorption isotherm and pore distribution curve for the template-free porous materials obtained in Examples 9 and 12.

The adsorption isotherms of the template-free porous materials obtained in Examples 7, 8 and 9 are shown in FIGS. 23, 24 and 25, respectively. FIG. 26 shows both the adsorption isotherm for the template-free porous material obtained in Example 9 (the adsorption isotherm indicated by "b" in FIG. 26) and the adsorption isotherm for the template-free porous material obtained in Example 12 (the adsorption isotherm indicated by "a" in FIG. 26). FIG. 26 also shows the pore size distribution curves obtained by the BJH method using these adsorption isotherms (a and b defined as above). From FIG. 26 it is seen that the template-free porous material obtained in Example 9 has a median pore size of 22.5 Angstroms (2.25 nm), while the template-free porous material obtained in Example 12 has a median pore size of 39 Angstroms (3.9 nm).

When the BET specific surface areas were determined from the adsorption isotherms using a BET isotherm adsorption system, the BET specific surface areas for Examples 7, 8, 9, 10, 12 and 13 were found to be 687 m$^2$g$^{-1}$, 615 m$^2$g$^{-1}$, 727 m$^2$g$^{-1}$, 512 m$^2$g$^{-1}$, 464 m$^2$g$^{-1}$ and 567 m$^2$g$^{-1}$, respectively.

Figure 27:
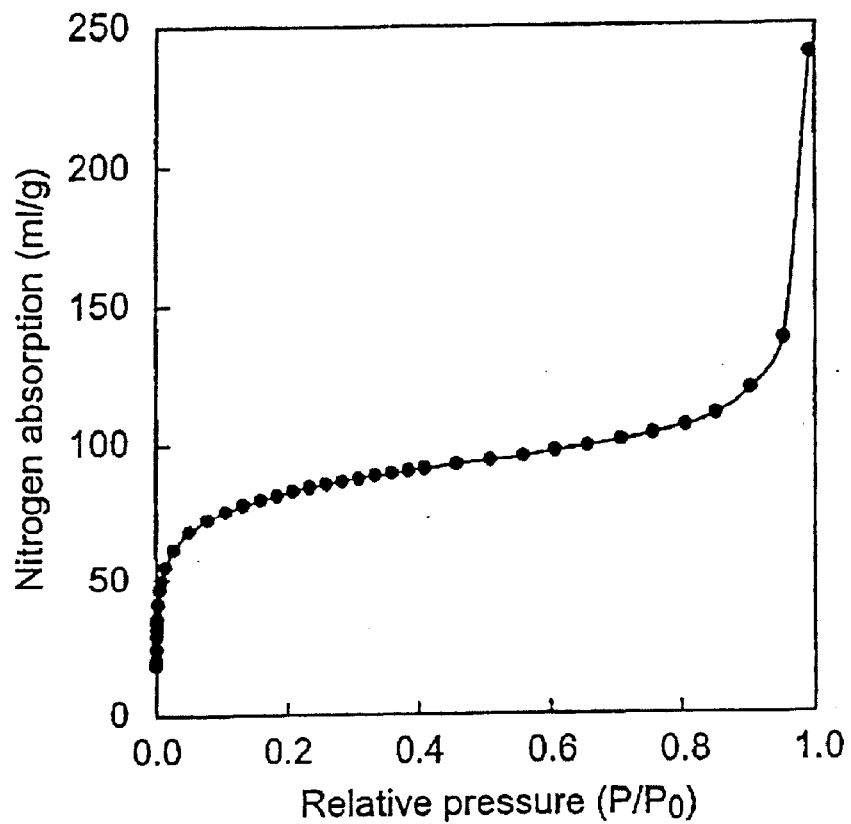
FIG. 27 is a graph showing an adsorption isotherm for the template-removed porous material obtained in Example 14.
Figure 28:
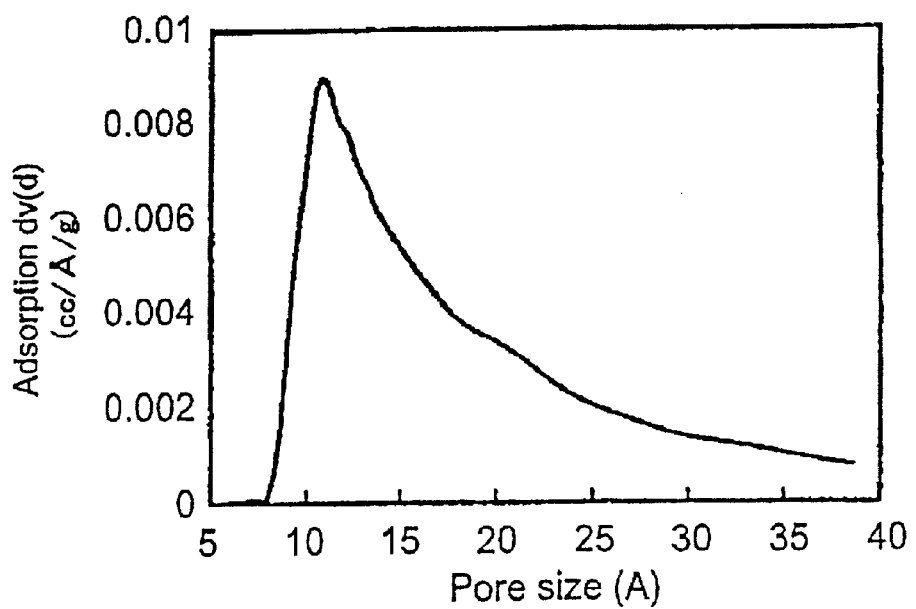
FIG. 28 is a graph showing a pore distribution curve for the template-removed porous material obtained in Example 14.

Next, the adsorption isotherm, pore size distribution curves and median pore sizes for the template-removed porous material obtained in Example 14 were determined in the same manner described above. The SF method (Saito-Foley method) was used to determine the pore size distribution curves. The obtained adsorption isotherms are shown in FIG. 27 and the pore size distribution curves in FIG. 28. The adsorption isotherms shown in FIG. 27 demonstrate that the obtained porous material was mesoporous, with a BET specific surface area of 275 m$^2$/g. The value of the BET specific surface area is larger compared to the conventionally publicly known laminar zirconium phosphate (BET specific surface area: approximately 10–50 m$^2$/g). The median pore size of the porous material was 1.1 nm.

Moisture Adsorption

The amine template-containing porous materials obtained in Examples 1 to 5 were immersed in water at 25° C. and the adsorption was measured by the volume method. Next, the pressure of the adsorption water was gradually increased and the adsorption of the water was plotted at each equilibrium pressure, to obtain a water adsorption isotherm at 25° C. As a result, since all of the adsorption isotherms for Examples 1 to 5 exhibited Type I isotherms with sudden spikes at a relative pressure of 0.1 or below, it was demonstrated that the amine template-free porous materials obtained in Examples 1 to 5 all had median pore sizes of from 0.2 nm to less than 1.5 nm, indicating that the pores were in the micropore range. When the pore volumes for the amine template-free porous materials obtained in Examples 2 and 4 were determined from the adsorption isotherms, the pore volumes were both found to be 0.12 ml/g.

Figure 29:
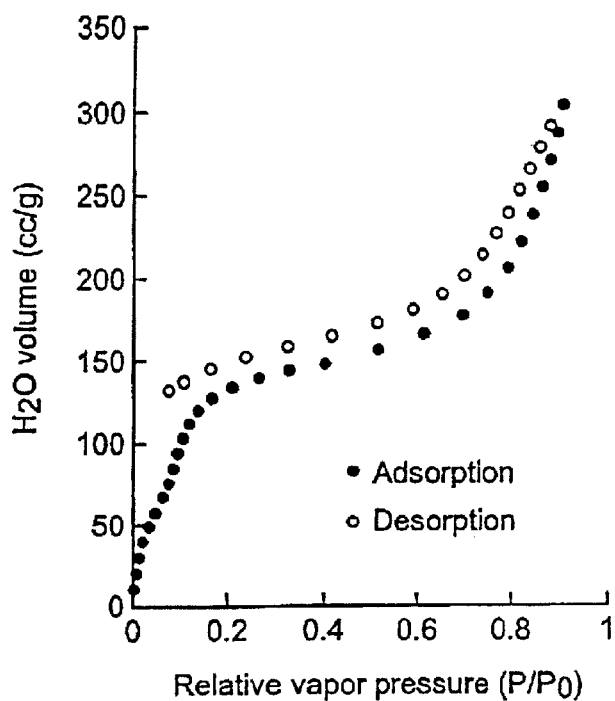
FIG. 29 is a graph showing an adsorption isotherm for the amine template-free porous material obtained in Example 2.
Figure 30:
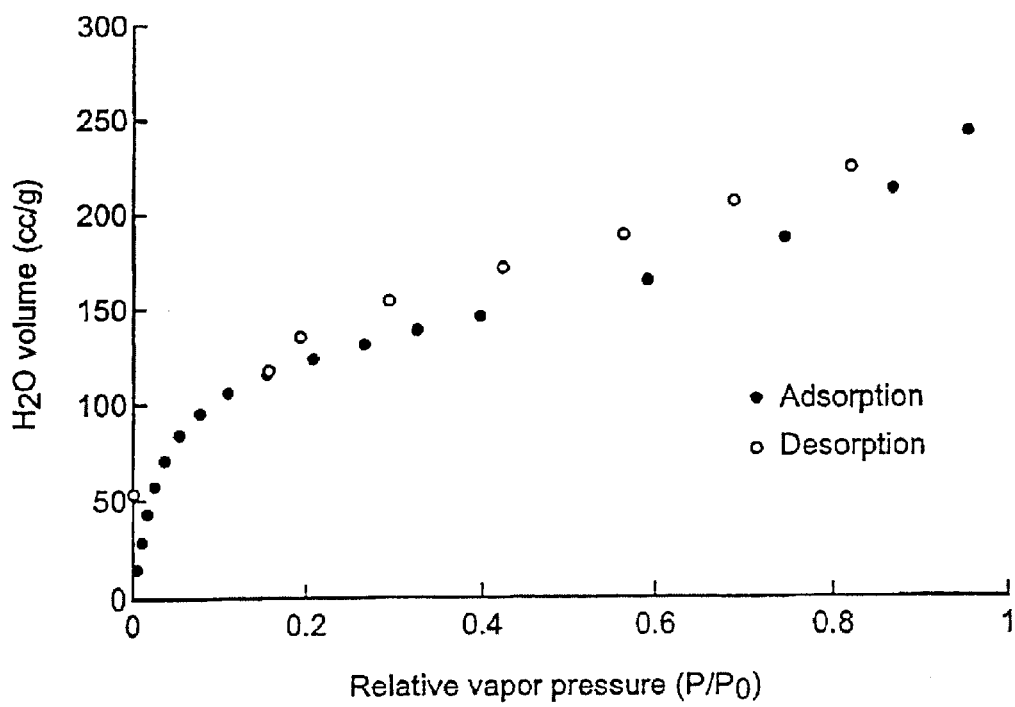
FIG. 30 is a graph showing an adsorption isotherm for the amine template-free porous material obtained in Example 4.

FIG. 29 shows the moisture adsorption isotherm for the amine template-free porous material obtained in Example 2, and FIG. 30 shows the moisture adsorption isotherm for the amine template-free porous material obtained in Example 4, When the BET specific surface areas were determined from the adsorption isotherms shown in FIG. 29 and FIG. 30, the value of the BET specific surface area of the amine template-free porous material obtained in Example 2 was found to be 425 m$^2$g$^{-1}$, while the value of the BET specific surface area of the amine template-free porous material obtained in Example 4 was found to be 360 m$^2$g$^{-1}$. These values are larger than the values obtained with adsorption isotherms by nitrogen adsorption. The moisture adsorption into the amine template-free porous materials obtained in Examples 2 and 4 was found to comply with a Langmuir plot.

ICP Emission Spectroscopy

ICP (Inductively Coupled Plasma) emission spectroscopy of the amine template-free porous materials obtained in Examples 1 to 5 was conducted using an ICPS-2000 high-frequency plasma emission spectroscope. As a result, the Ti/P molar ratios for the amine template-free porous materials obtained in Examples 1 to 5 were found to be 0.93, 0.96, 1.03, 0.95 and 0.98, respectively.

The compositional ratios of the basic frameworks for the amine template-free porous materials obtained in Examples 1 to 5 wherein titanium atoms and phosphorus atoms were bonded by way of oxygen atoms were thus found to be $Ti_{0.93}P_1O_{3-6}$, $Ti_{0.96}P_1O_{3-6}$, $Ti_{1.03}P_1O_{3-6}$, $Ti_{0.95}P_1O_{3-6}$ and $Ti_{0.98}P_1O_{3-6}$, respectively.

The template-free porous materials obtained in Examples 6 to 13 were also subjected to ICP emission spectroscopy in the same manner as above. As a result, The Ti/P molar ratios for the amine template-free porous materials obtained in Examples 6–13 were found to be 0.96, 1.05, 4.80, 1.02, 1.02, 3.8, 6.9 and 1.01, respectively.

Thus, the compositional ratios of the basic frameworks for the amine template-free porous materials obtained in Examples 6 to 13 wherein titanium atoms and phosphorus atoms were bonded by way of oxygen atoms were found to be $Ti_1P_{1.04}O_{2-5}$, $Ti_1P_{0.95}O_{2-5}$, $Ti_1P_{0.21}O_{2-5}$, $Ti_1P_{0.98}O_{2-5}$, $Ti_1P_{0.98}O_{2-5}$, $Ti_1P_{0.26}O_{2-5}$, $Ti_1P_{0.14}O_{2-5}$ and $Ti_1P_{0.99}O_{2-5}$ respectively.

The Ti/P molar ratios for Examples 7–10, 12 and 13 are shown in Table 1 below, together with the template types, autoclave heating times, autoclave heating temperatures and BET specific surface areas. For reference, Table 1 also shows results for a sample of DTP (Disordered Titanium Phosphate) with a non-regular pore arrangement structure.

TABLE 1

| Example No. | Template type | Ti/P molar ratio | Autoclave heating time (days) | Autoclave heating temperature (K) | BET surface area ($m^2g^{-1}$) |
|---|---|---|---|---|---|
| Example 7 | SDS | 1.05 | 3 | 333 | 687 |
| Example 8 | SDS | 4.80 | 3 | 333 | 615 |
| Example 9 | SDS | 1.02 | 2 | 318 | 727 |
| Example 10 | DBSA | 1.02 | 1 | 318 | 512 |
| Example 12 | DBSA | 6.9 | 1 | 318 | 464 |
| Example 13 | DBSA | 1.10 | 1 | 318 | 567 |
| Reference Example | ODTMACl | 0.98 | 1 | 298 | 380 |

Figure 31:
FIG. 31 is a scanning electron micrograph of the amine template-containing porous material obtained in Example 1.
Figure 32:
FIG. 32 is a scanning electron micrograph of the amine template-containing porous material obtained in Example 4.

SDS: Sodium dodecyl sulfate
DBSA: Dodecyl-p-benzenesulfonic acid
ODTMAC1: Octadecyltrimethylammonium chloride Scanning Electron Microscope Observation The amine template-containing porous materials obtained in Examples 1 and 4 were subjected to scanning electron microscope (SEM) observation using a JSM-890 (product of JEOL Co.). The scanning electron microscope photographs of the amine template-containing porous materials obtained in Examples 1 and 4 are shown in FIG. 31 and FIG. 32. In FIG. 31, a granular porous material with a particle size of a few hundred nm is seen, and in FIG. 32, a needle-like porous material with a long axis of a few hundred nm is seen.

Figure 33:
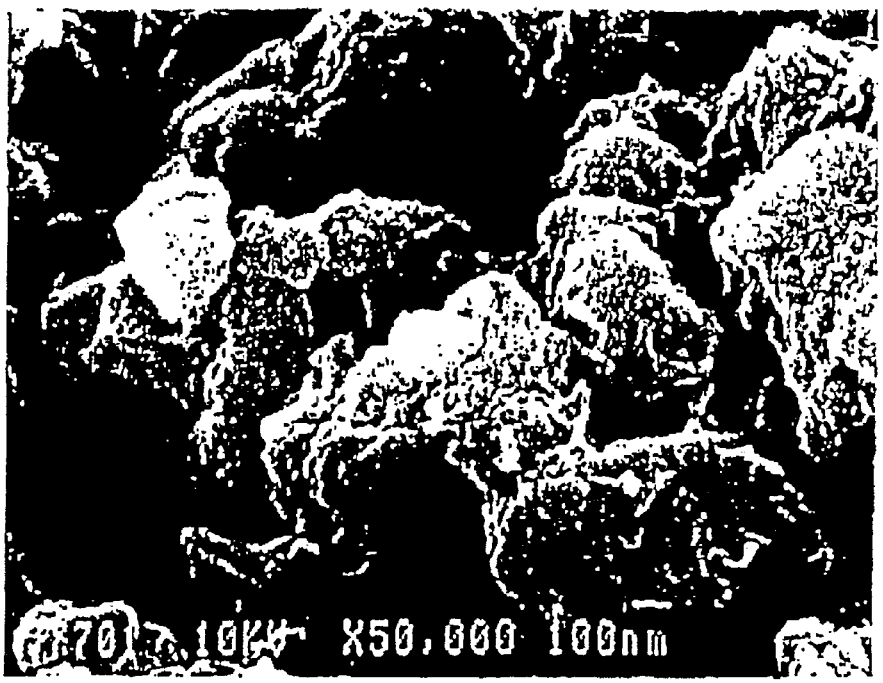
FIG. 33 is a scanning electron micrograph (50,000×) of the template-containing porous material obtained in Example 6.
Figure 34:
FIG. 34 is a scanning electron micrograph (25,000×) of the template-containing porous material obtained in Example 6.
Figure 35:
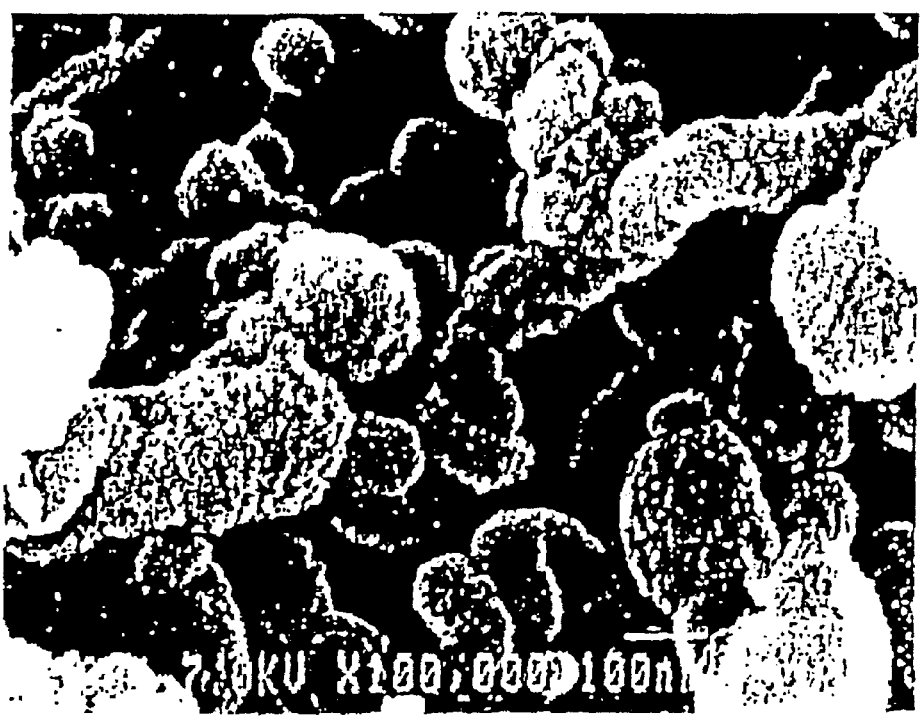
FIG. 35 is a scanning electron micrograph of the template-containing porous material obtained in Example 13.

Scanning electron microscope (SEM) photographs were also obtained for the template-containing porous material obtained in Example X, in the same manner as above (FIGS. 33 and 34). FIG. 33 is photographed at 50,000× magnification, and FIG. 34 at 25,000×magnification. FIGS. 33 and 34 both show the template-containing porous material obtained in Example 6 aggregated to particle sizes of just under 1 μm. FIG. 35 shows a scanning electron microscope (SEM) photograph of the template-containing porous material obtained in Example 13. FIG. 35 shows particles with a size of 20–60 nm aggregated to a size of 0.1–0.2 μm.

Figure 36:
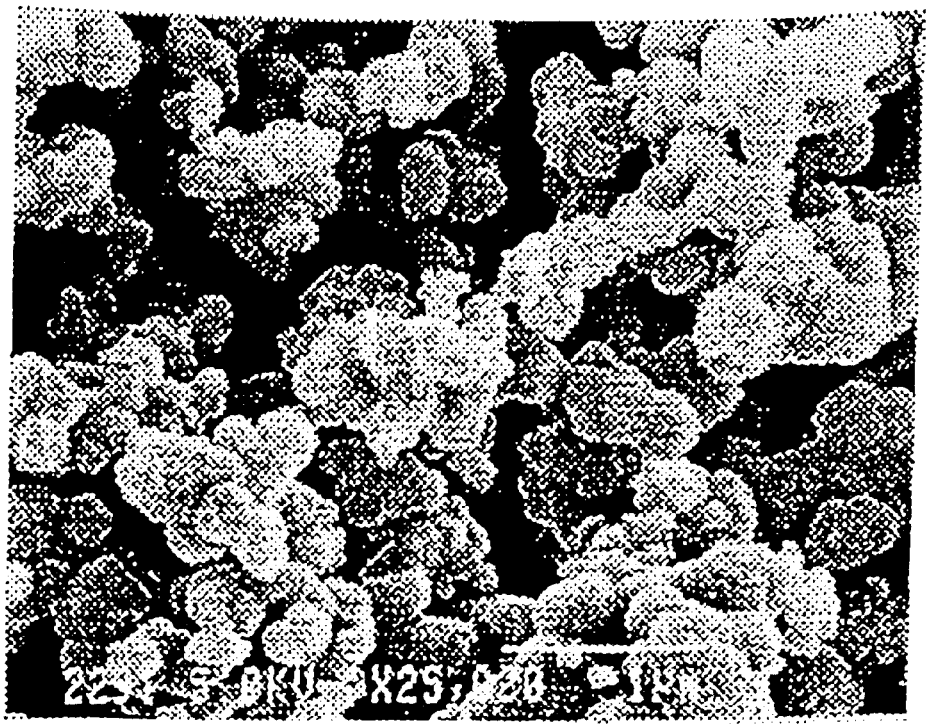
FIG. 36 is a scanning electron micrograph of the template-containing porous material obtained in Example 14.

A scanning electron microscope (SEM) photograph of the template-containing porous material obtained in Example 14 was also taken in the same manner as above (FIG. 36). The photograph shown in FIG. 36 was taken at 20,000× magnification. FIG. 35 shows globular crystals with a size of 0.2–0.3 μm composed of aggregates of fine particles sized 40–60 nm, such as seen in microporous materials.

Transmission Electron Microscope Observation

Figure 37:
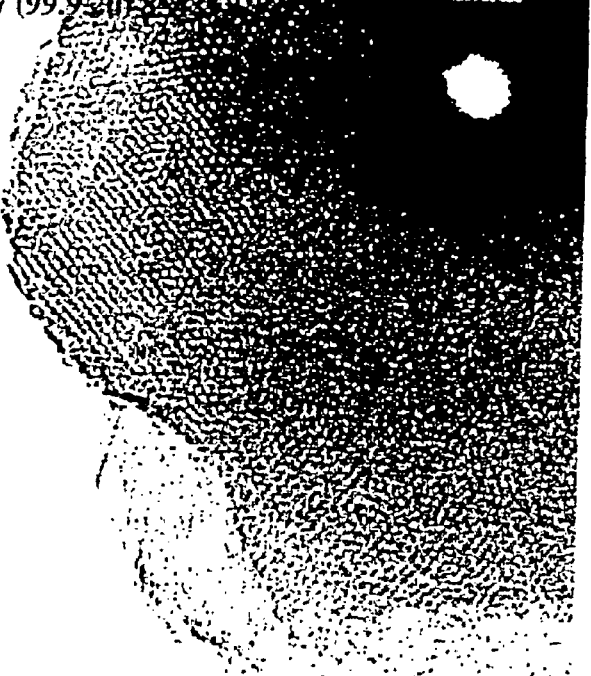
FIG. 37 is a transmission electron micrograph of the template-containing porous material obtained in Example 6.
Figure 38:
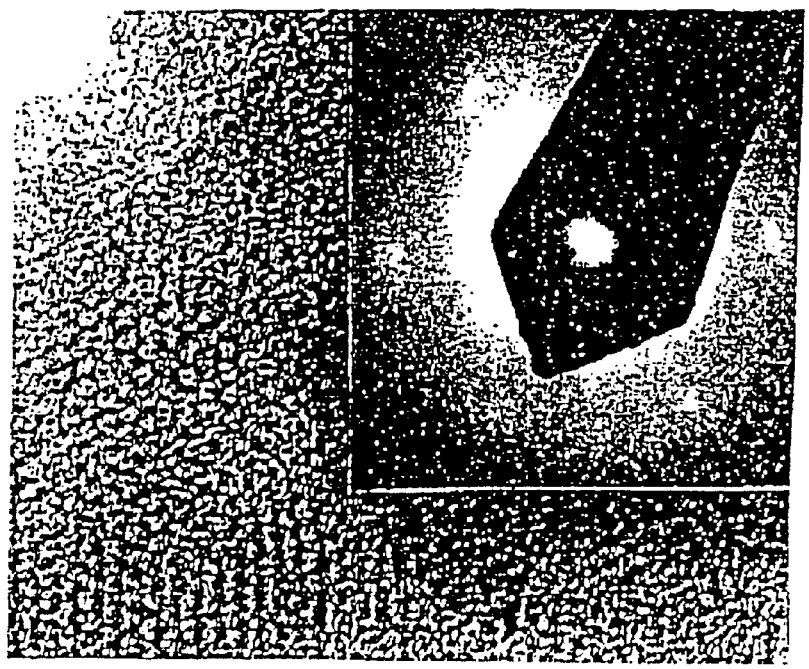
FIG. 38 is a transmission electron micrograph of the template-containing porous material obtained in Example 9.

FIGS. 37 and 38 show transmission electron microscope (TEM) photographs of the template-containing porous materials obtained in Examples 6 and 9. From the transmission electron microscope photographs of FIGS. 37 and 38 it is seen that the template-containing porous materials obtained in Examples 6 and 9 are mesoporous, with a 2-dimensional hexagonal pore arrangement structure.

$^{13}$C MAS NMR Spectroscopy

Figure 39:
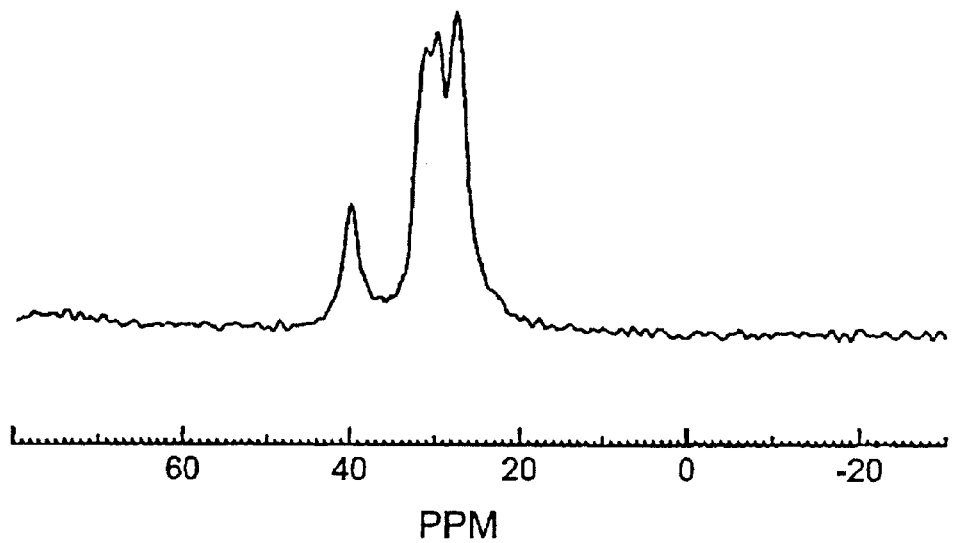
FIG. 39 is a graph showing the $^{13}$C MAS NMR spectrum for the amine template-containing porous material obtained in Example 5.

An MSL-300WB (product of Bruker Co.) was used to measure the $^{13}$C MAS NMR spectrum ($^{13}$C-NMR spectrum by the magic angle rotation method) for the amine template-containing porous material obtained in Example 5. The obtained $^{13}$C MAS NMR spectrum is shown in FIG. 39. In FIG. 39 there are seen peaks at 42.3 ppm, 33.9 ppm, 29.5 ppm and 27.0 ppm due to 1,12-diaminododecane. The slight shift of the peak positions toward the low chemical shift end is attributed to protonation to 1,12-diaminododecane during synthesis.

Ultraviolet/visible Light Absorption Spectroscopy

Figure 40:
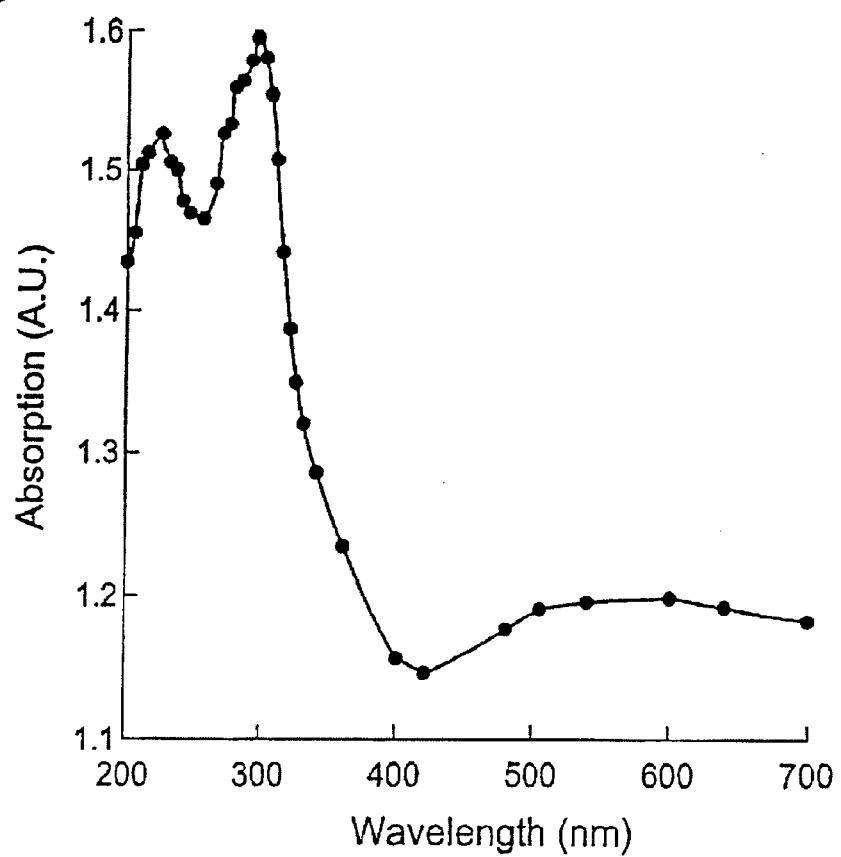
FIG. 40 is a graph showing the ultraviolet/visible light spectrum for the amine template-free porous material obtained in Example 2.

A 330 spectrophotometer (product of Hitachi Corp.) was used to measure the ultraviolet/visible light absorption spectrum of the amine template-free porous material obtained in Example 2. The resulting spectrum is shown in FIG. 40. Since the amine template-free porous material obtained in example 2 exhibits absorption at 280–295 nm as shown in FIG. 40, this indicates that the titanium atoms have a tetrahedral configuration, i.e. a 4-coordinated structure with four oxygen atoms positionable at the four apices of the tetrahedron around each titanium atom, The absorption in this region corresponds to transition from $Ti^{4+}$—$O^{2-}$ to $Ti^{3+}$—$O^-$, thus indicating that the amine template-free porous material obtained in Example 2 can function as a photocatalyst by irradiation of light including this wavelength.

Figure 41:
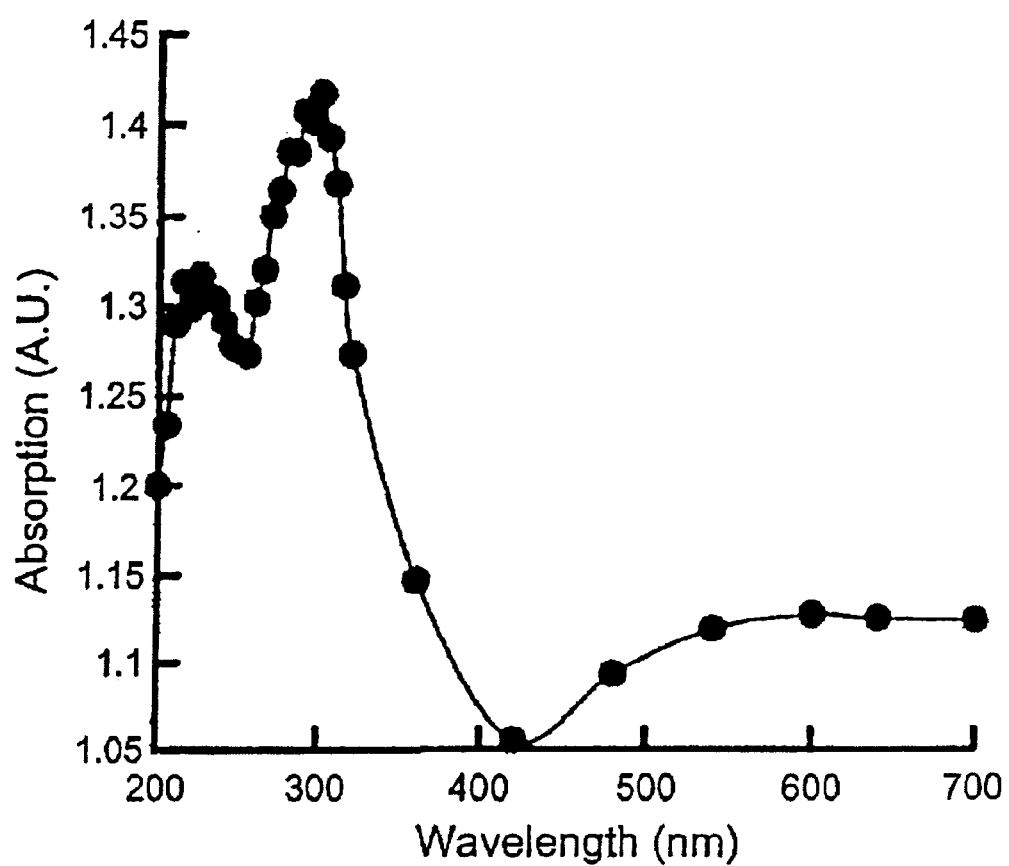
FIG. 41 is a graph showing the ultraviolet/visible light spectrum for the template-free porous material obtained in Example 6.
Figure 42:
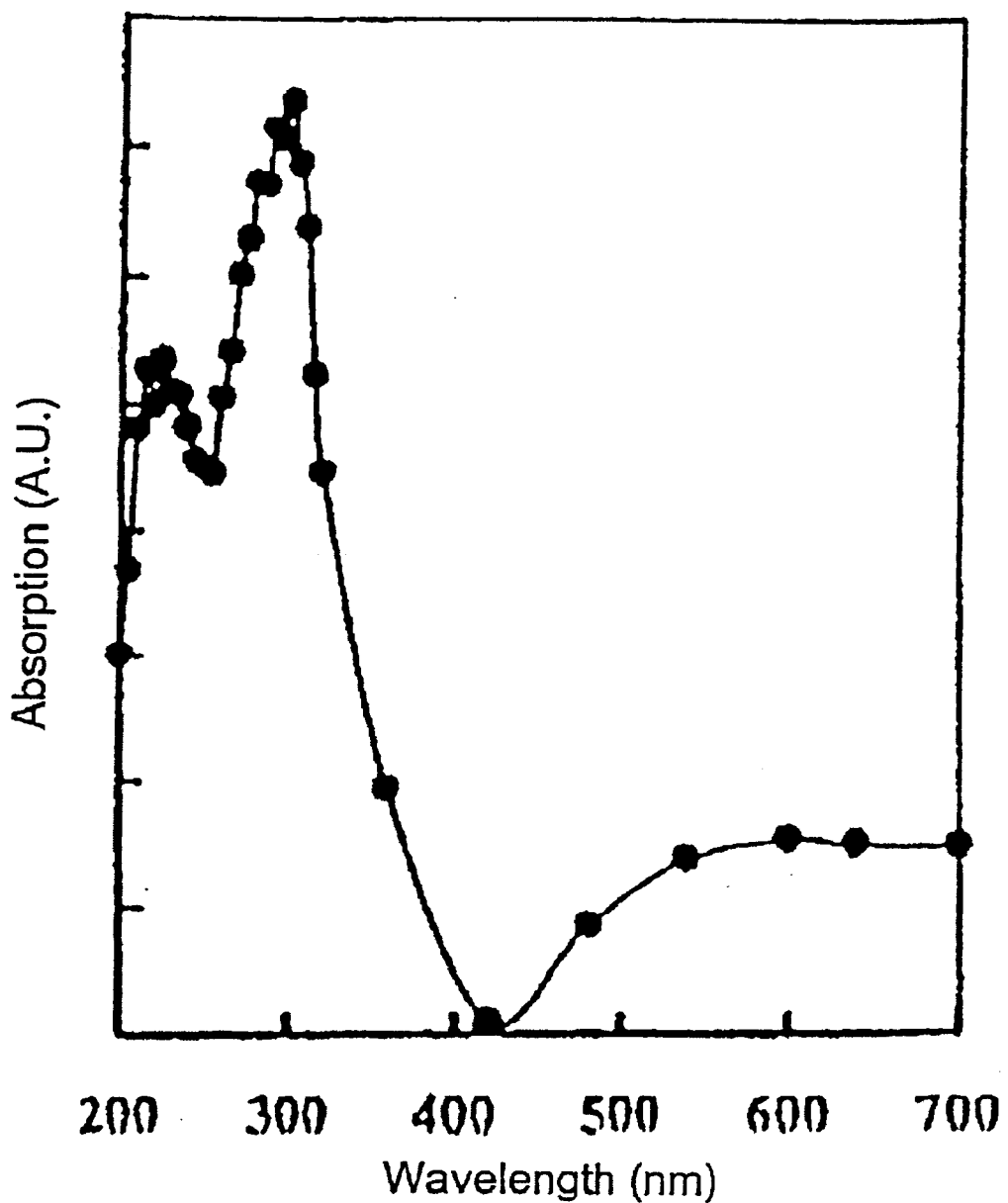
FIG. 42 is a graph showing the ultraviolet/visible light spectrum for the template-free porous material obtained in Example 7.

The ultraviolet/visible light absorption spectra of the amine template-free porous materials obtained in Examples 6 and 7 were also measured in the sate manner as above. The spectra obtained for Examples 6 and 7 are shown in FIGS. 41 and 42, respectively. Since the template-free porous materials obtained in Examples 6 and 7 exhibit absorption at 280–295 nm, as shown in FIGS. 41 and 42, this indicates that the titanium atoms have a tetrahedral configuration, i.e. a 4-coordinated structure with four oxygen atoms positionable at the four apices of the tetrahedron around each titanium atom. The absorption in this region corresponds to transition from $Ti^{4+}$—$O^{2-}$ to $Ti^{3+}$—$O^-$, thus indicating that the amine template-free porous materials obtained in Examples 6 and 7 can function as photocatalysts by irradiation of light including this wavelength.

Ion-exchange Capacity Measurement

A 1 g portion of the amine template-free porous material obtained in Example 2 was added to an aqueous solution of 1.75 g of potassium chloride in 50 mL of water, and the mixture was stirred to obtain a slurry. After refluxing the slurry for 4 hours at 80° C. (353K), it was filtered and the obtained solid was washed several times with water and dried at room temperature. The dried solid was added to a solution of 1.0 g of ammonia water (25% aqueous solution) diluted with 50 mL of water to make a slurry, and this was refluxed at 80° C. (353K) for 4 hours. After completion of reflux, the slurry was filtered and the obtained solid was washed with water. The chlorine content of the filtrate was determined by potentiometric titration using a silver nitrate ($AgNO_3$) solution. The results indicated that the amine template-free porous material obtained in Example 2 had an anion exchange capacity of 4.71 mmol/g.

When the ion-exchange capacities of the template-free porous materials obtained in Examples 10, 11 and 12 were determined in the same manner as above, their anion exchange capacities were found to be 5.39 mmol/g, 2.30 mmol/g and 1.43 mmol/g, respectively.

Presumed Reaction Mechanism for Examples 1–13

The results of the ultraviolet/visible absorption spectra for Examples 1 to 13 indicated that the titanium atoms have a tetrahedral configuration, i.e. that a 4-coordinated structure is adopted with four oxygen atoms positionable at the four apices of the tetrahedron around each titanium atom. Moreover, the results of the infrared absorption spectroscopy clearly indicated Ti—O—P bonding, while the results of the $^{31}$P MAS NMR spectroscopy clearly indicated $P(OTi)_4$ bonding. The results of ICP emission spectroscopy demonstrated that the molar ratio of Ti and P was roughly 1:1. It was also indicated that the porous materials obtained in the examples have an anion exchange property. The porous materials also exhibit a cationic exchange property. By summarizing these results, it is theorized that the reactions of Examples 1 to 13 proceed by the reaction pathway illustrated in FIG. 43.

Specifically, reaction between one molecule of titanium tetrachloride ($TiCl_4$) and one molecule of phosphoric acid ($H_3PO_4$) results in elimination of HCl, yielding a compound with the structure represented by (a). This compound further reacts with titanium tetrachloride and phosphoric acid resulting in elimination of HCl and yielding a compound with the structure represented by (b). Since the —OH and =O bonded to the phosphorus atoms at one end of the compound with the structure represented by (b) can further react with titanium tetrachloride while the —Cl bonded to the titanium atom at the other end can further react with phosphoric acid, these reactions take place simultaneously by the reaction pathway represented by (II), and both ends of the compound with the structure represented by (b) extend to yield a compound with the structure represented by (d), wherein the phosphorus atoms and titanium atoms are bonded by way of oxygen atoms.

Figure 43:
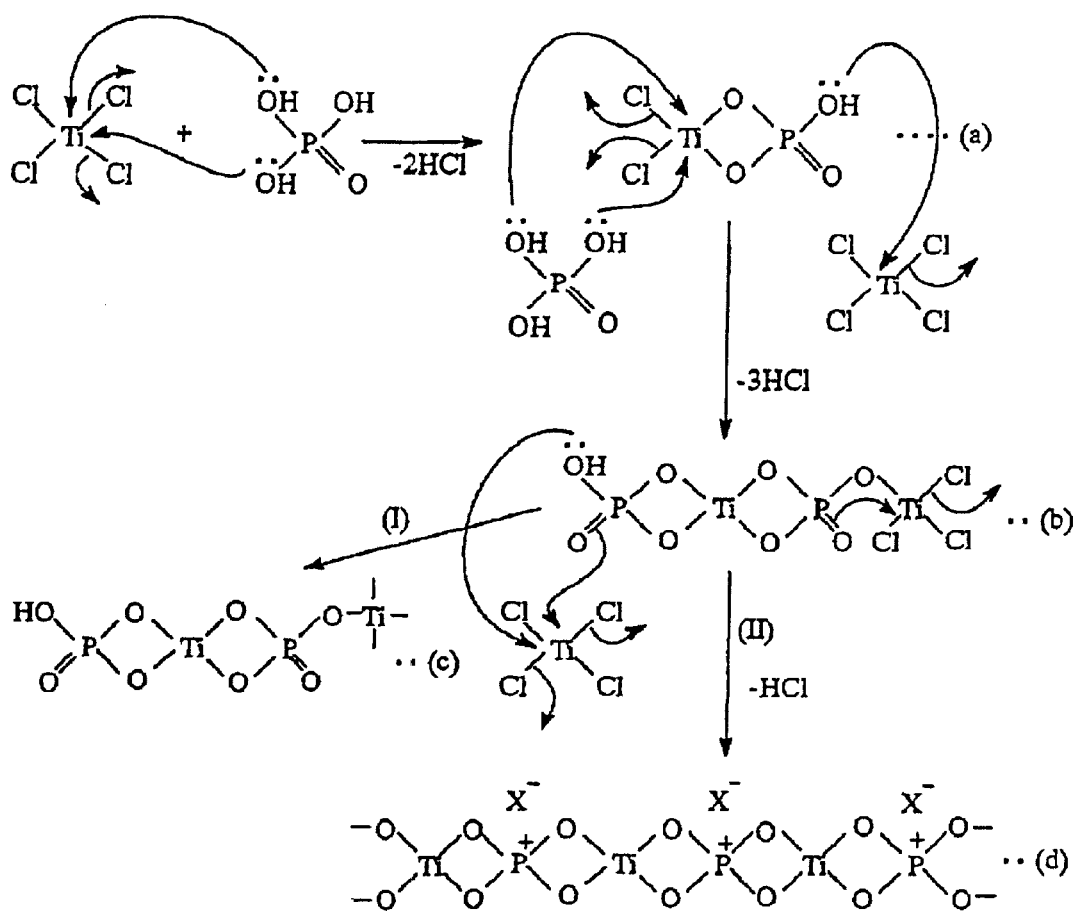
FIG. 43 is an illustration of the proposed reaction pathway for synthesis of a photocatalyst of the invention from a titanium-containing compound and a phosphorus-containing compound.

The compound represented by (d) comprises titanium atoms with a 4-coordinated structure (with oxygen atoms positioned at the four apices of the tetrahedron around each titanium atom) and phosphorus atoms with a 4-coordinated structure (with oxygen atoms positioned at the four apices of the tetrahedron around each phosphorus atom), and therefore the phosphorus atoms are positively charged. Consequently, as shown in FIG. 43, the positively charged phosphorus atoms form ion pairs with negative ions represented by X$^-$ (for example, OH$^-$), and the X$^-$ ions are ion-exchanged with other anions. It is believed that the porous materials of the invention exhibit an anion-exchange property because of the positively charged phosphorus atoms in the molecule.

On the other hand, in the compound with the structure represented by (b), when the —Cl bonded to a titanium atom participates in further reaction with the phosphoric acid by the reaction pathway represented by (I), a compound with the structure represented by (c) is produced. In the structure represented by (c), the phosphorus atoms are bonded with one double-bonding oxygen and three single-bonding oxygens, and therefore the molecule is neutral as a whole. However, the —OH group bonded to the phosphorus atom tends to polarize to —O$^-$—H$^+$, and this H$^+$ is ion-exchanged with other cations. It is believed that the porous materials of the invention exhibit a cation-exchange property because of the presence of the —O$^-$—H$^+$ groups in the molecule.

In Examples 9 and 13, as indicated by the results of $^{31}$P MAS NMR spectroscopy, methylphosphonic acid diethyl ester ($CH_3PO(OC_2H_5)_2$) is also incorporated into the above-mentioned reactions, and therefore phosphorus atoms with bonded methyl groups are also bonded to titanium atoms by way of oxygen atoms. Consequently, when an alkylphosphonic acid ester such as methylphosphonic acid diethyl ester is used in addition to phosphoric acid, a basic framework is formed which includes alkyl-bonded phosphorus atoms, thus allowing modification with alkyl groups. A similar reaction occurs even when an alkylphosphonic acid is used instead of an alkylphosphonic acid ester, forming a basic framework including alkyl-bonded phosphorus atoms.

Presumed Reaction Mechanism for Example 14

Figure 44:
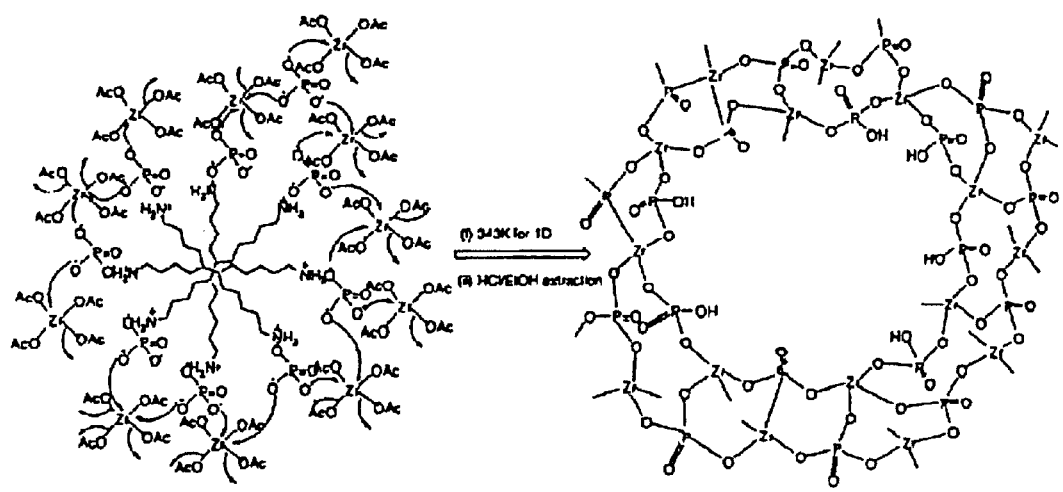
FIG. 44 is a reaction pathway diagram showing the proposed reaction mechanism for synthesis of a porous material of the invention from a zirconium-containing compound and a phosphorus-containing compound.

Based on the above results, it is theorized that the porous material obtained in Example 14 forms its basic framework by the reaction pathway illustrated in FIG. 44.

Specifically, the two amino groups of 1,12-diaminododecane are protonated in the presence of phosphoric acid to —NH$_3^+$, and aggregation occurs with the hydrophobic portions oriented toward the center and the hydrophilic portions oriented outward, while the —NH$_3^+$ charges on the outside are balanced by the phosphoric acid ions ($PO_4^{3-}$), thereby forming globules. When zirconium tetrapropoxide is added to these globules, the zirconium is rapidly oriented near the phosphoric acid ions of the globules, and P—O—Zr is formed upon hydrothermal treatment to produce a template-containing porous material (left side of FIG. 44).

When the template-containing porous material produced in this manner is treated with a hydrochloric acid/ethanol solution, the oxygen atoms (—O$^-$) bonded to the —NH$_3^+$ are protonated with elimination of the 1,2-diaminododecane, thus yielding the target porous material (right side of FIG. 44). This reaction mechanism is also suggested by the fact that the pore size of the porous material after template removal closely matches the molecular length of 1,2-diaminododecane.

Decomposition of Water by Light Irradiation

Example 15

Figure 45:
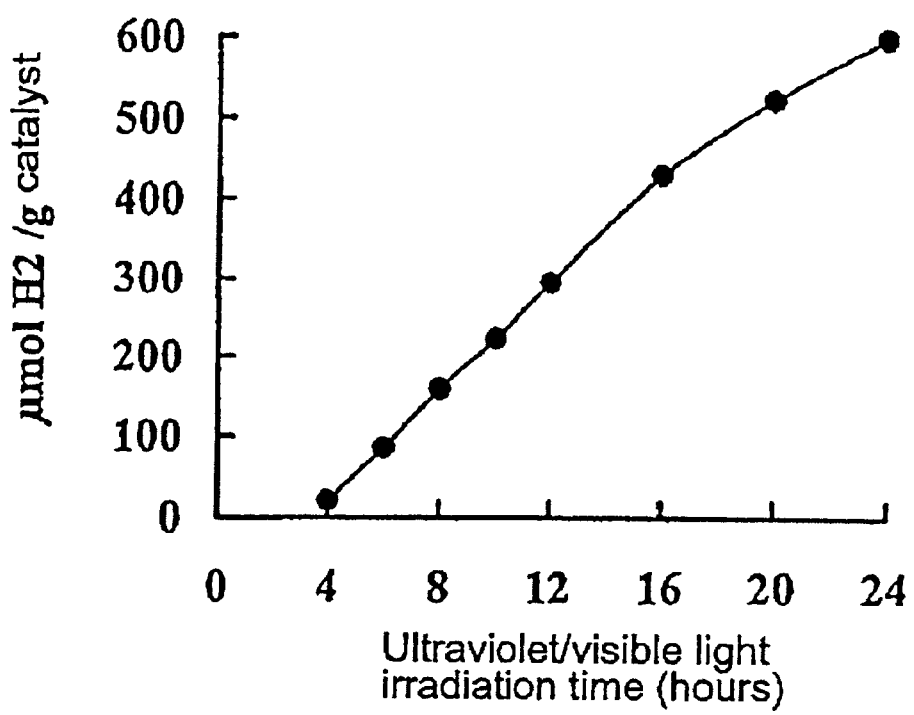
FIG. 45 is a graph showing the relationship between light irradiation time and amount of hydrogen generation for decomposition of water by irradiation of light on the amine template-free porous material obtained in Example 3.

A 1 g portion of the amine template-free porous material obtained in Example 3 was dispersed in 150 ml of water held in a quartz photoreactor. To this there was added 4 g of sodium bicarbonate, and the mixture was stirred under reduced pressure. Argon gas was then introduced to 100 Torr, and ultraviolet/visible light irradiation was performed with a xenon lamp. The gas composition was analyzed at 4, 6, 8, 10, 12, 16, 20 and 24 hours after initiating the ultraviolet/visible light irradiation. A TCD (thermal conductivity detector)-equipped GC-8APT gas chromatograph (product of Shimadzu Seisakusho) was used for the gas composition analysis. A hydrogen gas calibration curve was used to determine the hydrogen gas volume generated by the aforementioned photocatalytic reaction. The results are shown in FIG. 45. As clearly seen in FIG. 45, the porous material obtained in Example 3 (amine template-free porous material) was able to decompose water into hydrogen gas and oxygen gas by photocatalytic reaction, and the decomposition reaction was efficiently produced.

Example 16

Photodecomposition of water was carried out by the procedure described below using the template-removed porous material obtained in Example 14 as the catalyst, and the catalytic activity was evaluated.

The photodecomposition of water was accomplished using a gas phase circulating reactor. The reactor was equipped with a quartz reaction vessel with in an inner volume of 400 ml, and evacuation of the inside of the reaction vessel was accomplished with a vacuum pump, The gas phase circulation channel of the reactor was connected to an online gas chromatograph (detector: TCD, FID), to allow analysis of the gas composition after prescribed periods of time.

Using this type of reactor, an aqueous solution of 5.3 g of sodium sulfite (Na$_2$SO$_3$) dissolved in 175 ml of water was placed in the reaction vessel together with 1 g of the template-removed porous material, and the vessel was placed in the reactor. After then evacuating the gas in the reaction vessel and the gas phase circulation channel, argon gas was introduced to 60 Torr and the mixture in the reaction vessel was irradiated with a xenon (Xe) lamp (output: 300 W) while stirring with a magnetic stirrer. After a prescribed period of time had passed, the amount of hydrogen produced by the reaction was measured with the gas chromatograph.

Figure 46:
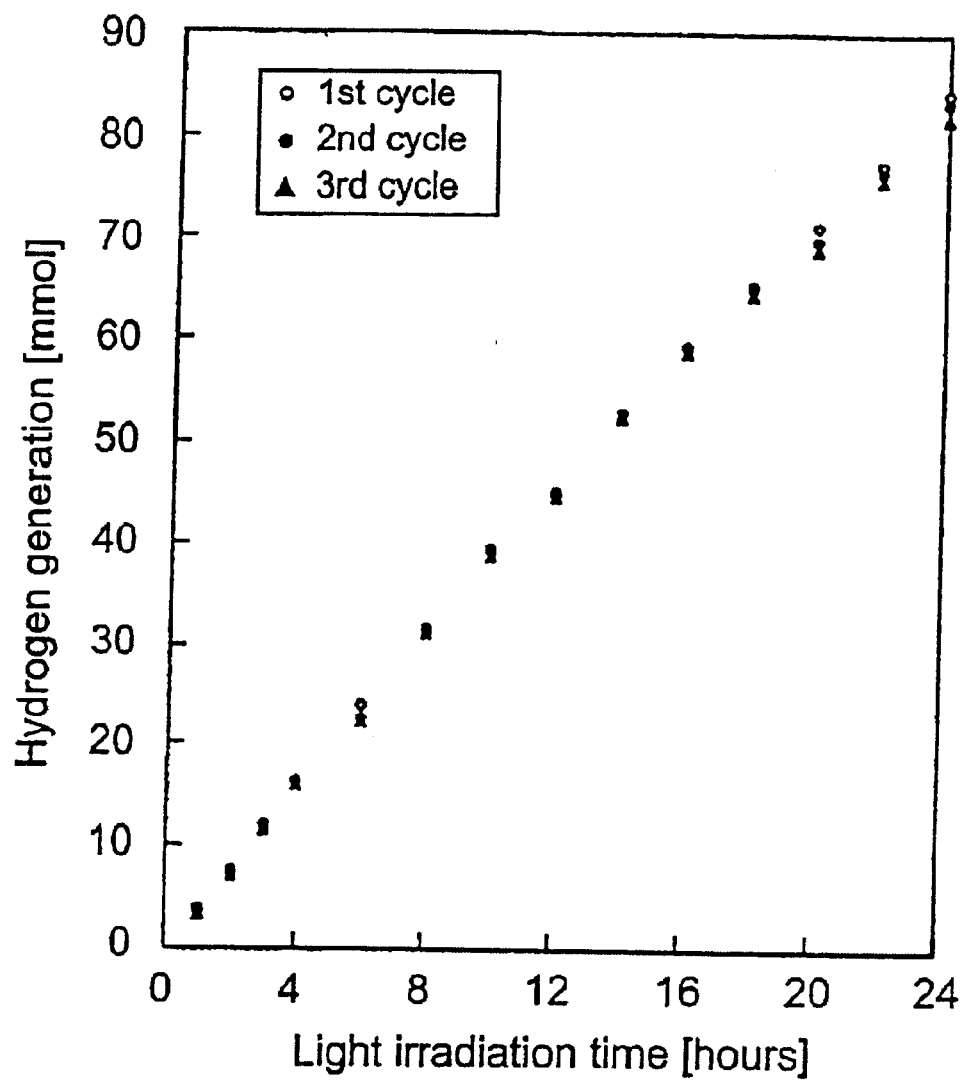
FIG. 46 is a graph showing the relationship between light irradiation time and amount of hydrogen generation for decomposition of water by irradiation of light on the template-removed porous material obtained in Example 14.

In this reaction, the hydrogen generation upon one hour of light irradiation was 3.9 mmol per gram of catalyst. FIG. 46 shows the correlation between reaction time and hydrogen generation after 3 repeated cycles, where one cycle was a period from the initial light irradiation to 24 hours thereafter. The hydrogen generation amounts in cycles 1 to 3 were 84.2 mmol, 32.7 mmol and 81.8 mmol, respectively, per gram of catalyst, thus confirming that the porous material used exhibits sufficiently high catalytic activity over long periods. No oxygen was detected in this reaction.

Comparative Example 1

Water was subjected to photodecomposition in the same manner as Example 16 except that a template-removed porous material was not used. The hydrogen generation upon 24 hours of light irradiation was 10.7 mmol.

Comparative Example 2

Water was subjected to photodecomposition in the same manner as Example 16 except that platinum-carrying titanium (Pt/TiO$_2$) was used instead of a template-removed porous material, and sodium carbonate (Na$_2$CO$_3$) was used instead of sodium sulfite. The hydrogen generation upon 1 hour of light irradiation was 0.57 mmol per gram of catalyst.

Comparative Example 3

Water was subjected to photodecomposition in the same manner as Example 16 except that zirconia (ZrO$_2$) was used instead of a template-removed porous material, and sodium bicarbonate (NaHCO$_3$) was used instead of sodium sulfite. The hydrogen generation upon 1 hour of light irradiation was 0.31 mmol per gram of catalyst.

As explained above, according to the present invention there can be provided photocatalysts capable of efficiently producing photocatalytic reaction even with low amounts of catalyst and a small light irradiation areas to allow decomposition of water and the like with an adequately high reaction rate, as well as a production process for the photocatalysts.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A photocatalyst comprising a porous material, wherein said porous material having a median pore diameter ranging from 0.2 nm to less than 1.5 nm comprises a compound with a basic framework having titanium atoms bonded to phosphorus atoms by way of oxygen atoms.

2. The photocatalyst according to claim 1, wherein said basic framework has a composition of the following formula (1):

$$Ti_xP_yO_z \qquad (1)$$

wherein x is a number ranging from 0.5 to 1.5, y is a number ranging from 0.5 to 1.5 and z is a number ranging from 3 to 6.

3. The photocatalyst according to claim 1, wherein said porous material has a pore volume ranging from 0.05 to 0.5 ml/g.

4. The photocatalyst according to claim 1, wherein said porous material has an ion-exchange capacity ranging from 0.01 to 10 mmol/g.

5. The photocatalyst according to claim 3, wherein said pore volume ranges from 0.1 to 0.5 ml/g.

6. A photocatalyst comprising a porous material, wherein said porous material having a median pore diameter ranging from 1.5 nm to 30 nm, comprises a compound with a basic framework having titanium atoms bonded to phosphorus atoms by way of oxygen atoms, and further wherein the value of the total volume of pores with a diameter in the range of ±40% of said median pore diameter divided by the total pore volume ranges from 0.4 to 1.

7. The photocatalyst according to claim 6, wherein said basic framework has a composition of the following formula (2):

$$TiP_mO_n \qquad (2)$$

wherein m is a number ranging from 0.1 to 1.5, and n is a number ranging from 2 to 5.

8. The photocatalyst according to claim 6, wherein said basic framework is modified with an alkyl group, and wherein said alkyl group is bonded to said phosphorus atom.

9. The photocatalyst according to claim 6, wherein said porous material has an ion-exchange capacity ranging from 0.01 to 10 mmol/g.

10. The photocatalyst according to claim 6, wherein the pore walls serving as partitions between the adjacent pores are crystalline.

11. The photocatalyst according to claim 6, wherein the pore walls serving as partitions between the adjacent pores exhibit an X-ray diffraction pattern with at least 2 peaks at a diffraction angle of at least 10°.

12. The photocatalyst according to claim 6, wherein said porous material has a pore volume ranging from 0.05 to 1 ml/g.

13. The photocatalyst according to claim 12, wherein said porous material has a pore volume ranging from 0.2 to 1 ml/g.

14. A process for producing a photocatalyst of claim 6, wherein said process includes a step of reacting a titanium-containing compound and a phosphorus-containing compound in water in the presence of an alkylamine and hydrofluoric acid.

15. A process for producing a photocatalyst according to claim 14, wherein the molar ratio of said hydrofluoric acid to said phosphorus-containing compound is from 0.3 to 1.

16. A process for producing a photocatalyst according to claim 15, wherein said phosphorus-containing compound contains at least one compound selected from the group consisting of alkylphosphonic acids and alkylphosphonic acid esters.

17. A process for producing a photocatalyst of claim 6, wherein said process includes a step of reacting a titanium-containing compound and a phosphorus-containing compound in water in the presence of an anionic surfactant.

18. A process for producing a photocatalyst according to claim 17, wherein said reaction is carried out at a pH of from 1 to 6.

19. A process for producing a photocatalyst according to claim 17, wherein said phosphorus-containing compound contains at least one compound selected from the group consisting of alkylphosphonic acids and alkylphosphonic acid esters.

20. A photocatalyst comprising a porous material, wherein said porous material having a median pore diameter ranging from 0.3 nm to 2 nm comprises a compound with a basic framework having zirconium atoms bonded to phosphorus atoms by way of oxygen atoms, which compound has no organic group-crosslinked structure.

21. A photocatalyst according to claim 20, wherein the value of the total volume of pores with a diameter in the range of ±40% of said median pore diameter divided by the total pore volume ranges from 0.4 to 1.

22. The photocatalyst according to claim 20, wherein said basic framework has a composition of the following formula (3):

$$ZrP_aO_b \tag{3}$$

wherein a is a number ranging from 0.1 to 10 and b is a number of ranging from 2 to 10.

23. A process for producing a photocatalyst of claim 20, wherein said process includes a step of reacting a zirconium-containing compound and a phosphorus-containing compound in water in the presence of a diaminoalkane and alcohol.

* * * * *